(12) United States Patent
Yokoyama

(10) Patent No.: US 7,116,611 B2
(45) Date of Patent: Oct. 3, 2006

(54) POSITION CONTROL METHOD

(75) Inventor: Eiji Yokoyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 700 days.

(21) Appl. No.: 10/228,097

(22) Filed: Aug. 27, 2002

(65) Prior Publication Data
US 2003/0058768 A1    Mar. 27, 2003

(30) Foreign Application Priority Data
Aug. 27, 2001 (JP) ............... 2001-256017
Apr. 9, 2002 (JP) ............... 2002-106699

(51) Int. Cl.
*G11B 7/00* (2006.01)
(52) U.S. Cl. ............... 369/44.35; 369/53.18; 369/44.29
(58) Field of Classification Search ............. 369/53.18, 369/44.35
See application file for complete search history.

(56) References Cited
U.S. PATENT DOCUMENTS
5,581,521 A * 12/1996 Nomura et al. .......... 369/44.35
5,610,885 A * 3/1997 Takahashi ................ 369/44.28
5,633,846 A 5/1997 Okuyama et al.
6,243,226 B1 6/2001 Jeong

FOREIGN PATENT DOCUMENTS

| JP | 08-279165 | 10/1996 |
|---|---|---|
| JP | 8-279165 A | 10/1996 |
| JP | 09-259449 | 10/1997 |
| JP | 09-320075 A | 12/1997 |
| JP | 11-250478 | 9/1999 |
| JP | 2000-263873 A | 9/2000 |
| JP | 2000-268373 A | 9/2000 |
| JP | 2001-210032A A | 8/2001 |

* cited by examiner

*Primary Examiner*—Wayne Young
*Assistant Examiner*—Van Pham
(74) *Attorney, Agent, or Firm*—Birch, Stewart, Kolasch & Birch, LLP

(57) ABSTRACT

The present invention provides a control system of following a follow target position. A control system has a disturbance observer for obtaining a disturbance force estimation value and a speed estimation value as estimation values of a disturbance force and a speed as a speed to be controlled by using an actuator control signal cont and a zero follow position which can be observed. Since the disturbance force estimation value and speed estimation value are fed back.

10 Claims, 46 Drawing Sheets

F I G. 14
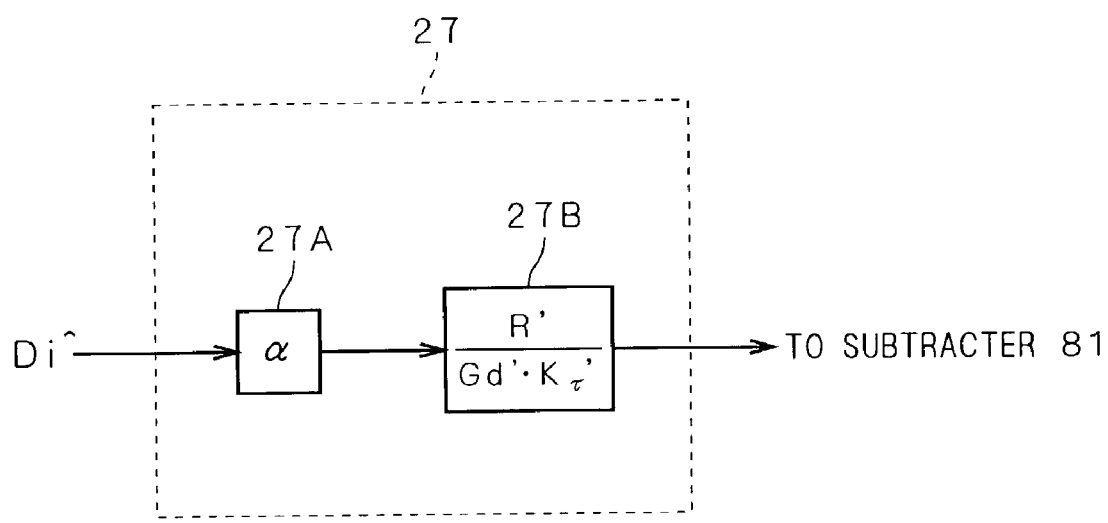
F I G. 15
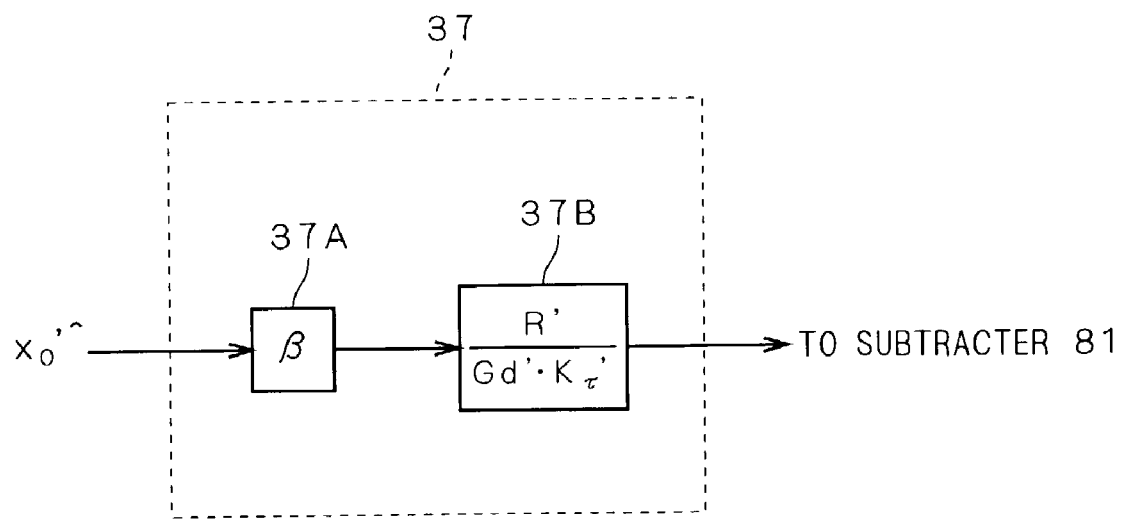

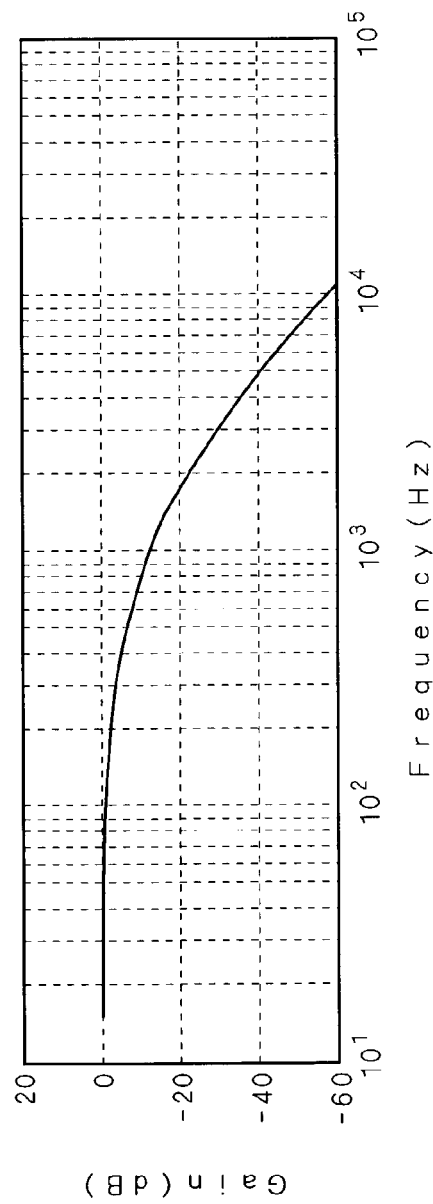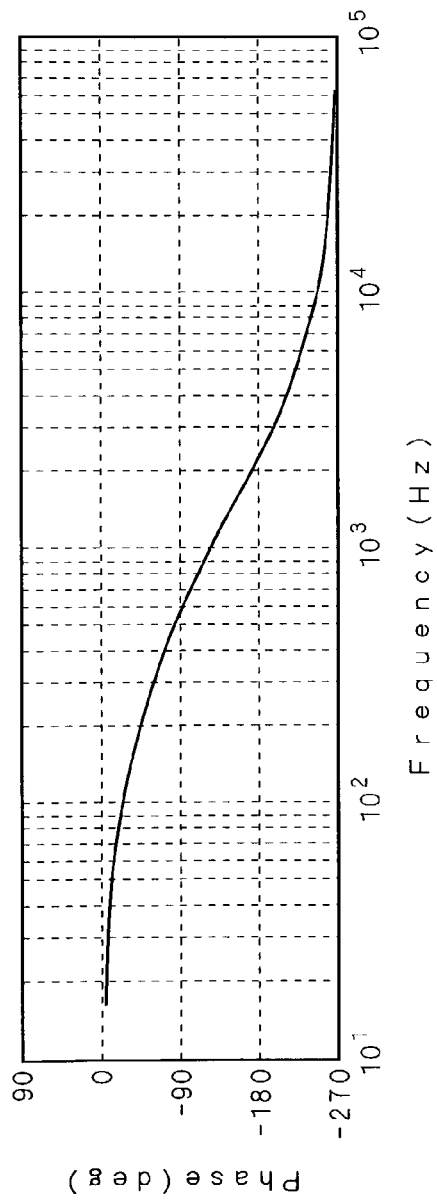

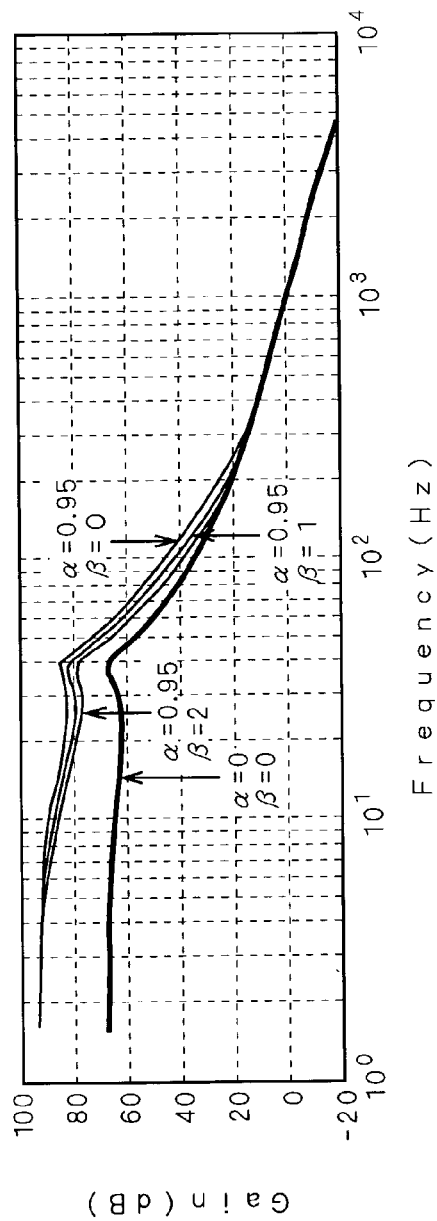
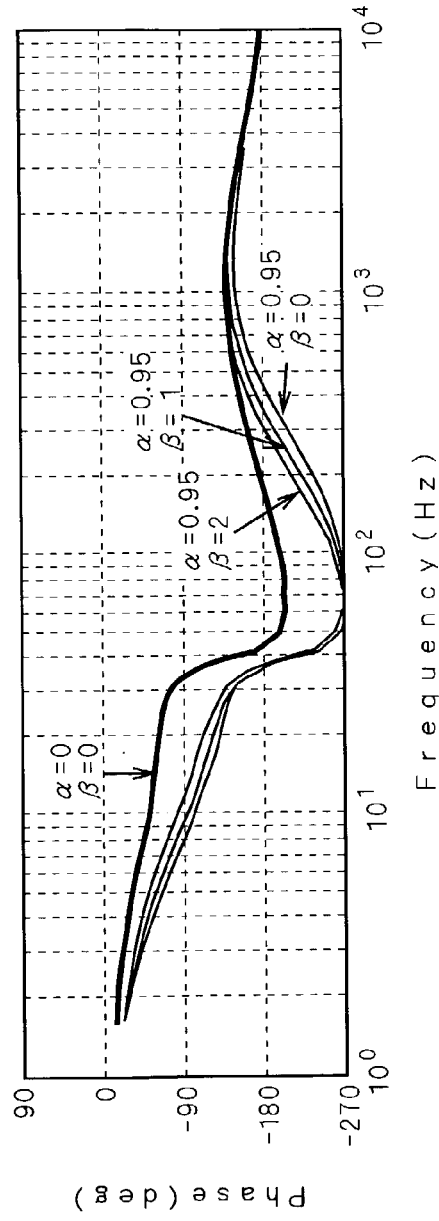

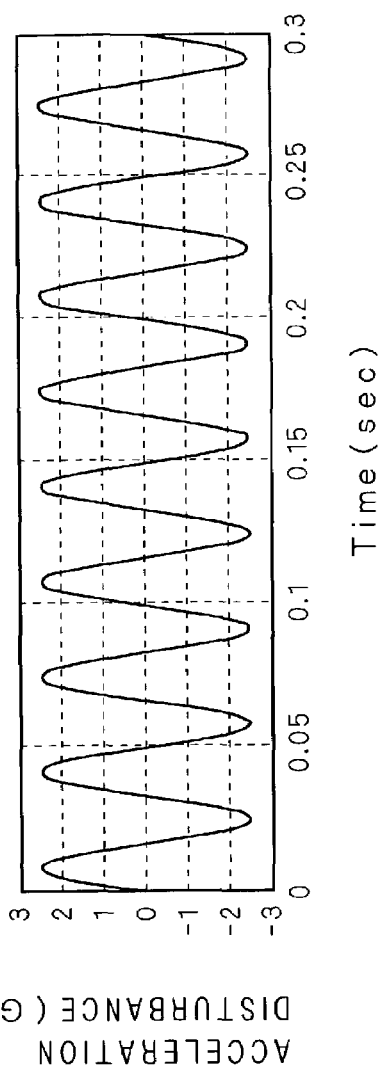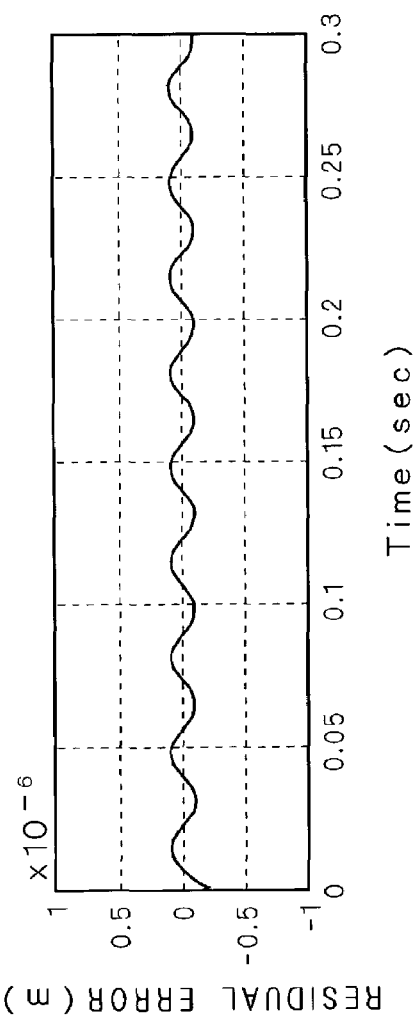

F I G . 36A
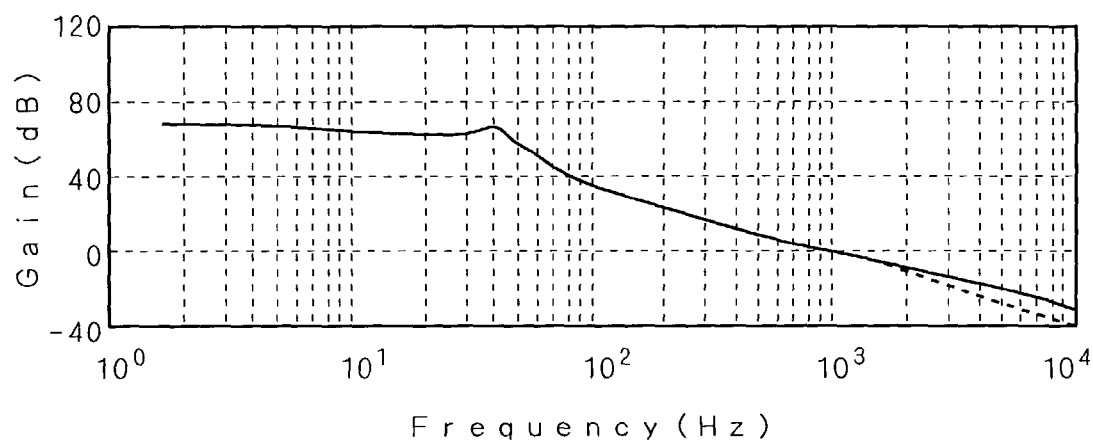
F I G . 36B
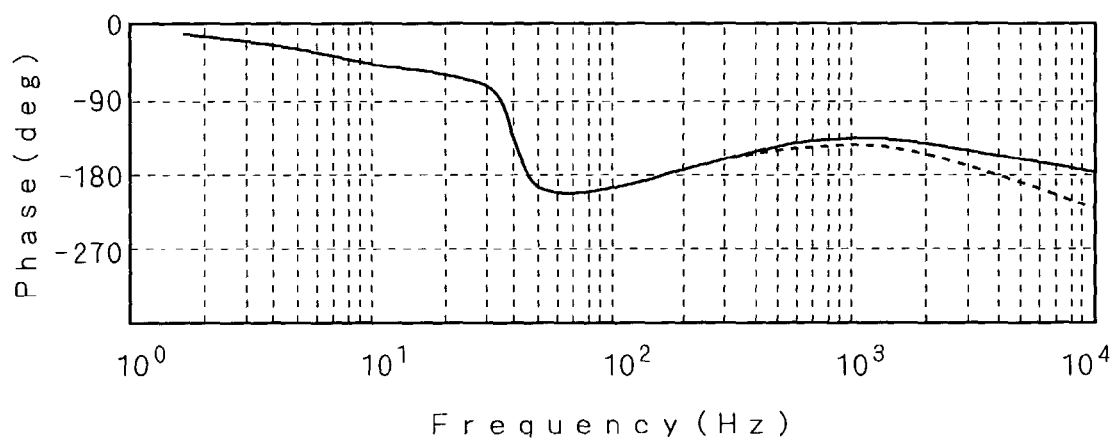

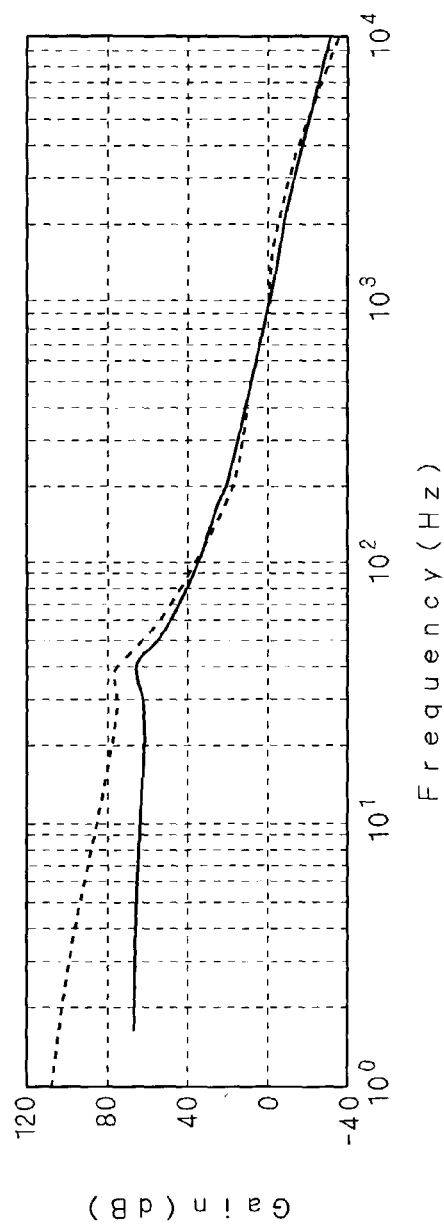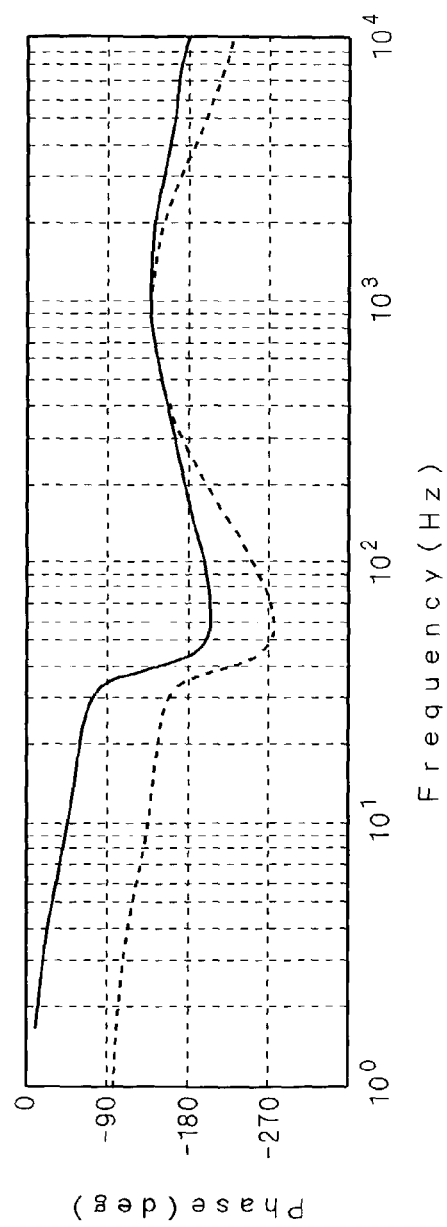

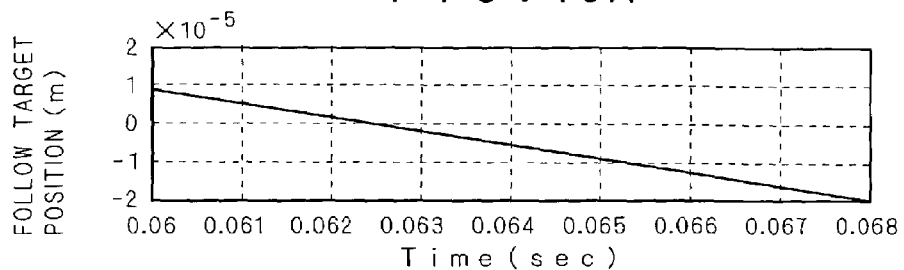
F I G . 40A
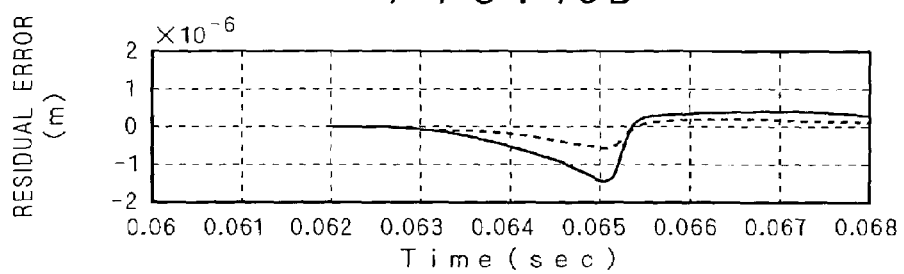
F I G . 40B
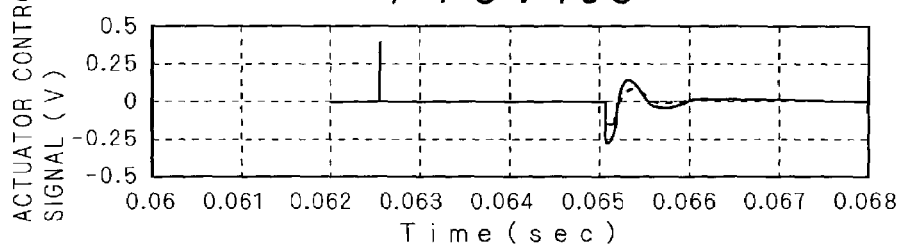
F I G . 40C
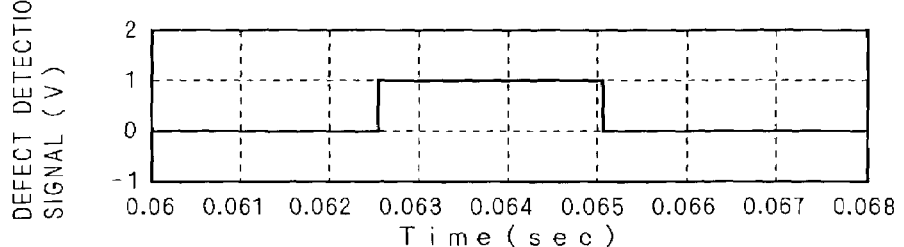
F I G . 40D
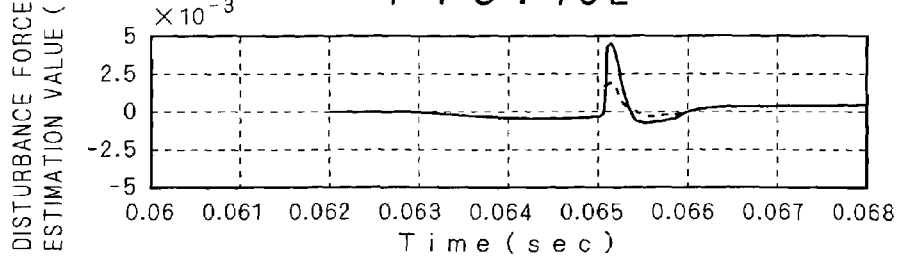
F I G . 40E

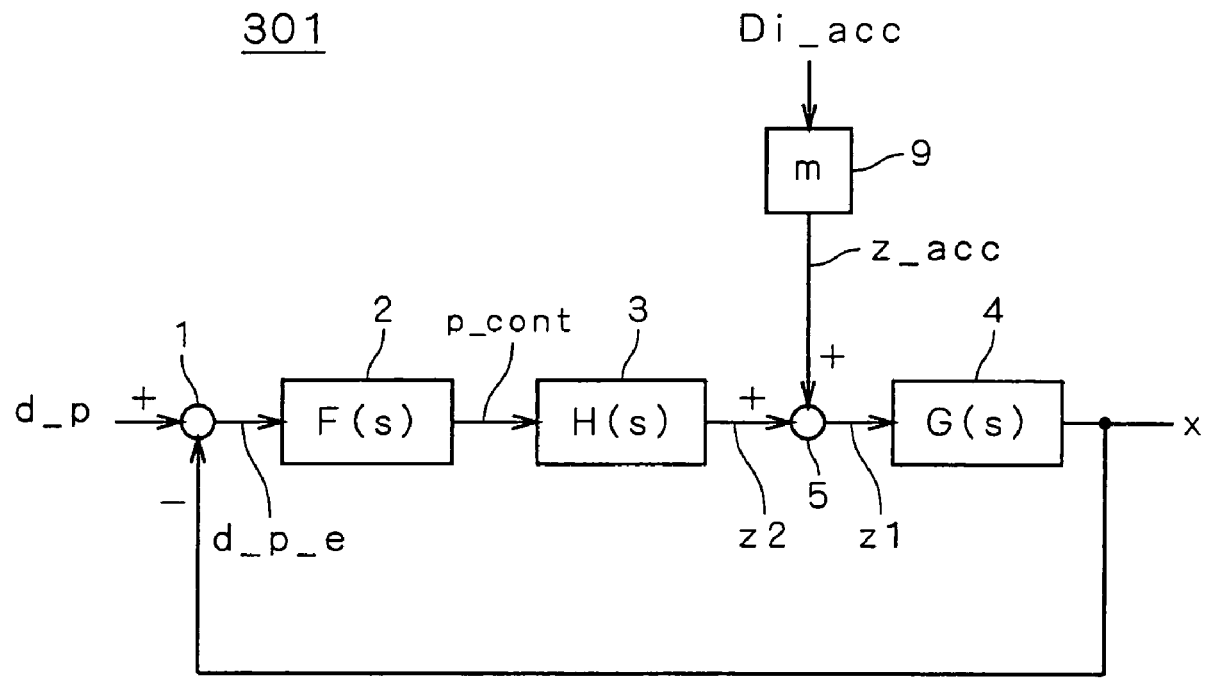
F I G . 4 3 *(Background Art)*

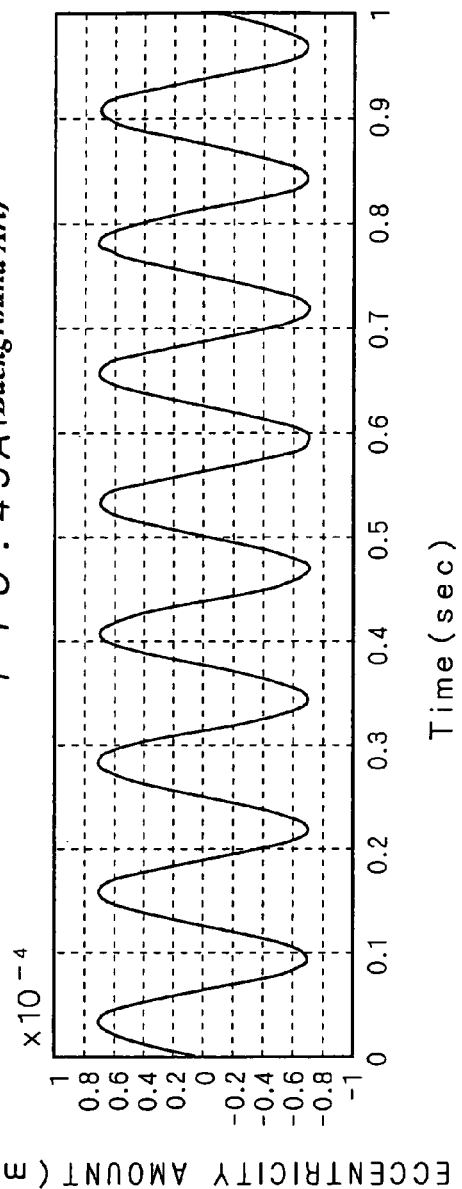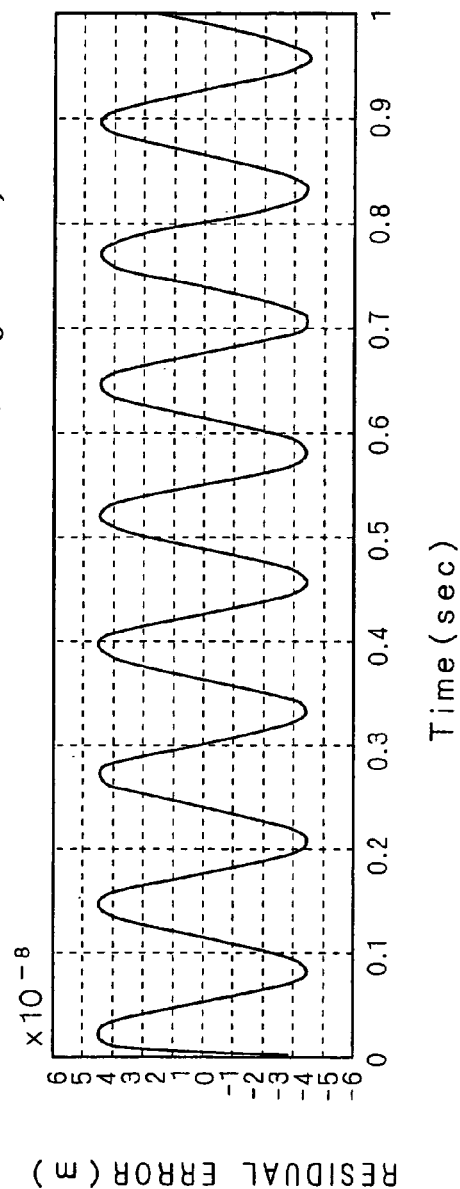

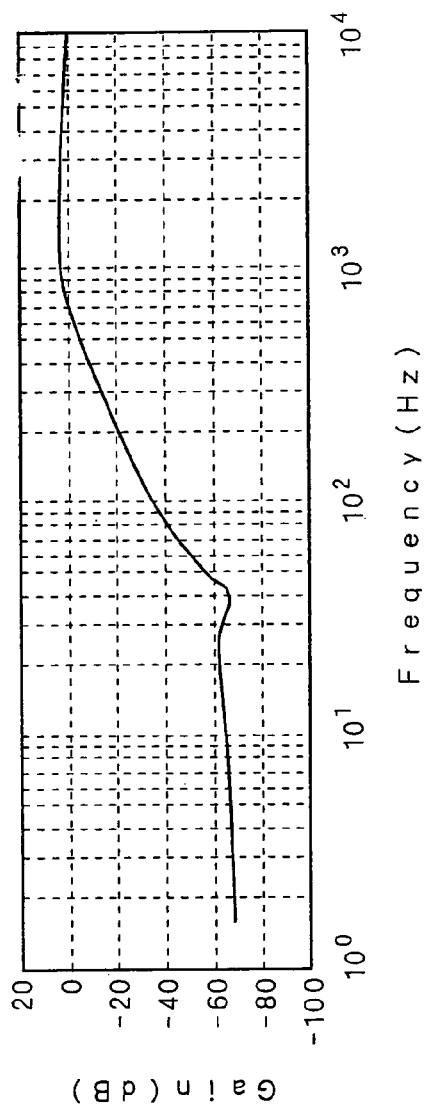
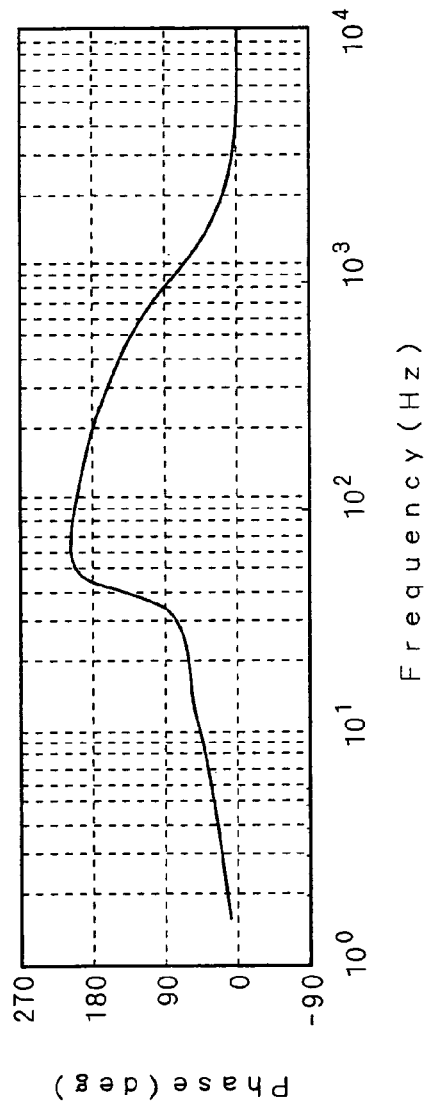
FIG. 46A (Background Art)
FIG. 46B (Background Art)

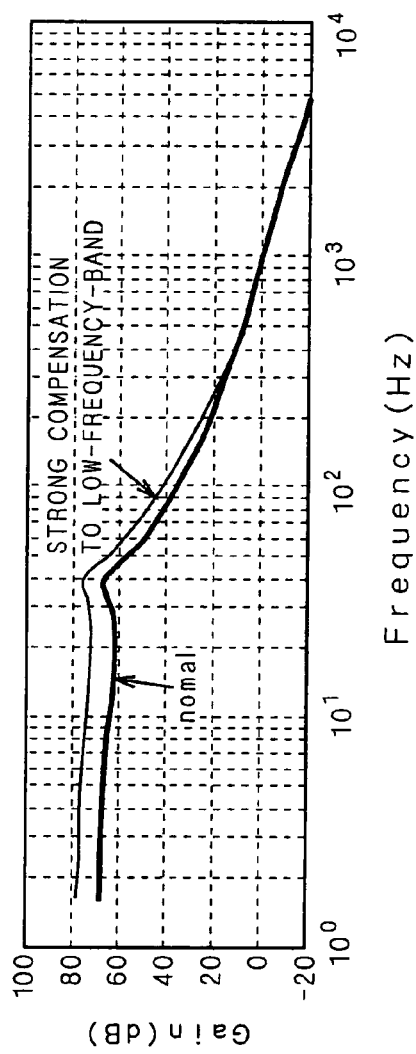
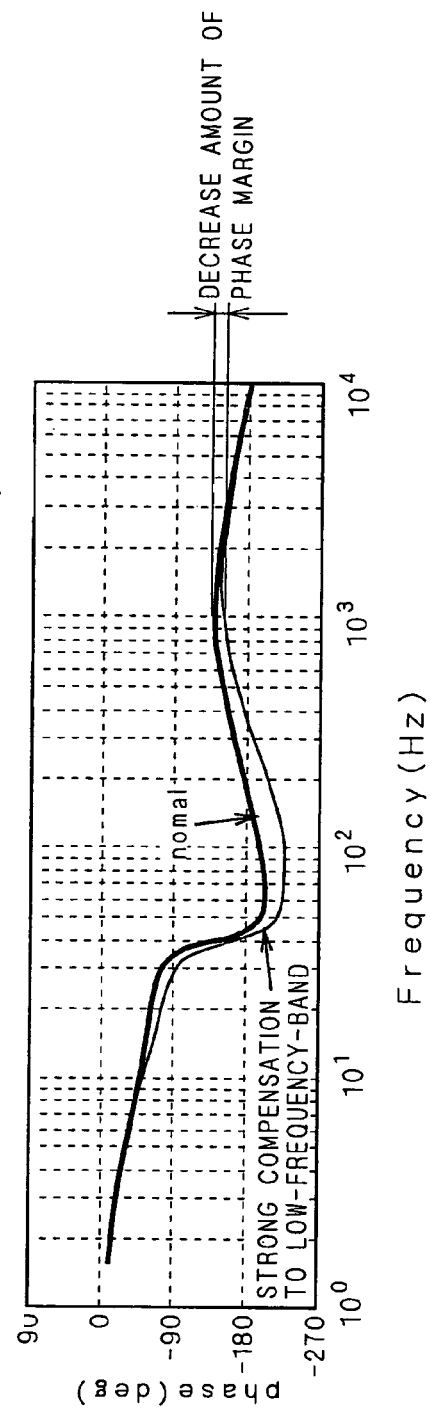
FIG.49A (Background Art)
FIG.49B (Background Art)

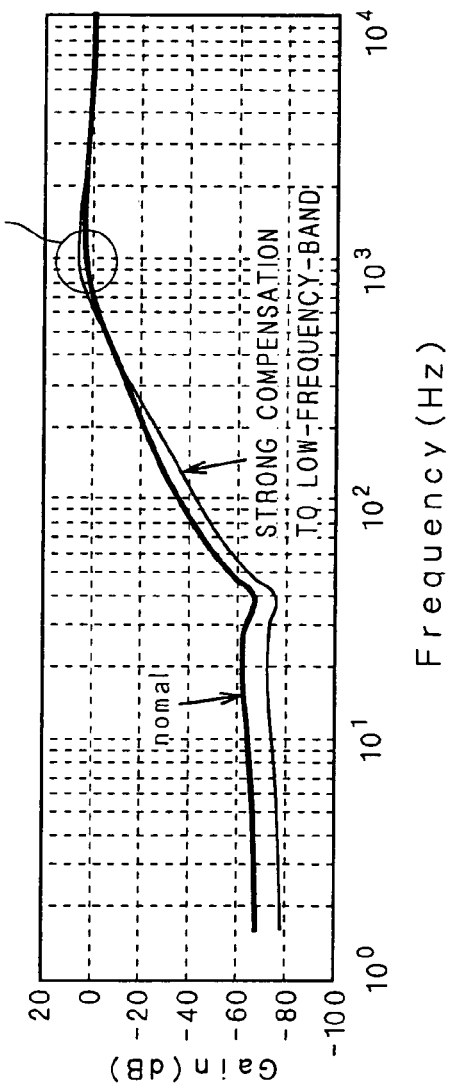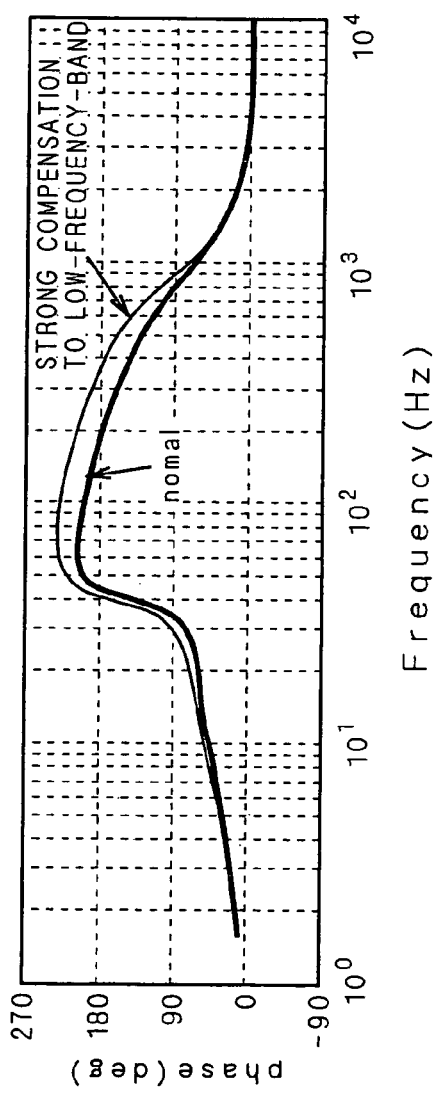
FIG. 50A (Background Art)
FIG. 50B (Background Art)

POSITION CONTROL METHOD

BACKGROUND OF THE INVENTION

1. Field of the Invention

The present invention relates to follow-up control. The present invention can be applied to, for example, a control system for performing a focusing control or a tracking control of a light spot in an optical disk drive.

2. Description of the Background Art

First, the focusing or tracking control in a general optical disk drive will be briefly described. An optical disk is chucked by a spindle motor, and the rotation of the spindle motor is controlled so that the optical disk rotates at a predetermined linear velocity.

To realize accurate recording and reproduction in an optical disk drive, a light spot from an optical pickup has to be converged and positioned with high precision onto a recording track spirally formed in the face of an optical disk. Since it is difficult to make an axis of a center hole of an optical disk and the rotary axis of a spindle motor perfectly coincide with each other, an eccentricity of hundreds μm occurs in the rotation of the optical disk. In relation to mechanical machinery precision of the surface of an optical disk, an face runout of hundreds μm occurs in the rotation of an optical disk. In some cases, physical distortions peculiar to an optical disk, such as eccentricity and runout are generically referred to as a "disk physical distortion" hereinafter.

When eccentricity occurs in rotation of an optical disk, recording tracks of the optical disk meander. Consequently, it is necessary to perform a tracking control for following a recording track. It is also necessary to perform a focusing control for making a light spot follow and converge to a recording track in accordance with a runout which occurs in association with rotation of an optical disk. The position control in this specification is a concept including both the tracking and focusing controls. Such a position control can be realized by following the position of a movable part of an actuator to which an objective lens is attached.

A1. First Conventional Art

FIG. 43 is a block diagram showing the configuration of a conventional control system 301 for controlling a position to be controlled, which is, for example, a position control system for performing a focusing or tracking control on a light spot in a vehicle-mounted or portable optical disk drive.

In the control system 301, a position x to be controlled follows a follow target position d_p. A subtracter 1 subtracts the position x to be controlled from the follow target position d_p to thereby obtain a position error d_p_e. A control for converging the position error d_p_e on almost zero is performed. For example, the position x to be controlled is set to zero at a mechanical midpoint.

In the case where the control system 301 is applied to an optical disk drive, there is no means for directly detecting each of the position x to be detected and the follow target position d_p. By electrically computing a signal detected by optical means of an optical pickup, the position error d_p_e is just obtained as an electrical signal. An actuator is not usually provided with a sensor for detecting the speed. Therefore, a unity feedback system in which the position x to be controlled and the follow target position d_p are inputted to the schematically-shown subtracter 1 is constructed.

A phase compensating block 2 performs phase compensation on the position error d_p_e to thereby obtain a position control signal p_cont. The position control signal p_cont is an electrical amount which is, for example, a voltage. A electricity-to-force converting block 3 converts the position control signal p_cont to a force and outputs a position control force z2. To an actuator for supplying the position x to be controlled, not only the position control force z2 but also an acceleration disturbance force z_acc based on an acceleration disturbance Di_acc to be added to the object to be controlled are also added. This addition is expressed by an adder 5. Generation of the acceleration disturbance force z_acc is expressed by a multiplier 9 for multiplying the acceleration disturbance Di_acc with a mass "m" of the object to be controlled.

An output from the adder 5, that is, a result of addition of the acceleration disturbance force z_acc and the position control force z2 is supplied as an external force z1 to an actuator mechanism block 4. The actuator mechanism block 4 converts the external force z1 to the position x to be controlled. In other words, the position x to be controlled is the position of the movable part of the actuator when the external force z1 is applied to the actuator.

The position x to be controlled is, for example, the position of the movable part of the actuator of an optical pickup in an optical disk drive. The follow target position d_p is a target value of the position x to be controlled, that is, a target value of the position of the movable part of the actuator. If the control system 301 is, for example, a control system for performing a focusing control, the position error d_p_e is a so-called "focus error signal". If the control system 301 is, for example, a control system for performing a tracking control, the position error d_p_e is a so-called "track error signal".

The phase compensating block 2 performs phase compensation on the position error d_p_e on the basis of a phase compensation characteristic F(s). The phase compensation characteristic F(s) is a characteristic including a stabilization compensation for assuring a phase margin by advancing a phase around the crossover frequency of the control system 301 and a low-bandwidth compensation characteristic for partly increasing a gain in a bandwidth lower than the crossover frequency. By performing the stabilization and low-bandwidth compensation, the position control signal p_cont is obtained.

A electricity-to-force converting characteristic H(s) corresponds to the characteristic of the electricity-to-force converting block 3 and is defined as a characteristic including a driver gain and a current-to-force characteristic indicative of the relation between a current and a force in a driving magnetic circuit of the actuator.

An actuator mechanism characteristic G(s) corresponds to the characteristic of the actuator mechanism block 4 and is expressed by, for example, a secondary system. Concretely, in an actuator expressed by a model using a mass, a spring, and a dashpot, the characteristic indicates the relation between a force applied to the actuator and the position of the movable part of the actuator.

FIGS. 44A and 44B are graphs showing an example of open-loop characteristic in the control system 301. FIG. 44A shows a gain characteristic, and FIG. 44B shows a phase characteristic. As shown in FIGS. 44A and 44B, the gain at 8 Hz or lower which is around the maximum rotation frequency of a CD player is increased and, further, the phase of a bandwidth around the crossover frequency (1 kHz) at which the gain is 0 dB is advanced, thereby assuring a predetermined phase margin.

Open-loop characteristic in the case of applying the control system 301 to a CD player is subjected to loop shaping so that a gain of 60 dB or higher in a low bandwidth, a control bandwidth of 1k to 3 kHz, a phase margin of 40 to 60 degrees, and a gain margin of 10 to 20 dB can be assured. The open-loop characteristic can be realized by properly designing the actuator mechanism characteristic G(s) and the phase compensation characteristic F(s).

FIGS. 45A and 45B are graphs showing the operation of the control system 301 for performing the tracking control, having the open-loop characteristic illustrated in FIGS. 44A and 44B. A case where the acceleration disturbance Di_acc is not added to a control target, that is, a case where Di_acc=0 is shown. FIG. 45A shows a state of a change in a follow target position d_p, that is an eccentricity amount of an optical disk. It is assumed here that the follow target position d_p changes at 8 Hz around the maximum rotation frequency of a CD player, and an amplitude is 140 μmpp of a specification limit. That is, FIG. 45A shows a value of the follow target position d_p when a CD player operates under the worst conditions.

FIG. 45B shows a state of a change in the position error d_p_e in the case where the follow target position d_p changes as shown in FIG. 45A, that is, a value in the case where the control system 301 is in a steady state. Hereinafter, the position error d_p_e at the time the control system enters in the steady state will be called a "residual error".

As shown in FIGS. 45A and 45B, even in the case where a CD player operates under the worst conditions, if the influence of the acceleration disturbance Di_acc can be ignored, the residual error can be suppressed up to about 0.09 μmpp. Generally, when the residual error becomes equal to or larger than 0.1 μmpp, a reproduction signal deteriorates. If the control system 301 has the open-loop characteristic shown in FIGS. 44A and 44B, the reproduction signal does not deteriorate even under the worst conditions, so that normal reproduction can be assured.

In reality, however, vibration or the like is applied to a vehicle-mounted or portable optical disk drive. For example, to a portable computer-mounted ODD device, a portable CD player, and a portable MD player, external vibration created by carriage by the user or external vibration created when the device is attached to a vehicle, a table, or the like is applied to the actuator of an optical pickup.

As shown in FIG. 43, not only the position control force z2 but also the acceleration disturbance force z_acc based on the acceleration disturbance Di_acc are inputted to the actuator mechanism block 4. An influence of the acceleration disturbance Di_acc is exerted, and the position x to be controlled is largely deviated from the follow target position d_p and, as a result, the position error d_p_e increases.

FIGS. 46A and 46B are graphs showing the sensitivity characteristic of the control system 301 having the open-loop characteristic illustrated in FIGS. 44A and 44B. FIG. 46A shows the gain characteristic, and FIG. 46B illustrates the phase characteristic.

FIGS. 47A and 47B are graphs showing the operation of the control system 301 having the open-loop characteristic illustrated in FIGS. 44A and 44B. FIG. 47A shows the waveform of the acceleration disturbance Di_acc having a frequency of 30 Hz and an amplitude of 5 Gpp. FIG. 47B shows a residual error occurring when the acceleration disturbance Di_acc illustrated in FIG. 47A is given. In the graphs, the follow target position d_p is set to zero.

When the acceleration disturbance Di_acc is given to the control system 301, as shown in FIG. 47B, the residual error becomes 1.5 μmpp. Such a magnitude of the residual error causes deterioration in a reproduction signal of an optical disk, and a data error rate of information reading increases. In the case where the optical disk drive is a recorder, due to an influence of the acceleration disturbance Di_acc, information may not be properly recorded.

A2. Second Conventional Art

In an actual optical disk drive, there is a case that an optical disk having a defect such as a blemish or dirt is reproduced or recorded.

In a region where a defect occurs (hereinafter, provisionally referred to as a "defective region") in the surface of an optical disk, light is not normally reflected by the disk and optical information is lacked. When the follow-up control using the position error d_p_e is performed in the defective region, the actual difference between the position x to be controlled and the target value d_p becomes large, and a problem such that a focus error occurs in the focusing control and retracing to a neighboring track in the tracking control occurs.

To deal with such a problem, it is desirable to configure a control system by using a function (hereinafter, provisionally referred to as a "defect compensating function") enabling a position control to be performed continuously even after actuator shifts from a region where no defect occurs (hereinafter, provisionally referred to as a "defect-free region") to the defective region.

FIG. 48 is a block diagram showing the configuration of the conventional control system 302 having such a defect compensating function. The control system 302 can be employed as a position control system for performing a light spot focusing or tracking control in an optical disk drive.

As shown in FIG. 48, the control system 302 has a configuration such that a problem preventing block 103 for obtaining a defect compensating function is interposed between the phase compensating block 2 of the control system 301 and the electricity-to-force converting block 3.

The problem preventing block 103 has a selector 102 and first and second paths selected by the selector 102. The selector 102 outputs a signal sent via the first or second path as an actuator control signal cont in accordance with a first event or a second event complementary to the first event. In the control system 302, different from the control system 301, the actuator control signal cont inputted to the electricity-to-force converting block 3 does not always coincide with a position control signal p_cont.

The first and second events correspond to, for example, a state where the actuator encounters the defect-free region and a state where the actuator encounters the defect region, respectively. The first and second events are identified by a defect detection signal DEFECT separately supplied and correspond to, for example, signal levels "L" and "H" of the defect detection signal DEFECT, respectively.

The defect detection signal DEFECT goes high "H" or low "L" in accordance with whether the actuator encounters the defect region (this period is provisionally referred to as a "defect period") or the defect-free region (this period is provisionally referred to as a "defect-free period"). The defect detection signal DEFECT is generated, for example, on the basis of an amount of light reflected by the disk.

Via the first path, the position control signal p_cont outputted from the phase compensating block 2 is inputted as it is to the selector 102. The second path is provided with a low-pass filter 100 and a sample and hold circuit 101. The low-pass filter 100 extracts and outputs low-frequency components including disk rotation frequency from the position control signal p_cont. An output of the low-pass filter 100 is supplied to the sample and hold circuit 101. The sample and hold circuit 101 performs the sample and hold operation at a timing when the signal level of the defect detection signal DEFECT changes from "L" to "H".

When the actuator encounters the defect-free region, the first path is selected. Also in the control system 302, in a manner similar to the control system 301, the position control signal p_cont is substantially inputted to the electricity-to-force conversion block 3. However, when the actuator encounters the defect region, the second path is selected. In the control system 302, therefore, the position control signal p_cont at the time of transition from the first event to the second event just before the present second event starts, that is, at the time of transition from the defect-free region to the defect region (hereinafter, provisionally referred to as "entrance of a defect") is inputted as the actuator control signal cont to the electricity-to-force converting block 3. Moreover, from the position control signal p_cont, the low frequency components are extracted as described above.

Since an input of the sample and hold circuit 101 is an output of the low-pass filter 100, the position control signal p_cont without the influence of high-frequency noise added can be sampled and held. An output of such a sample and hold circuit 101 is, so to speak, an average value of the position control signals p_cont in the defect-free region and can be regarded as a disk physical distortion correction signal for correcting a physical distortion of a disk. By employing the disk physical distortion correction signal as the actuator control signal cont in the defect region, the continuity of inputs to the electricity-to-force converting block 3 is achieved and the defect compensating function is realized.

As described above, as the technique using the low frequency components of an output of the phase compensating block in the defect-free period, for example, a technique disclosed in Japanese Patent Application Laid-Open No. 11-250478 can be used.

To realize stable and reliable defect compensation, it is a necessary condition that leading to a phase control loop is normally done at the point of transition from the defect region to the defect-free region (hereinafter, provisionally referred to as an "exit of a defect").

Conditions of normally leading to the position control loop are that the position error d_p_e at the leading operation is around zero, and the difference between a time differential x' of the position x to be controlled indicative of the speed of a control target and a time differential d_p' of the follow target position d_p indicative of the follow target speed of the control target is close to zero.

The two conditions denote that the difference between the follow target position d_p and the position x to be controlled is maintained to be not large even in the defect period. To realize it, also in the defect period in which the position error d_p_e is missing, it is necessary to properly generate a signal driving the control target, specifically, the actuator control signal cont to be inputted to the electricity-to-force converting block 3, as if the control in the defect-free region is performed.

B1. Problems of the First Conventional Art

To solve the problems of the first conventional art, for example, the low-frequency bandwidth compensation characteristic of the phase compensating block 2 may be set to a wide bandwidth. FIGS. 49A and 49B show, in the control system 301, open-loop characteristic in the case of strongly compensating the low bandwidth as compared with the open-loop characteristic (indicated as "normal" in the drawing) shown in FIGS. 44A and 44B. FIG. 49A shows a gain characteristic, and FIG. 49B shows a phase characteristic.

In the case of strongly compensating the low bandwidth, the sensitivity characteristic of the control system 301 is as expressed by graphs of FIGS. 50A and 50B. FIG. 50A shows a gain characteristic, and FIG. 50B shows a phase characteristic. The sensitivity characteristic shown in FIGS. 46A and 46B is indicated as "normal" in FIGS. 50A and 50B.

In a frequency band in which the gain increases in the open-loop characteristic as shown in FIG. 49A, the sensitivity characteristic can be lowered as shown in FIG. 50A. However, as shown by a portion A in FIG. 50A, there is a problem such that the gain characteristic is raised near the crossover frequency. Further, as shown in FIG. 49b, a phase margin decreases. Consequently, when the low frequency band compensation is performed strong, stability of the position control deteriorates, and a problem such that the position x to be controlled oscillates easily.

In association with the low-frequency compensation, to solve a problem caused by strong compensating the low-frequency band of the control system, it is sufficient to add a stabilization compensator for advancing a phase in the phase compensating block 2. For example, the order of the phase compensation characteristic F(s) is increased. In an actual control system, in many cases, the phase compensation block 2 is formed in an LSI and defined by a filter of a predetermined order, and design tolerance is low. It is therefore difficult to arbitrarily increase the order of the phase compensation characteristic F(s).

B2. Problems of Second Conventional Art

The second conventional art is a technique effective when a disk physical distortion amount is small. However, it is feared that a problem occurs when the disk physical distortion amount is equal to or larger than a specification limitation of a disk. The problem will be described hereinafter.

The follow target position d_p which changes according to a disk physical distortion has a sine-wave-shaped periodic pattern synchronized with rotation of the disk. To make the position x to be controlled follow the follow target position d_p, the waveform of the actuator control signal cont also has a periodic waveform pattern of a sine wave shape synchronized with rotation of the disk. When the disk physical distortion becomes large, the amplitude of the periodic waveform pattern of the actuator control signal cont becomes large.

On the other hand, the actuator control signal cont becomes a constant value during the defect period, so that the actuator control signal cont shifts from the predetermined value to the periodic waveform pattern at the exit of the defect. In theory, therefore, before and after the defect exit, values of the actuator control signal cont do not coincide with each other. The larger the amplitude of the periodic waveform pattern of the actuator control signal cont during the defect free period is, the larger the mismatch becomes.

Since the sensitivity of a change in the position x to be controlled to the actuator control signal cont is determined by the electricity-to-force converting block 3 and the actuator mechanism block 4, the larger the mismatch before and after the defect end of the actuator control signal cont is, the larger the position error at the exit of the defect becomes.

When the increased position error exceeds a dynamic range of the position control in the control system 302, a problem such as a focus error in the case of the focusing control or pull-in to a neighboring track in the tracking control occurs.

The problem will be described concretely by using an analysis result by a simulation. The case of applying the control system to tracking control of a CD player will be described as an example. FIGS. 51A to 51D are graphs showing operation of the tracking control performed by the control system 302 and results of analysis made on assumption that a CD disk having an eccentricity amount of ±70 μm is used and a portion of the radius of 24 mm as the innermost part of a region in which recording tracks of a disk are formed is reproduced at a linear velocity of 1.2 m/s. The length of the defect region is assumed to be 3 mm. In an actual CD disk, however, the length of the defect region hardly exceeds 3 mm.

FIG. 51A show a change with time in the follow target position d_p, which corresponds to the eccentricity amount of the disk. In the simulation, the eccentricity pattern indicative of the eccentricity amount of the disk has a sine wave having an amplitude of ±70 μm and a frequency of about 8 Hz. In order to perform a simulation under the worst conditions, a case that a defect region exists in a position where the speed of the follow target becomes the highest, that is, near the point at which an eccentricity pattern of a sine wave shape crosses zero is assumed. In FIG. 51A, the time base around the zero cross of the downward pattern is enlarged, so that the eccentricity pattern has a linear waveform which descends to the right.

FIG. 51B shows the waveform of a residual error, FIG. 51C shows the waveform of the actuator control signal cont, and FIG. 51D shows the waveform of the defect detection signal DEFECT. As shown in FIG. 51D, the defect period starts around time at which the eccentricity pattern shown in FIG. 51A crosses zero, and the defect period is about 2.5 msec. It is understood from FIG. 51C that, during the defect detection signal DEFECT is at the "H" level, the actuator control signal cont is constant and the position control signal p_cont just before the entrance of a defect is held. The reason why the actuator control signal cont increases slightly at the time corresponding to the entrance of the defect is that the actuator control signal cont at the time prior to the time corresponding to the entrance by a delay time in the low-pass filter 100 is held.

According to the second conventional art, as shown in FIG. 51B, the absolute value of the residual error in the defect period increases like a quadratic function and increases as the defect region becomes larger. In the example, the residual error at the exit of the defect is about 0.75 μm. Considering that the limit point of pulling the position to be controlled into a neighboring track is at a half track pitch 0.8 μm in a CD, the size of the residual error causes unstable defect compensation.

According to the second related art as described above, in the case where the disk physical distortion such as eccentricity is large, in other words, in the case where a change in the follow target position d_p is large, the residual error becomes large at the exit of the defect, and there is a first problem such that continuity of the control may deteriorate.

Further, an influence of noise component included in the actuator control signal cont exerted to the defect compensating operation in the second conventional art will be described. Generally, the position error d_p_e includes high-frequency observation noise as compared with the disk rotation frequency, so that noise is added also to the phase control signal p_cont as an output of the phase compensation block 2 to which the position error d_p_e is inputted. Consequently, noise is added also to the actuator control signal cont in the defect-free period. The amplitude of the noise depends on the amplitude of noise added to the position error d_p_e.

In the case where noise added to the actuator control signal cont is random noise, an influence is hardly exerted onto the position x to be controlled. As described above, the actuator mechanism characteristic G(s) functions as an integrator expressed by a secondary model using a mass, a spring, and a dashpot. Consequently, even random noise is added, an integral becomes zero in the steady state, and an influence of random noise is very small.

At the entrance of the defect, however, there is no guarantee that the integral of noise until then in the actuator mechanism block 4 is zero, and the integral may include a DC component. In the case where the integral of noise has a DC component, it is equivalent to the case that the DC component acts as a pulse-shaped disturbance on the actuator during the defect period. There is the possibility that such a phenomenon causes a error in the speed of the actuator and an increase of the position error d_p_e.

In recent years, the phase compensation block 2 is constructed by an LSI (large-scale integrated circuit) which operates at a predetermined sampling frequency. In many cases, a digital processing is executed on the inside of the phase compensation block 2. In this case, noise including the sampling frequency is added to the position control signal p_cont. When such noise is integrated in the actuator mechanism block 4, the integral becomes a DC component and, moreover, its length may become a few times as long as the sample period.

To clarify the problem, an analysis result of a simulation of the tracking control of a CD is shown in FIGS. 52A to 52D. The graphs of FIGS. 52A to 52D show, as an example of the case of applying the control system 302 to tracking control of a CD player, a result of analysis in the case where there is no disk eccentricity, the length of the defect region is 3 mm, and reproduction is performed at a linear velocity of 1.2 m/s. As an example, it is assumed that the phase compensation block 2 is constructed by a digital circuit operating at a sampling frequency of 80 kHz, the amplitude of noise is 0.4 V, the width of noise is 25 μsec (corresponding to two sampling periods), and noise is added just before the entrance of a defect. Analysis of the function of the defect compensation with respect to this case is equivalent to analysis of the function of the defect compensation with respect to the case a pulse obtained as an integral of noise is added to the actuator control signal cont. The pulse has, concretely, an amplitude of 0.4 V during the period of the two sampling periods until the rising edge of the defect detection signal DEFECT, that is, at 25 μsec.

FIG. 52A shows the follow target position d_p. In the simulation, the eccentricity amount of a disk with respect to the follow target position d_p is zero. FIG. 52B shows the waveform of a residual error, FIG. 52C shows the waveform of the actuator control signal cont, and FIG. 52D shows the waveform of the defect detection signal DEFECT. As shown in FIG. 52D, the length of the defect period is about 2.5 msec. As shown in FIG. 52C, during the defect detection signal DEFECT is at the "H" level, the actuator control signal cont holds the actuator control signal cont in the defect-free period, that is, zero as the value of the phase control signal p_cont.

As shown in FIG. 52B, the absolute value of the residual error in the defect period increases like a quadratic function and increases as the defect region becomes larger. In the example, the residual error at the exit of the defect is about 5 µm, which is a value far exceeding the half track pitch of 0.8 µm in a CD as a limit point of pulling the position of the control target to a neighboring track, so that defect compensation becomes unstable.

According to the second conventional art as described above, the residual error at the exit of the defect increases due to noise added to the actuator control signal cont, and there is a second problem such that continuity of the control may be lost.

SUMMARY OF THE INVENTION

One feature of an embodiment of the present invention is to reduce sensitivity to an acceleration disturbance such as vibration while maintaining stability of a system.

An embodiment of present invention provides a following control method for follow-up control making a position of a movable part of an actuator follow a target value, having a feature that an estimation value of a disturbance force is fed back to a electricity-to-force conversion characteristic of the actuator. The disturbance force is defined by an amount obtained by subtracting a product of the target value and a characteristic opposite to a mechanism characteristic of the actuator from a product of an acceleration disturbance acting on the movable part and a mass of the movable part.

By introducing a concept of the disturbance force and regarding a target value as a disturbance, a control system for following a target value which is zero and of which control target is a zero follow position that can be observed can be assumed. In such a system, a disturbance observer as an observer of an enlarged system which defines a disturbance force as a state quantity can be constructed. Since an estimation value of the disturbance force can be obtained by the disturbance observer, it is fed back to the electricity-to-force conversion characteristic to suppress sensitivity to the disturbance force. The disturbance force includes information of not only the acceleration disturbance but also the follow target position. Therefore, even when a disk physical distortion exists, by suppressing an influence of the disturbance force, sensitivity to the acceleration given as a disturbance to the actuator can be made low.

These and other features, and advantages of various embodiments of the present invention will become more apparent from the following detailed description when taken in conjunction with the accompanying drawings.

BRIEF DESCRIPTION OF THE DRAWINGS

FIG. 14 is a block diagram illustrating the configuration of an amplifier 27;

FIG. 15 is a block diagram illustrating the configuration of an amplifier 37;

FIGS. 16A and 16B are graphs showing a disturbance estimation characteristic of the disturbance observer 6;

FIGS. 17A and 17B are graphs showing open-loop characteristic of a control system 201;

FIGS. 20A and 20B are graphs showing the operation of the control system 201;

FIGS. 36A and 36B are graphs showing open-loop characteristic of a control system 207;

FIGS. 38A and 38B are graphs showing the open-loop characteristic of the control system 207;

FIGS. 40A to 40E are graphs showing an effect of the control system 207;

FIG. 43 is a block diagram showing the configuration of a control system 301 according to a first conventional art;

FIGS. 45A and 45B are graphs showing an operation of the control system 301;

FIGS. 46A and 46B are graphs showing the sensitivity characteristic of the control system 301;

FIGS. 49A and 49b are graphs showing open-loop characteristic of the control system 301;

FIGS. 50A and 50B are graphs showing the sensitivity characteristics of the control system 301;

DETAILED DESCRIPTION

C1. First Embodiment

Figure 1:
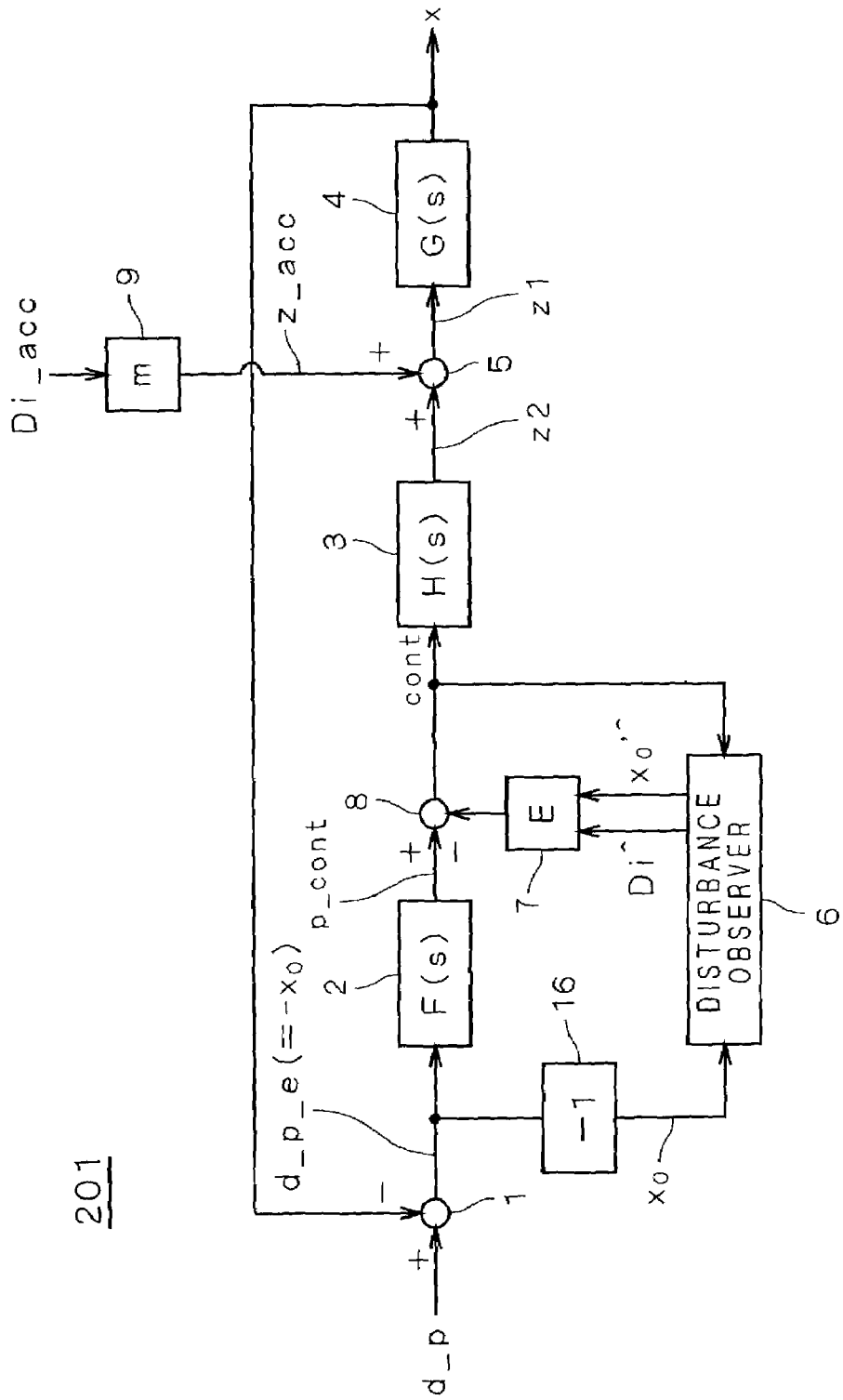
FIG. 1 is a block diagram showing the configuration of a control system 201 according to a first embodiment of the present invention.

FIG. 1 is a block diagram showing the configuration of a control system 201 according to a first embodiment. The control system 201 can be employed, for example, as a position control system for performing a light spot focusing or tracking control in a vehicle-mounted or portable optical disk drive.

The control system 201 has a configuration obtained by adding a feedback path having a disturbance observer 6, amplifiers 7 and 16, and a subtracter 8 to the conventional control system 301 shown in FIG. 43, thereby having an extension of a disturbance suppressing loop which will be described hereinafter.

First, a concept of adding the disturbance suppressing loop to the configuration obtained by performing equivalent conversion on the conventional control system 301 will be described. The method of obtaining the control system 201 by further performing equivalent conversion after that will be also described.

Figure 2:
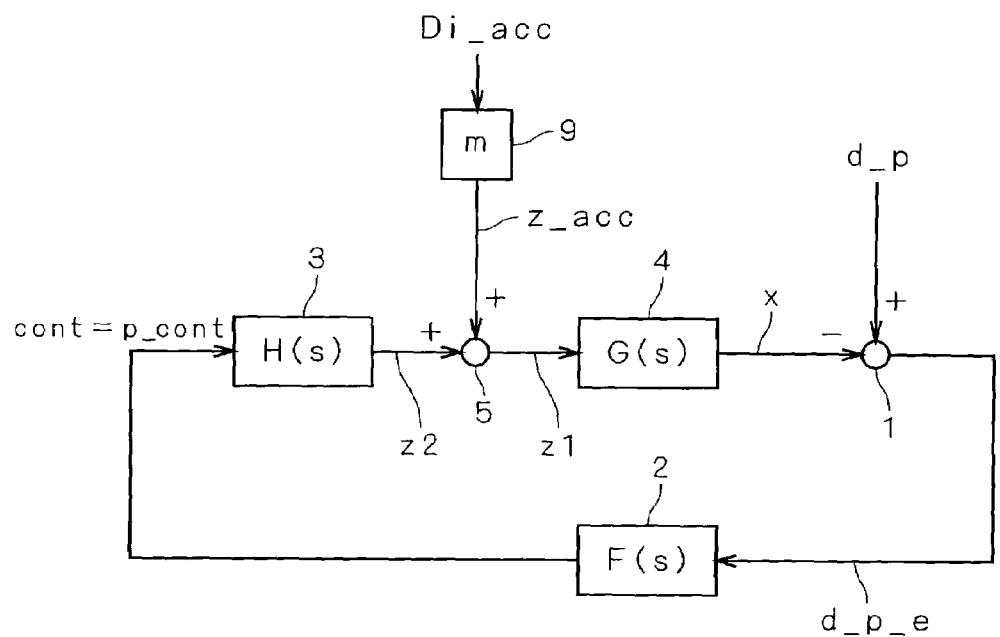
FIG. 2 is a block diagram showing a state where function blocks of a conventional control system 301 are rearranged.

FIG. 2 is a block diagram showing a state where the functional blocks of the conventional control system 301 are rearranged while maintaining the connection between the functional blocks. As the actuator control signal cont inputted to the electricity-to-force converting block 3, the position control signal p_cont outputted from the phase compensating block 2 is inputted.

Figure 3:
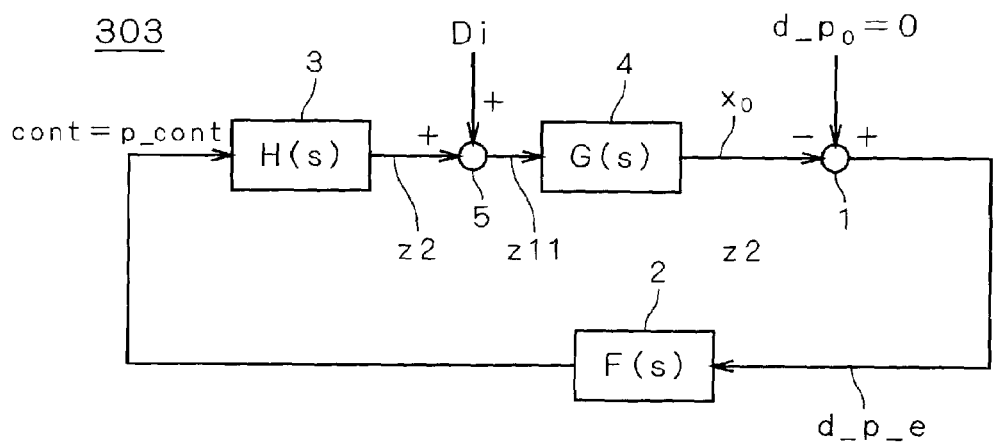
FIG. 3 is a block diagram showing the configuration of a control system 303.

FIG. 3 is a block diagram showing the configuration of a control system 303 obtained by performing equivalent conversion on the control system illustrated in FIG. 2. Simply speaking, equivalent conversion is performed so that the follow target position d_p employed for computation on the output side of the actuator mechanism block 4 is employed for computation on the input side of the actuator mechanism block 4. As a result, in place of the acceleration disturbance force z_acc, a newly defined disturbance force Di is inputted to the adder 5. An external force z11 is inputted to the actuator mechanism block 4.

Figure 4:
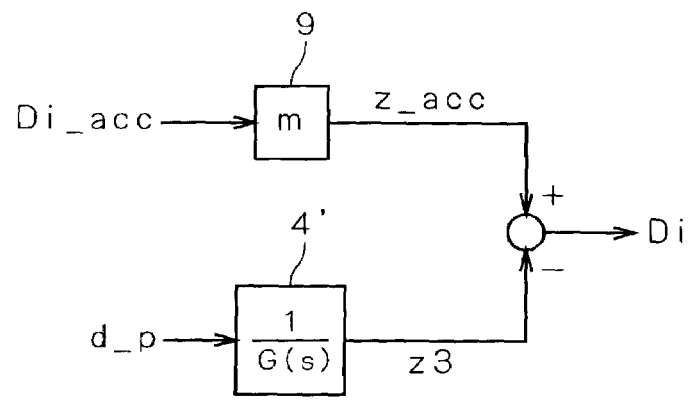
FIG. 4 is a diagram showing definition of a disturbance force.

FIG. 4 is a block diagram showing definition of the disturbance force Di. The disturbance force Di is defined as a value obtained by subtracting a position disturbance force z3 derived as a product of the follow target position d_p and 1/G(s) as a characteristic opposite to the actuator mechanism characteristic G(s) from the acceleration disturbance force z_acc as a product of the acceleration Di_acc acting on the movable part of the actuator and the mass "m" of the movable part.

That is, in the control system 303, the follow target position d_p changing according to a disk physical distortion is regarded as a disturbance as well as the acceleration disturbance Di_acc. As described above, in correspondence with that the follow target position d_p is regarded as a disturbance, the value of follow target in the control system 303 is newly grasped as zero. The newly-introduced position to be controlled is provisionally referred to as a zero follow position $x_0$, and the follow target is provisionally referred to as a zero follow target position $d\_p_0$. The value of the zero follow target position $d\_p_0$ is always zero.

As shown in FIG. 3, the adder 5 adds the position controlling force z2 and the disturbance force Di, and outputs the external force z11. The external force z11 is converted to the zero follow position $x_0$ by the actuator mechanism block 4.

The disturbance force Di is defined by a numerical expression as follows.

$$Di = m \cdot Di\_acc - \frac{d\_p}{G(s)} \quad (1)$$

The zero follow position $x_0$ is equal to a value obtained by changing the sign of the position error d_p_e and expressed by the following expression.

$$x_0 = -d\_p\_e = -d\_p + x \quad (2)$$

As described above, the position error d_p_e is a value which can be observed and, accordingly, the zero follow position $x_0$ is also a value which can be observed. Specifically, by introducing the concept of the disturbance force and newly regarding the follow target position d_p as a disturbance, the control system 303 which follows the zero follow target position $d\_p_0$ and, moreover, controls the observable zero follow position $x_0$ as a control target can be assumed. In the system, both the actuator control signal cont (equal to the position control signal p_cont in FIGS. 2 and 3) as a system manipulated variable and the zero follow position $x_0$ as one of state quantities of the control target can be observed, so that a disturbance observer as an observer of an enlarged system defining the disturbance force Di as a state quantity can be configured.

Figure 5:
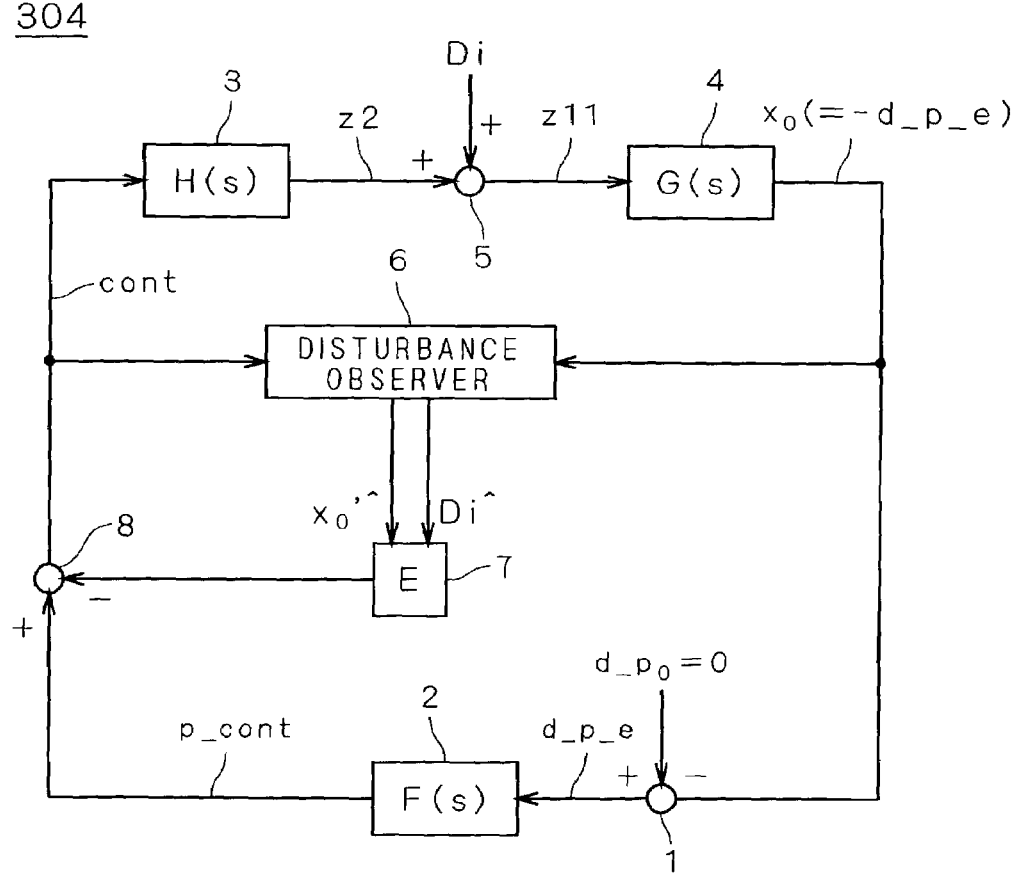
FIG. 5 is a block diagram showing the configuration of a control system 304.

FIG. 5 is a block diagram showing the configuration of a control system 304 obtained by adding a disturbance suppressing loop including the disturbance observer 6 to the control system 303. In the control system 304, to the electricity-to-force converting block 3, not the position control signal p_cont as an output of the phase compensating block 2, but the actuator control signal cont is inputted. The actuator control signal cont is a value obtained by subtracting the output of the amplifier 7 from the position control signal p_cont. This subtraction is executed by the subtracter 8.

The disturbance observer 6 outputs a disturbance force estimation value Dî and a speed estimation value $x_0'^{\wedge}$ on the basis of the zero follow position $x_0$ and the actuator control signal cont. The sign "^" denotes an estimation value of an amount indicated by the sign on its left side. The amplifier 7 multiplies each of the disturbance estimation value Di^ and the speed estimation value $x_0'$^ with a predetermined coefficient, obtains a sum of the resultant values, and outputs the sum.

Since the disturbance force Di acting on the control system 304 can be estimated by the disturbance force estimation value Di^, by feeding back the disturbance force estimation value Di^ to the electricity-to-force conversion characteristic H(s), the influence of the disturbance force Di can be suppressed. As shown by the expression (1), the disturbance force Di includes not only the acceleration disturbance Di_acc but also information of the follow target position d_p. Therefore, even in the case where a disk physical distortion exists, by suppressing the influence of the disturbance force Di, the sensitivity to the acceleration given as a disturbance to the actuator can be lowered.

A time differential x' of the position x to be controlled and a time differential $x_0'$ of the zero follow position $x_0$ have just different target values but are equal values. Hereinafter, the time differential x' of the position x to be controlled and the time differential $x_0'$ of the zero tracking position $x_0$ will be generically referred to as a speed $x_0'$.

Each of the function blocks will now be described in detail. The phase compensation characteristic F(s) indicative of the characteristic of the phase compensation block 2 is expressed by, for example, the following expression.

$$F(s) = F_1(s) F_2(s) G_F \quad (3)$$

$$F_1(s) = \frac{T_1 s + 1}{T_2 s + 1} \quad (4)$$

$$F_2(s) = \frac{T_3 s + 1}{T_4 s + 1} \quad (5)$$

F1(s) denotes a low-frequency-band compensation characteristic for partially increasing a gain in a band lower than the crossover frequency of the control system 304, F2(s) indicates a stabilization compensation characteristic for assuring a phase margin by advancing the phase around the crossover frequency, and $G_F$ indicates the gain. When a start frequency of a low-frequency-band compensation is f1, an end frequency of a low-frequency-band compensation is f2, a start frequency of a stabilization compensation is f3, and an end frequency of a stabilization compensation is f4, T1 to T4 are expressed by the following expressions.

$$T_1 = \frac{1}{2 f_1 \pi} \quad (6)$$

$$T_2 = \frac{1}{2 f_2 \pi} \quad (7)$$

$$T_3 = \frac{1}{2 f_3 \pi} \quad (8)$$

$$T_4 = \frac{1}{2 f_4 \pi} \quad (9)$$

The electricity-to-force conversion characteristic H(s) indicative of the characteristic of the electricity-to-force conversion block 3 is expressed by, for example, the following equation.

$$H(s) = \frac{Gd \cdot K\tau}{R + Ls} \quad (10)$$

where, R denotes a resistance value of an actuator drive coil in an actuator magnetic circuit in an optical pickup, L denotes an inductance of the actuator driving coil, $K_\tau$ indicates a current-to-force conversion coefficient in the actuator magnetic circuit, and Gd expresses a driver amplification factor in the actuator magnetic circuit. That is, in the electricity-to-force conversion block 3, by multiplying the actuator control signal cont with a coefficient Gd·Kτ/(R+Ls), the position control force z2 is obtained.

Figure 6:
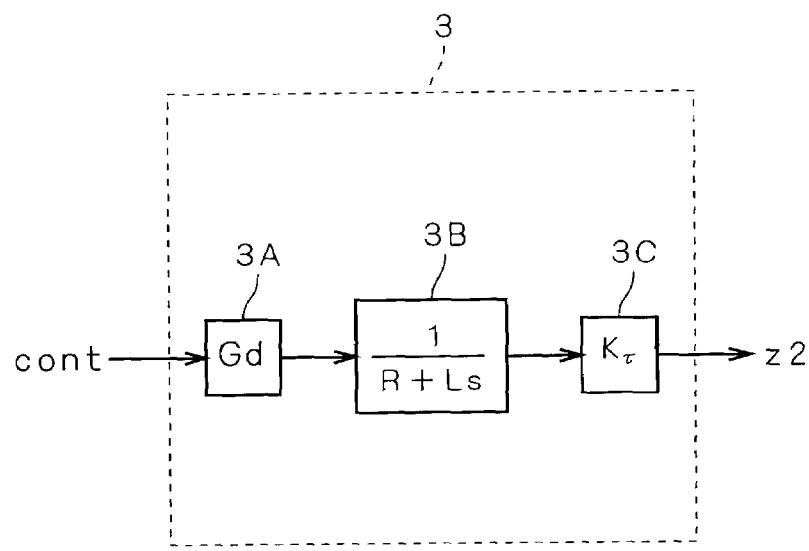
FIG. 6 is a block diagram showing a electricity-to-force converting block 3.

According to the expression (10), the electricity-to-force conversion block 3 is expressed by the block diagram of FIG. 6. Concretely, the electricity-to-force conversion block 3 can be expressed by a function block 3A expressing the driver amplification factor Gd in the actuator magnetic circuit of the optical pickup, a function block 3B expressing the impedance characteristic of the actuator magnetic circuit, and a function block 3C expressing the current-to-force conversion coefficient Kτ in the actuator magnetic circuit. The actuator control signal cont is multiplied by Gd by the function block 3A, an output of the function block 3A is multiplied by 1/(R+Ls) by the function block 3B, and an output of the function block 3B is multiplied by Kτ by the function block 3C, thereby obtaining the position control force z2. In the case where the inductance Ls of the actuator driving coil can be ignored, as an equation expressing the electricity-to-force conversion characteristic H(s), the following equation may be also employed.

$$H(s) = \frac{Gd \cdot K\tau}{R} \quad (11)$$

In the embodiment, for simplicity, the control system in the case where the equation (11) is employed as the electricity-to-force conversion characteristic H(s) will be described hereinafter.

The actuator mechanism characteristic G(s) indicative of the characteristic of the actuator mechanism block 4 expresses the relation between a force to be applied to the actuator and the position of the actuator. When the actuator as an object to be controlled is expressed by a model of a spring, a mass, and a damper and a mass "m", an elastic coefficient "k", and a viscosity coefficient "c" of the control target are introduced, the actuator mechanism characteristic G(s) is expressed by the following equation.

$$G(s) = \frac{1}{ms^2 + cs + k} \quad (12)$$

Figure 7:
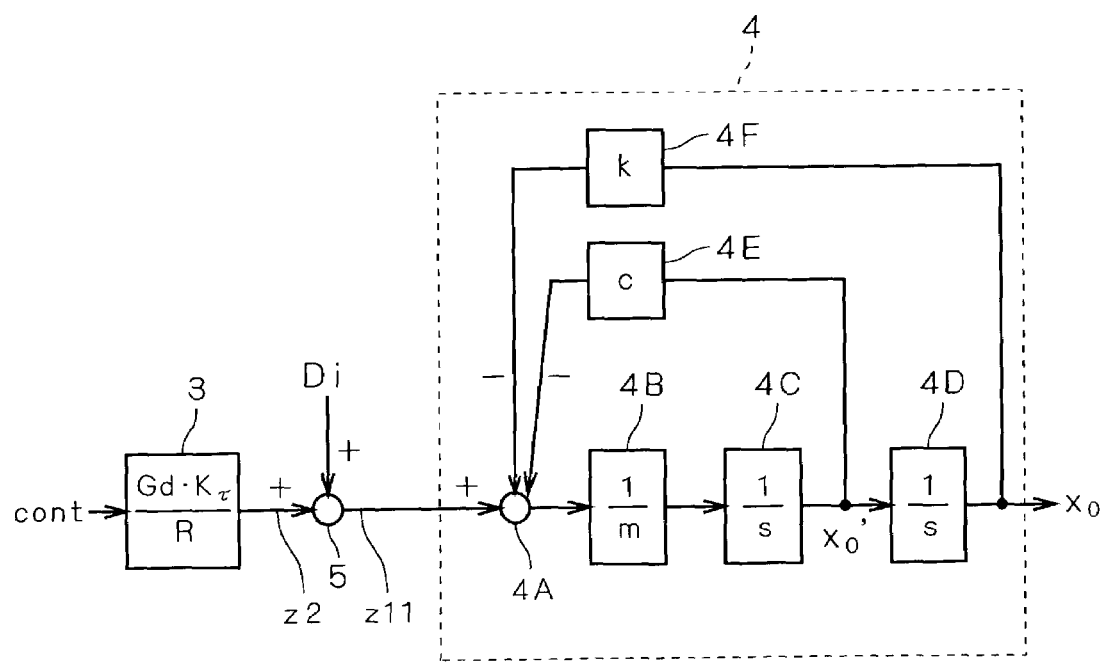
FIG. 7 is a block diagram showing the electricity-to-force converting block 3 and an actuator mechanism block 4.

FIG. 7 is a block diagram expressing the electricity-to-force conversion block 3 and the actuator mechanism block 4 illustrated in FIG. 5 by using the equations (11) and (12). The actuator mechanism block 4 can be expressed by a subtracter 4A, a function block 4B expressing an inverse of the mass m of the control target, integrators 4C and 4D, a function block 4E expressing the viscosity coefficient c, and a function block 4F expressing the elastic modulus k.

In the electricity-to-force conversion block 3, the actuator control signal cont is multiplied by Gd·Kτ/R, thereby obtaining the position control force z2. The adder 5 adds the position control force z2 and the disturbance force Di to obtain the external force z11. The subtracter 4A subtracts a value obtained by multiplying the zero follow position $x_0$ by k and a value obtained by multiplying the speed $x_0'$ by c from the external force z11. An output of the subtracter 4A is multiplied by 1/m, and the resultant is inputted to the integrator 4C. The integrator 4C integrates the input value to obtain the speed $x_0'$. The integrator 4D integrates the speed $x_0'$, thereby obtaining the zero follow position $x_0$.

The system shown in FIG. 7 is expressed by using a state equation as follows.

$$X = \begin{bmatrix} x_0' \\ x_0 \\ Di \end{bmatrix} \text{ (state quantity)} \tag{13}$$

$$\frac{d}{dt}X = AX + Bu \text{ (state equation)} \tag{14}$$

$$y = CX \text{ (output equation)} \tag{15}$$

where vectors A to C and u are expressed by the following equations.

$$A = \begin{bmatrix} -\frac{c}{m} & -\frac{k}{m} & \frac{1}{m} \\ 1 & 0 & 0 \\ 0 & 0 & 0 \end{bmatrix} \tag{16}$$

$$B = \begin{bmatrix} \frac{Gd \cdot K\tau}{mR} \\ 0 \\ 0 \end{bmatrix} \tag{17}$$

$$u = \text{cont} \tag{18}$$

$$C = [0\ 1\ 0] \tag{19}$$

Matrixes B, C, and u can be grasped as a column vector, a row vector, and a scalar (the actuator control signal cont), respectively.

The function of the disturbance observer 6 will be described by the following equation. As an estimation value of the zero follow position $x_0$, the position estimation value $x_0\hat{}$ is introduced.

$$X' = \begin{bmatrix} x_0'\hat{} \\ x_0\hat{} \\ Di\hat{} \end{bmatrix} \text{ (state quantity)} \tag{20}$$

$$\frac{d}{dt}X\hat{} = (A - KC)X\hat{} + Ky + Bu \text{ (state equation)} \tag{21}$$

where a feedback gain vector K is expressed by the following equation.

$$K = \begin{bmatrix} k1 \\ k2 \\ k3 \end{bmatrix} \tag{22}$$

Figure 8:
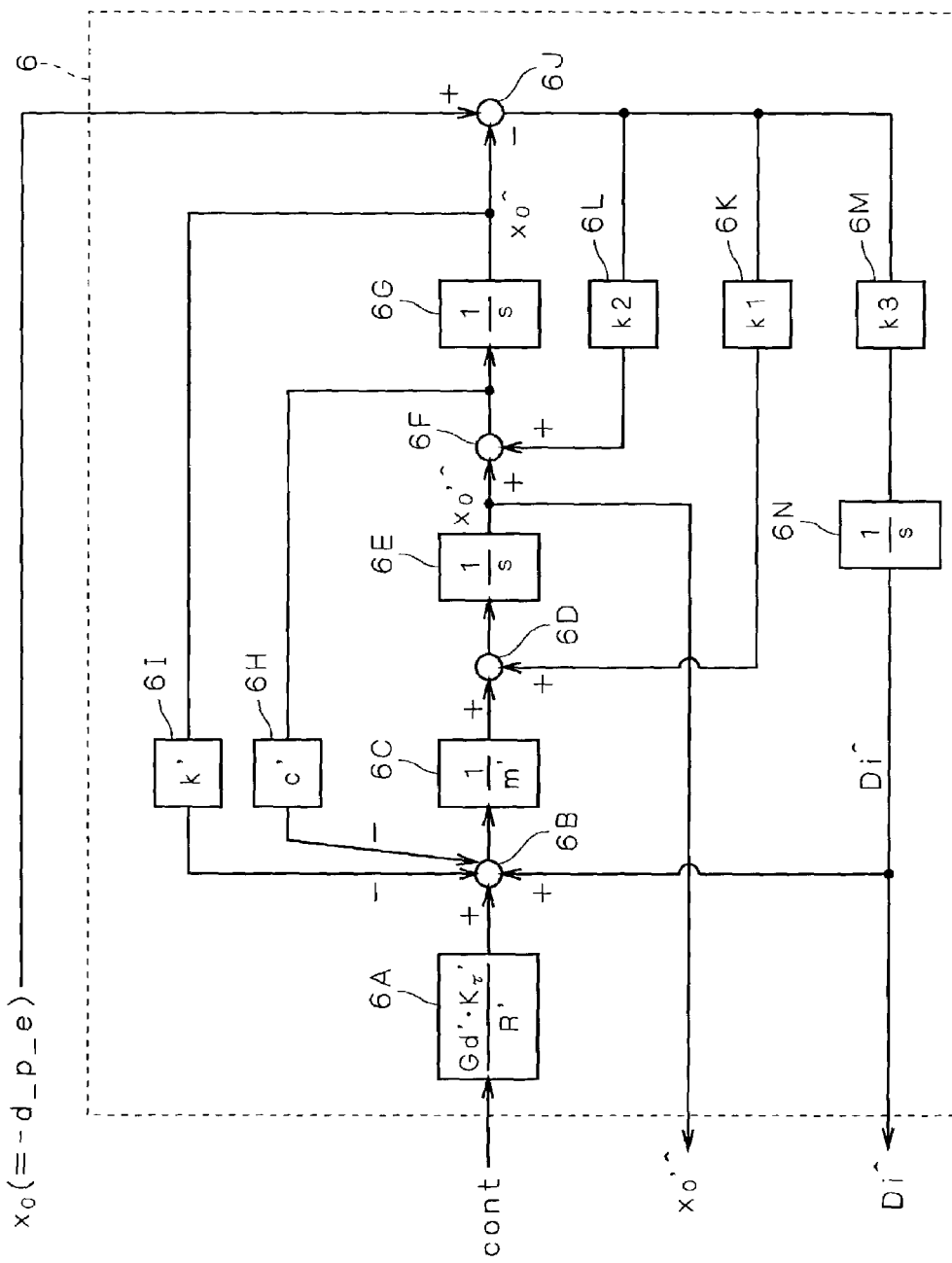
FIG. 8 is a block diagram illustrating the configuration of a disturbance observer 6.

FIG. 8 is a block diagram illustrating the configuration of the disturbance observer 6 defined by the equations (20) to (22). The disturbance observer 6 has a function block 6A for multiplying $Gd' \cdot K\tau'/R'$, adders-subtracters 6B, 6D, 6F and 6J, a function block 6C for multiplying the inverse of the mass m', integrators 6E, 6G and 6N, a function block 6I for multiplying the elastic modulus k', a function block 6H for multiplying the viscosity coefficient c', and function blocks 6K to 6M for multiplying feedback gains k1 to k3, respectively. By the elements, a predetermined estimation characteristic is realized.

Values m', k', c', and $Gd' \cdot K\tau'/R'$ are determined on the basis of a product standard of the actuator (the sign "'" used for them does not denote a time differential) and correspond to the values m, k, c, and $Gd \cdot K\tau/R$, respectively, of the actuator actually used. Determination of the elements of k1 to k3 of the feedback gain vector will be described hereinafter.

The function block 6A multiplies the input actuator control signal cont by $Gd' \cdot K\tau'/R'$ and outputs the resultant value to the adder-subtracter 6B (corresponding to the electricity-to-force conversion block 3). The adder-subtracter 6B adds an output of the function block 6A and the disturbance force estimation value $Di\hat{}$ and subtracts, from the result of the addition, a value obtained by multiplying the position estimation value $x_0\hat{}$ by k' in the function block 6I and a value obtained by multiplying an output of the adder 6F by c' in the function block 6H (corresponding to the subtracter 4A). An output of the adder-subtracter 6B is multiplied by 1/m' in the function block 6C (corresponding to the function block 4B), and the adder 6D adds the resultant with a value obtained by multiplying an output of the subtracter 6J by k1. The integrator 6E integrates an output of the adder 6D to thereby obtain the speed estimation value $x_0'\hat{}$ (corresponding to the integrator 4D). The speed estimation value $x_0'\hat{}$ obtained here is outputted to the amplifier 7.

The adder 6F adds the speed estimation value $x_0'\hat{}$ with a value obtained by multiplying an output of the subtracter 6J by k2. The integrator 6G integrates an output of the adder 6F to thereby obtain the position estimation value $x_0\hat{}$. The subtracter 6J subtracts the position estimation value $x_0\hat{}$ from the zero follow position $x_0$. The integrator 6N integrates a value obtained by multiplying an output of the subtracter 6J by k3 times to thereby obtain the disturbance force estimation value $Di\hat{}$. The disturbance force estimation value $Di\hat{}$ is outputted to the amplifier 7.

By realizing the disturbance observer 6 defined by the equations (20) to (22) by an electric circuit or digital computing means on the basis of the block diagram of FIG. 8, the disturbance force Di and the speed $x_0'$ of the actuator can be estimated.

Figure 9:
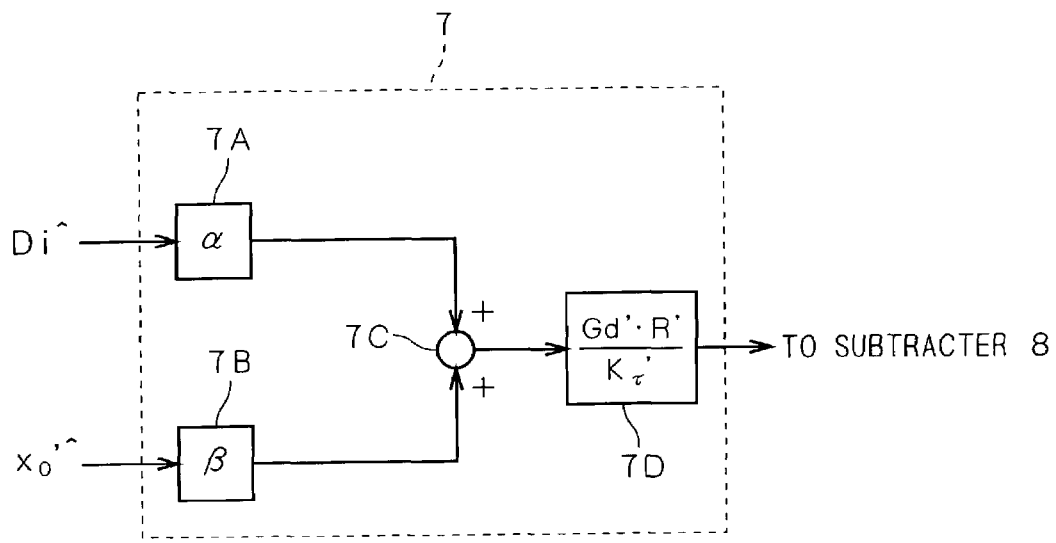
FIG. 9 is a block diagram showing the configuration of an amplifier 7.

FIG. 9 is a block diagram showing the configuration of the amplifier 7. The amplifier 7 has amplifiers 7A, 7B, and 7D and an adder 7C. The disturbance force estimation value $Di\hat{}$ multiplied by α times by the amplifier 7A and the speed estimation value $x_0'\hat{}$ multiplied by β times by the amplifier 7B are added by the adder 7C. An output of the adder 7C is multiplied by $R'/(Gd' \cdot K\tau')$ times in the amplifier 7D and the resultant is outputted to the subtracter 8. "$R'/(Gd' \cdot K\tau')$" indicative of the characteristic of the amplifier 7D is a characteristic opposite to that of the function block 6A schematically showing the electricity-to-force conversion block 3. α and β are set as positive numbers and α is set to be equal to or smaller than 1 to prevent oscillation as will be described hereinafter.

Figure 10:
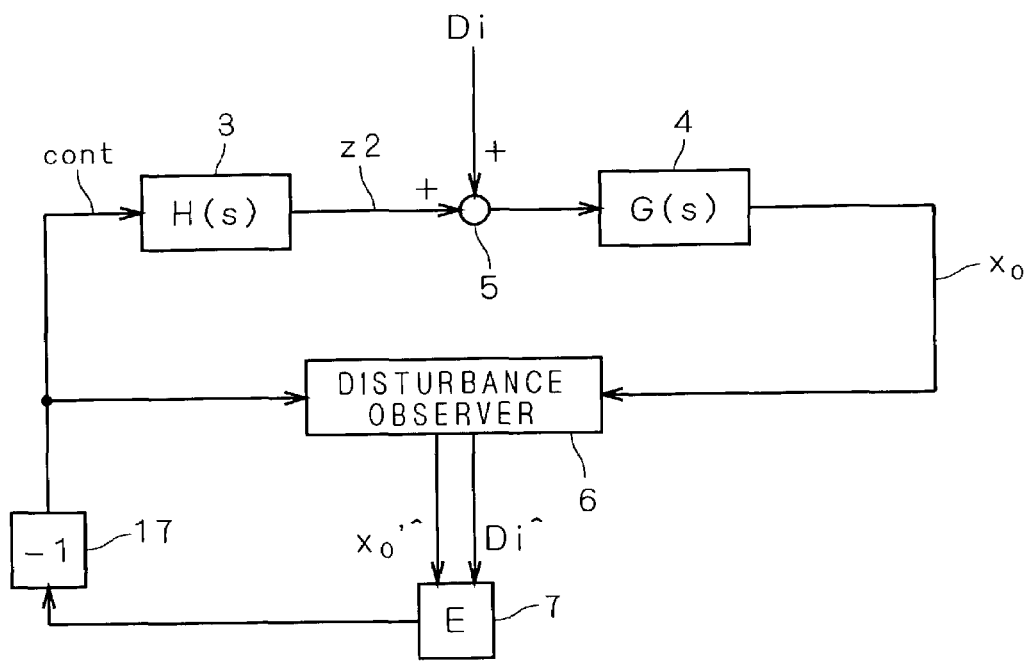
FIG. 10 is a block diagram showing the configuration of a disturbance force suppressing loop.

FIG. 10 is a block diagram showing the configuration of a disturbance force suppressing loop which is expressed by eliminating the path in which the phase compensation block 2 is provided from the control system 304. In other words, the disturbance suppression loop indicates the control system 304 in the case where an output of the phase compensation block 2 is zero. Therefore, the function of the subtracter 8 can be expressed as an amplifier 17 for multiplying an output of the amplifier 7 by a coefficient (−1).

Figure 11:
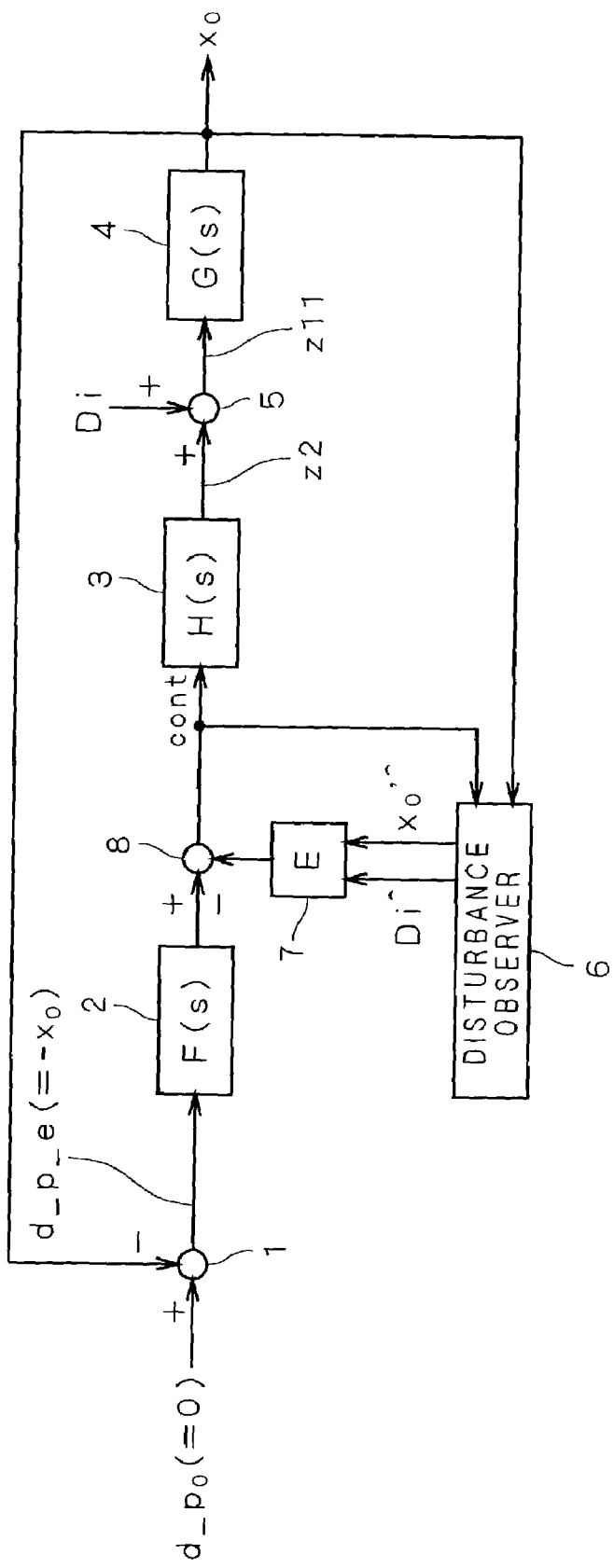
FIG. 11 is a block diagram showing a control system obtained by modifying the control system 304.

A control system shown in FIG. 11 is obtained by modifying the control system 304 illustrated in FIG. 5. The control system outputs the zero follow position $x_0$ of which follow target is the zero follow target position $d\_p_0$.

Figure 12:
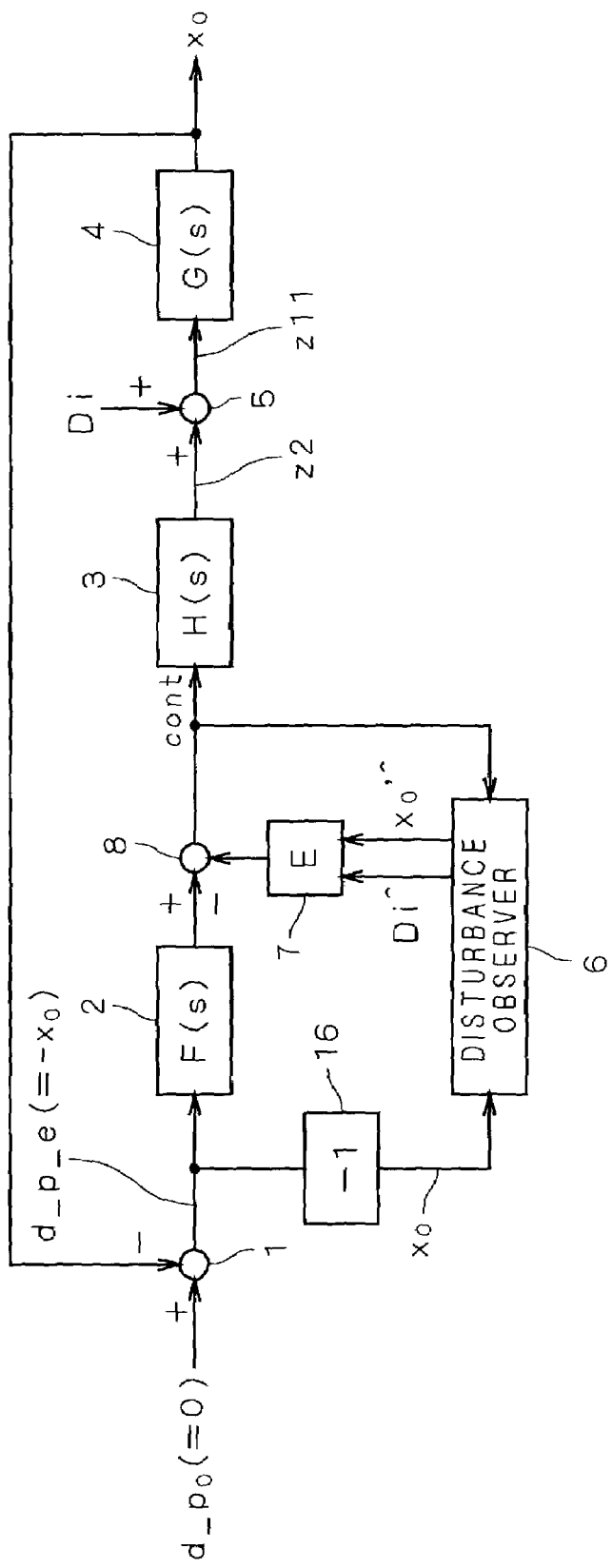
FIG. 12 is a block diagram showing a control system based on the control system illustrated in FIG. 11.

Further, the zero follow position $x_0$ to be inputted to the disturbance observer 6 in the control system shown in FIG. 11 is obtained by multiplying the position error $d\_p\_e$ by the coefficient (−1) on the basis of the equation (2). FIG. 12 is a block diagram showing the control system obtained by performing such modification, and the multiplication with the coefficient (−1) is expressed as a function of the amplifier 16.

Further, by modifying the control system illustrated in FIG. 12 in the manner opposite to the modification by which FIG. 3 is obtained from FIG. 2, the control system 201 illustrated in FIG. 1 can be obtained. Therefore, also in the control system 201, the disturbance suppressing loop functions like in the control system 304. At the time of making the position x to be controlled as a real control target follow the follow target position $d\_p$, by multiplying the estimation value Di of the disturbance force by $-\alpha R'/K\tau'$, multiplying the speed estimation value $x_0'^{\wedge}$ by $-\beta R'/K\tau'$ times and feeding back the resultant values to the electricity-to-force conversion characteristic H(s), the sensitivity to the influence of acceleration applied as a disturbance to the actuator can be lowered while maintaining the stability of the system.

The control system 201 will be described in detail again. The control system 201 performs a control for making the position x to be controlled as the position of the movable part of the actuator follow the follow target position $d\_p$. The position error $d\_p\_e$ as a value obtained by subtracting the position x to be controlled from the follow target position $d\_p$ corresponds to a value obtained by changing the sign of the zero follow position $x_0$ (that is, by multiplying the zero follow position $x_0$ by a coefficient (−1)), and a control loop for always converging the position error $d\_p\_e$ to almost zero is constructed.

The follow target position $d\_p$ corresponds to a recording track of an optical disk and changes according to a disk physical distortion. If the control system 201 is, for example, a control system for performing a focusing control, the position error $d\_p\_e$ is a so-called "focus error signal". If the control system shown in FIG. 1 is, for example, a control system for performing a tracking control, the position error $d\_p\_e$ is a so-called "track error signal".

The phase compensating block 2 receives the position error $d\_p\_e$, performs the low-frequency-band compensation and stabilization compensation expressed by the equations (3) to (5) on the position error $d\_p\_e$, and outputs the resultant as the position control signal p_cont.

The electricity-to-force conversion block 3 receives the actuator control signal cont, performs conversion expressed by the equation (10) on the actuator control signal cont, and outputs the resultant as the position control force z2.

The actuator mechanism block 4 receives the external force z1, performs conversion expressed by the equation (11) on the external force z1, and outputs the resultant as the position x to be controlled.

The function block 9 is schematically shown, for multiplying the mass m of the control target to express the acceleration disturbance force z_acc added as a disturbance to the control target on the basis of the acceleration disturbance Di_acc. The adder 5 for obtaining the external force z1 to be added to the control target as addition of the position control force z2 and the acceleration disturbance force z_acc is also schematically shown. An actual position control system applied to the optical disk drive does not have means for directly detecting each of the position x to be controlled and the follow target position $d\_p$. By electrically computing a signal detected by optical means of the optical pickup, only the position error $d\_p\_e$ is obtained as an electric signal. Therefore, the subtracter 1 for subtracting the position x to be controlled from the follow target position $d\_p$ to obtain the position error $d\_p\_e$ is also schematically shown.

The disturbance force estimation value $Di^{\wedge}$ and speed estimation value $x_0'^{\wedge}$ are obtained by the disturbance observer 6 and fed back to the electricity-to-force conversion block 3 via the amplifier 7 and the subtracter 8. The subtracter 8 subtracts the feedback amount outputted from the amplifier 7 from the position control signal p_cont and outputs the resultant as the actuator control signal cont. To obtain the disturbance force estimation value $Di^{\wedge}$ and the estimation value $x_0'^{\wedge}$ of the speed $x_0'$, the disturbance observer 6 receives the zero follow position $x_0$ from the amplifier 16 and the actuator control signal cont from the subtracter 8.

Figure 13:
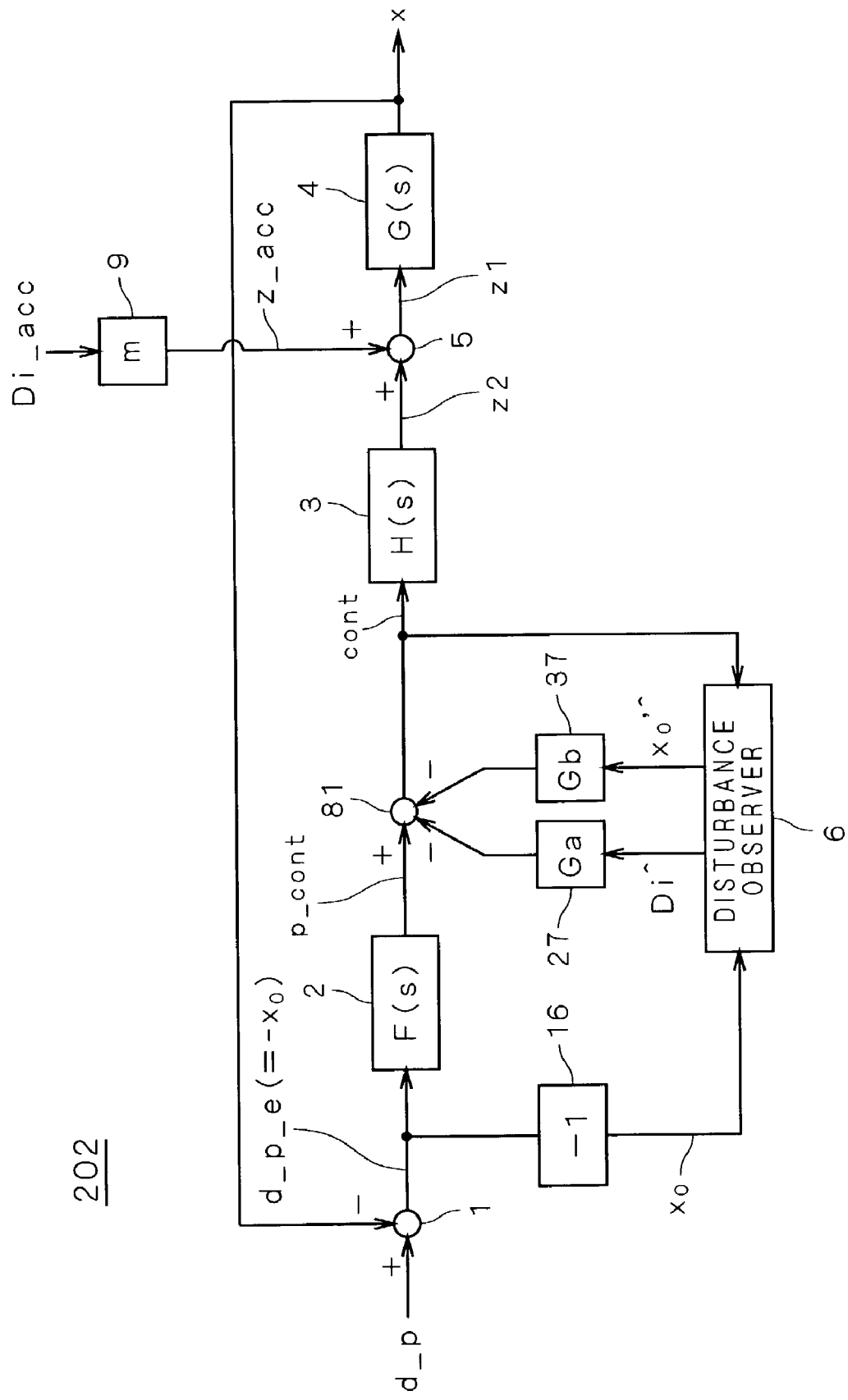
FIG. 13 is a block diagram showing the configuration of a control system 202.

FIG. 9 shows the case where the amplifier 7 is constructed by the amplifiers 7A, 7B and 7D, and the adder 7C. It is also possible to obtain the actuator control signal cont by multiplying the disturbance force estimation value $Di^{\wedge}$ by the coefficient $\alpha \cdot R'/(Gd' \cdot K\tau')$, multiplying the speed estimation value $x_0'^{\wedge}$ by the coefficient $\beta \cdot R'/(Gd' \cdot K\tau')$, and subtracting the resultants from the position control signal p_cont. FIG. 13 is a block diagram showing the configuration of a control system 202 obtained by performing such modification. In place of the amplifier 7, an amplifier 27 for multiplying the disturbance force estimation value $Di^{\wedge}$ by the coefficient $Ga(=\alpha \cdot R'/(Gd' \cdot K\tau'))$ and outputting a disturbance feedback amount and an amplifier 37 for multiplying the speed estimation value $x_0'^{\wedge}$ by the coefficient $Gb(=\beta \cdot R'/(Gd' \cdot K\tau'))$ and outputting the speed feedback amount are employed. In place of the subtracter 8, a subtracter 81 is provided for subtracting the disturbance feedback amount and the speed feedback amount from the position control signal p_cont, and outputting the actuator control signal cont.

FIGS. 14 and 15 are block diagrams showing the configurations of the amplifiers 27 and 37, respectively. As shown in FIG. 14, the amplifier 27 has amplifiers 27A and 27B. The disturbance force estimation value $Di^{\wedge}$ multiplied by $\alpha$ times by the amplifier 27A is multiplied by $R'/(Gd' \cdot K\tau')$ by the amplifier 27B and the resultant is outputted to the subtracter 81. As shown in FIG. 15, the amplifier 37 has amplifiers 37A and 37B. The speed estimation value $x_0'^{\wedge}$ multiplied by $\beta$ times by the amplifier 37A is multiplied by $R'/(Gd' \cdot K\tau')$ by the amplifier 37B, and the resultant is outputted to the subtracter 81.

A desirable form of the disturbance observer 6 will now be described. In the equation (21), if the eigenvalue of the coefficient matrix (A−KC) of the state quantity $X^{\wedge}$ is stable, with respect to the zero follow position $x_0$ and the speed $x_0'$, the estimation value and the actual value are converged so as to coincide with each other. For example, a feedback gain vector K is determined so that the eigenvalue becomes a pole.

In the embodiment, since the disturbance observer 6 has integrators 6E, 6G and 6N, it has three poles (referred to as poles of estimation characteristic of the disturbance observer) which are expressed as λ1, λ2 and λ3. By placement of the poles on a complex plane, the estimation characteristic of the disturbance observer is determined. In the specification, the pole (hereinafter, referred to as a "minimum pole") closest to the origin in the complex plane among the plurality of poles of the disturbance observer 6 is set as λ1, and λ1 expressed in frequency is defined as an estimation band fovs of the disturbance observer 6.

The relations among the poles λ1 to λ3 of the disturbance observer 6 and feedback gains k1 to k3 are expressed by the following equations.

$$k1 = \lambda 1 \cdot \lambda 2 + \lambda 2 \cdot \lambda 3 + \lambda 3 \cdot \lambda 1 - \frac{k' + c' \cdot k2}{m'}$$
$$k2 = -\left(\lambda 1 + \lambda 2 + \lambda 3 + \frac{c'}{m'}\right)$$
$$k3 = -m' \cdot \lambda 1 \cdot \lambda 2 \cdot \lambda 3$$
(23)

FIGS. 16A and 16B are graphs showing the disturbance estimation characteristic of the disturbance observer 6 in the case where the pole of the disturbance observer 6 is set as a cube root and its value is 900 Hz. The vertical line of FIG. 16A denotes the ratio of the magnitude of the disturbance estimation value Di^ to the disturbance force Di, and the vertical line of FIG. 16B denotes a phase difference of the disturbance force estimation value Di^ from the disturbance force Di. Referring to FIG. 16A, it is under stood that the frequency at which the gain decreases by 3 dB from 0 dB is about 300 Hz, and the estimation band fovs of the disturbance observer 6 is about 300 Hz.

Since the disturbance force Di is defined by the equation (1), it includes information of the follow target position d_p. By feeding back the disturbance estimation value Di^, the open-loop characteristic of the control system 201 improves when the gain characteristic is in the estimation band fovs or lower. The open-loop characteristic is, unless otherwise specified, open-loop characteristic of a system for making the position x follow the follow target position d_p. Since the equivalent conversion introducing the disturbance force Di does not change the open-loop characteristic as shown in FIGS. 2 and 3, the open-loop characteristic coincides with open-loop characteristic of a system for making the zero follow position $x_0$ follow the zero follow target position d_$p_0$. Consequently, in order to reduce the residual error, it is desired to widen the estimation band fovs. The desirable range of the estimation band fovs will now be examined.

The disturbance observer 6 has the function of a sensor for detecting the disturbance force Di, and the disturbance force suppressing loop (refer to FIG. 10) has the function of suppressing the disturbance force Di equal to or lower than the estimation bandwidth fovs. Therefore, it is desirable to set the estimation band fovs of the disturbance observer 6 to be equal to or higher than at least the band of the disturbance force Di desired to be suppressed. The disturbance force Di has information of the follow target position d_p. In order to cancel the influence of the disk physical distortion, it is necessary to set the estimation band fovs so that the disk physical distortion can be estimated. The optical disk physical distortion is expressed by a periodic function using the disk rotation frequency as a fundamental frequency. Therefore, the estimation band fovs is desirably set to a frequency higher than at least the disk rotation frequency.

When the estimation band fovs is set to be higher than the crossover frequency of the open-loop characteristic of the control system 201 employing the disturbance observer 6, the crossover frequency is increased.

It is therefore preferable to satisfy the following equation (24) where fa denotes a frequency at which the disturbance suppression effect is desired to be displayed, and fb denotes the crossover frequency of the open-loop characteristic of the control system 201. For example, 30 Hz and 1 kHz are selected as the frequencies fa and fb, respectively.

$$fa \leq fovs \leq fb \quad (24)$$

From the definition of the estimated band fovs, the minimum pole λ1 of the disturbance observer 6 is set between the frequency fa and the crossover frequency fb.

The feedback gains α and β will now be examined. Since the feedback amount of the disturbance force estimation value Di^ is determined by the feedback gain α, to enhance the disturbance force suppressing effect by the disturbance observer 6, a value as large as possible is desired as the feedback gain α. As already described, the disturbance force estimation value Di^ is multiplied by α·R'/(Gd'·Kτ') and the resultant is fed back to the electricity-to-force conversion characteristic H(s). Considering that the electricity-to-force conversion characteristic H(s) is expressed by the equation (11), it is desirable that the feedback gain α is set to 1 or less.

The feedback gain β determines the feedback amount of the speed estimation value $x_0$'^. The feedback amount of the speed estimation value $x_0$'^ is contributed to stability of the control system 201 as will be described hereinafter.

FIGS. 17A and 17B are graphs showing the open-loop characteristic of the control system 201. The case of applying the control system 201 to tracking control of a CD player is assumed and values are set as follows.

$$
\begin{aligned}
f_1 &= 8 & \text{(Hz)} \\
f_2 &= 80 & \text{(Hz)} \\
f_3 &= 400 & \text{(Hz)} \\
f_4 &= 2500 & \text{(Hz)} \\
G &= 4500000 & \text{(Hz)} \\
R &= R' = 6 & (\Omega) \\
K_\tau &= K'_\tau = 0.0778 & \text{(N/A)} \\
Gd &= Gd' = 4.8 \\
m &= m' = 0.379 \times 10^{-3} & \text{(Kg)} \\
c &= c' = 0.0233 & \text{(Kg/s)} \\
k &= k' = 22.8 & \text{(Kg/s}^2) \\
\lambda 1 &= \lambda 2 = \lambda 3 = 900 & \text{(Hz)}
\end{aligned}
\quad (25)
$$

Figures 18A, 18B, 18C:
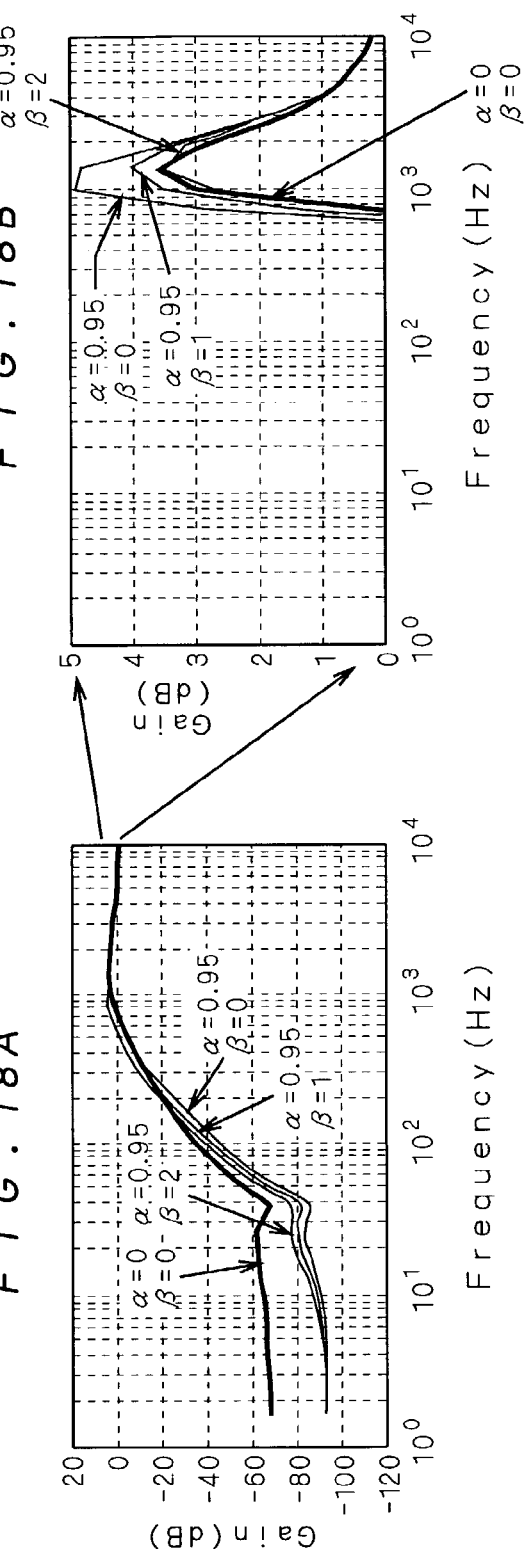
FIGS. 18A to 18C are graphs showing a sensitivity characteristic of the control system 201.

FIG. 17A shows the gain characteristic, and FIG. 17B shows the phase characteristic. FIGS. 18A to 18C are graphs showing sensitivity characteristics of the control system 201. FIGS. 18A and 18B show the gain characteristic, and FIG. 18C shows the phase characteristic. FIG. 18B is a partial enlarged view of FIG. 18A. In each of the graphs, the curve of a thick line shows a case where α=0 and β=0, and the disturbance force estimation value Di^ and speed estimation value $x_0$'^ are not fed back. This case is equivalent to the case where the disturbance suppressing loop is not provided in a manner similar to the conventional control system 301 and is the case where the actuator control signal p_cont coincides with the position control signal cont.

First, an influence of the feedback amount α in the case where the feedback amount β is zero will be examined. When the feedback amount α is increased (FIG. 17A), the gain in a low frequency band of open-loop characteristic increases, the sensitivity characteristic deteriorates (FIG. 18A), and the position error d_p_e can be suppressed. As shown in FIG. 18A, by increasing the feedback amount α to 0.95, as compared with the case where the feedback amount α is zero, in the estimation band fovs of the disturbance observer 6 or lower, that is, in a band lower than 300 Hz in this case, lower sensitivity to the disturbance is realized. It is understood from the above that, by feeding back the disturbance force estimation value Di^, even a disk having a large disk physical distortion can be handled as a disk having a small disk physical distortion.

However, when β=0, a phase margin at the crossover frequency decreases. Consequently, a problem such that the following control oscillates may occur (FIG. 17B). When β=0, if the feedback amount α is increased, a problem such that the sensitivity at the crossover frequency increases also arises (FIG. 18B). By increasing the feedback amount β, the phase margin is compensated. In the graph shown in FIG. 17B, even when α=0.95, if β is set to 2, the phase margin recovers to a value which is obtained in the case where the disturbance force estimation value Di^ and the speed estimation value $x_0'^\wedge$ are not fed back. Even when β is set to about 2, although the crossover frequency slightly increases, decrease in the gain is not much in the estimation band fovs or lower. As shown in FIG. 18B, by increasing β, while increasing rigidity to the disturbance at or around the crossover frequency, the low-frequency-band sensitivity characteristic can be improved. Even when β is set to around 2, although the sensitivity characteristic in the low frequency band increases slightly, the increase amount is not so much.

Therefore, in the following example, 0.95 and 2 are set as a typical example of the feedback amounts α and β, respectively.

Figure 19A:
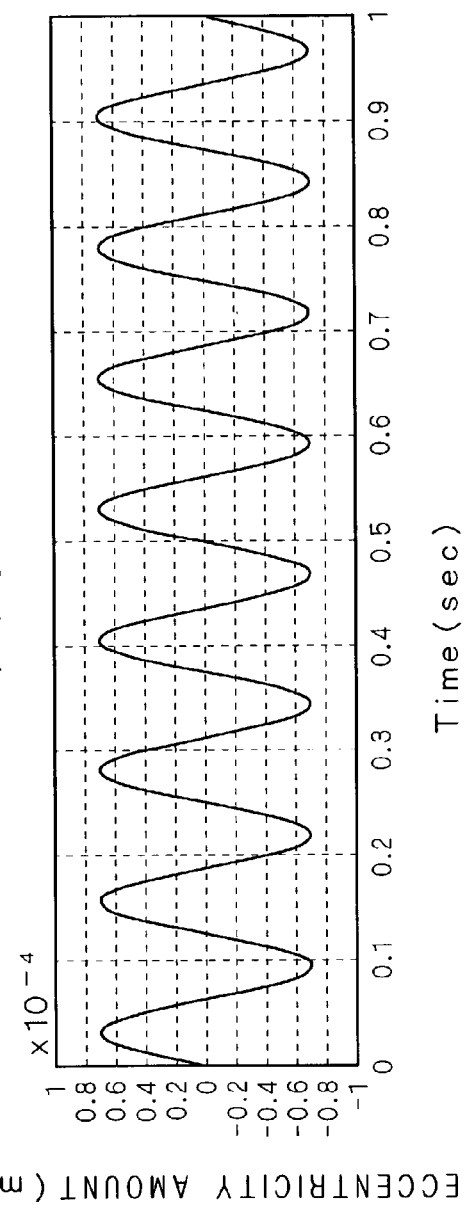
FIGS. 19A and 19B are graphs showing the operation of the control system 201.
Figure 19B:
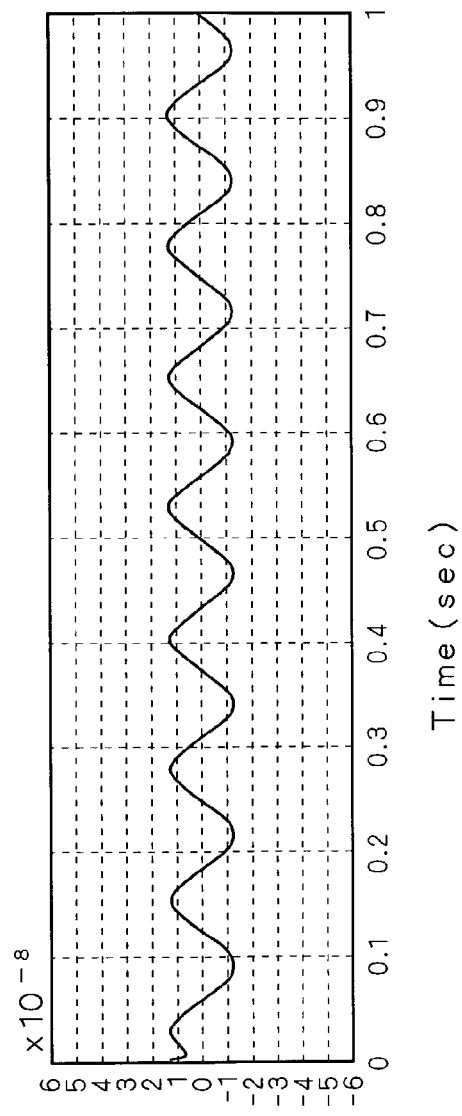

FIGS. 19A and 19B are graphs showing operations in the case where the control system 201 is applied to tracking control. It is assumed here that the acceleration disturbance Di_acc is zero. FIG. 19A shows a state of a change in the follow target position d_p, corresponding to the eccentricity amount of an optical disk.

As shown in FIG. 19A, the follow target position d_p changes at 8 Hz which is around the maximum rotation frequency of a CD player, and has an amplitude of 140 μmpp of the specification limit. That is, FIG. 19A shows the value of the follow target position d_p when the CD player operates under the worst conditions.

FIG. 19B shows a state of a change in the position error d_p_e of the case where the follow target position d_p changes as shown in FIG. 19A and illustrates the residual error of the control system 201. As shown in FIG. 19B, even when a CD player operates under the worst conditions, the residual error can be suppressed to about 0.02 μmpp. As compared with the result (FIG. 45) of the conventional control system 301 in which the disturbance force estimation value Di^ and the speed estimation value $x_0'^\wedge$ are not fed back, the residual error is reduced. It means that the following performance to the disk physical distortion is improved.

FIGS. 20A and 20B are graphs showing operations of the control system 201 in the case where the acceleration disturbance Di_acc is given. FIG. 20A shows the acceleration disturbance Di_acc, and FIG. 20B shows the residual error in the case where the acceleration disturbance Di_acc illustrated in FIG. 20A is given. The operation show in FIGS. 20A and 20B illustrates the case where the follow target position d_p is zero.

As shown in FIG. 20A, even when the acceleration disturbance Di_acc having a frequency of 30 Hz and an amplitude of 5 Gpp is given to a conventional control system as shown in FIG. 20A, the residual error can be suppressed to about 0.2 μmpp as shown in FIG. 20B.

As described above, the control system 201 according to the embodiment can perform normal recording and reproduction more than the conventional control system 301.

C2. Second Embodiment

In a second embodiment, a control system for solving a problem such that the residual error becomes large at the exit of a defect when a disk physical distortion is large, as a first problem of the second related art.

Figure 21:
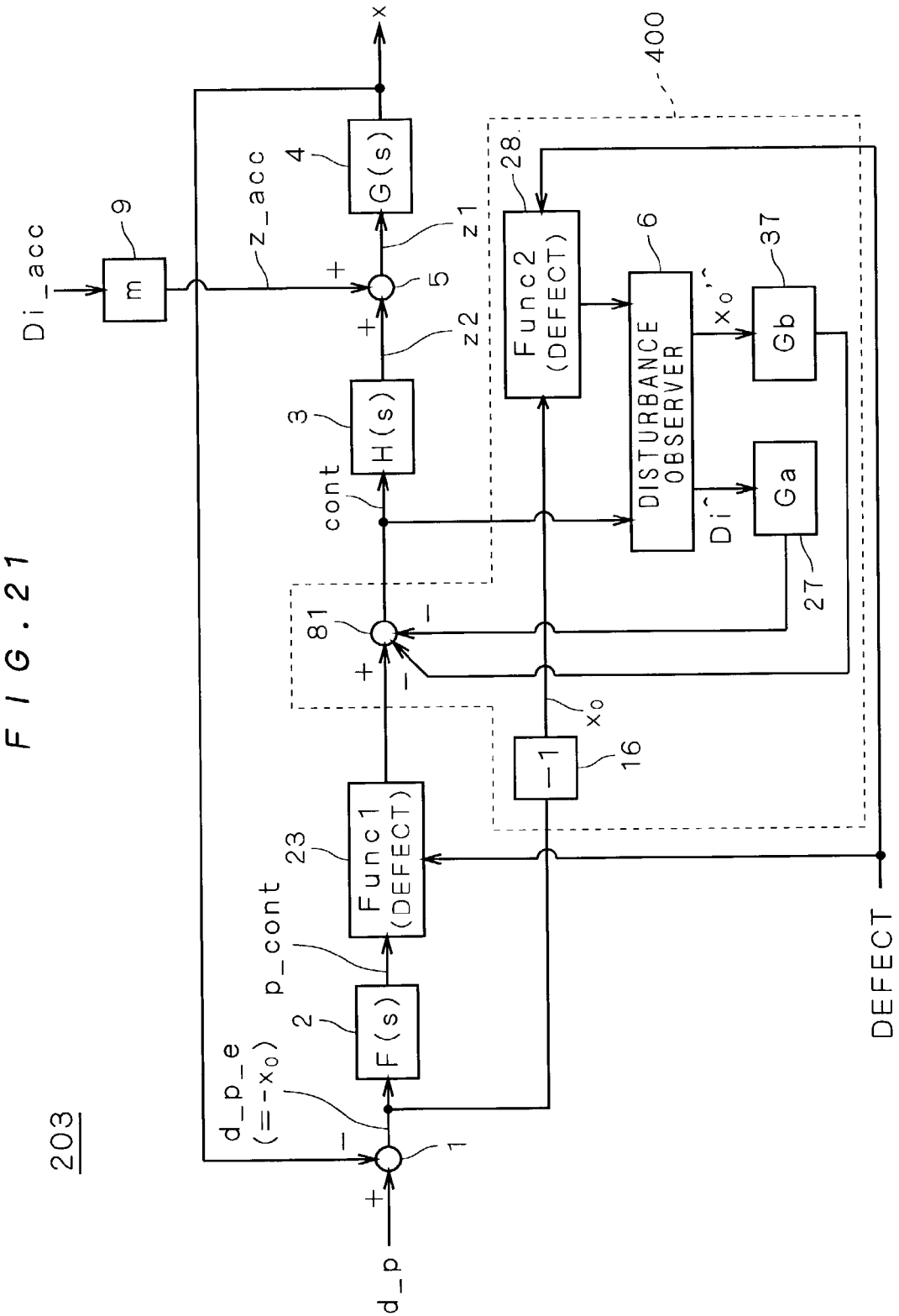
FIG. 21 is a block diagram showing the configuration of a control system 203 according to a second embodiment of the present invention.

FIG. 21 is a block diagram showing the configuration of a control system 203 according to the second embodiment of the present invention. The control system 203 can be employed as, for example, a position control system for performing a light spot focusing control or tracking control in a tabletop, vehicle-mounted or portable optical disk drive.

Figure 48:
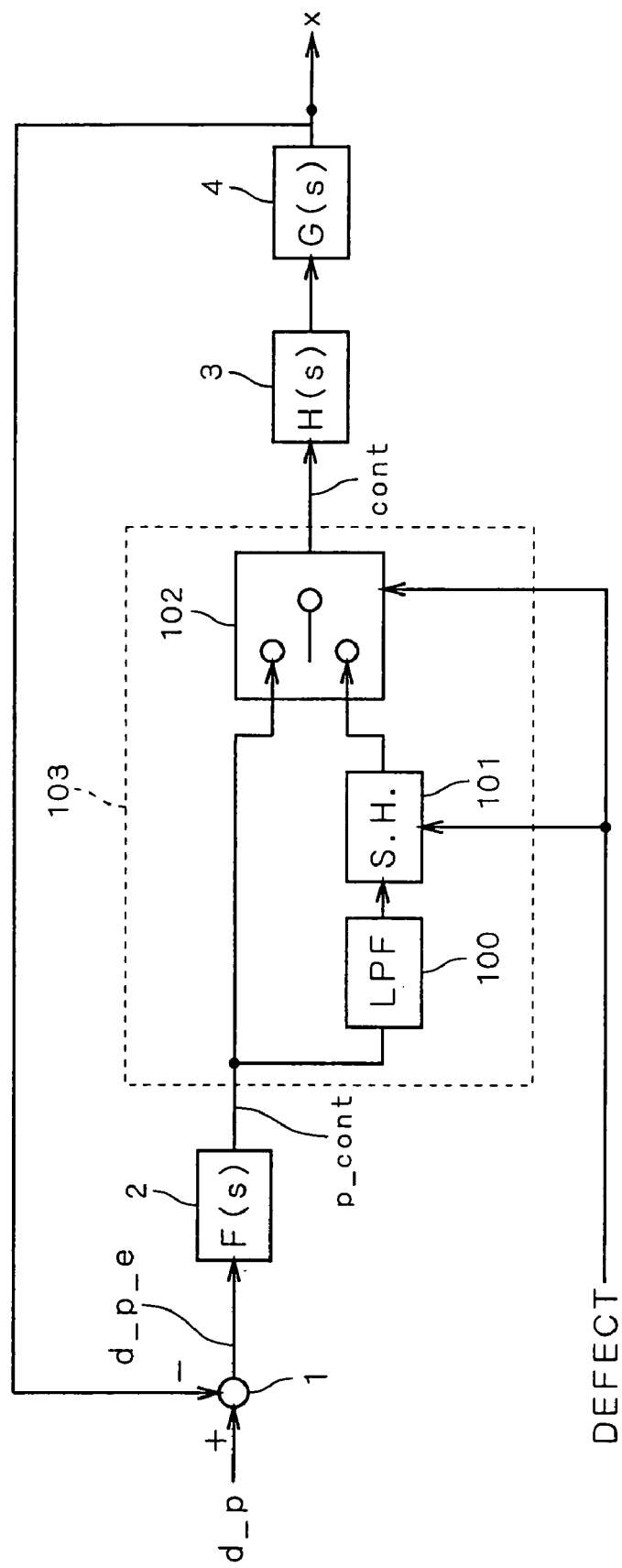
FIG. 48 is a block diagram showing the configuration of a control system 302 according to a second conventional art.

The control system 203 has, basically, a configuration similar to that of the control system 302 shown in FIG. 48 except that the first problem preventing block 23 is replaced with the problem preventing block 103, and a feedback unit 400 is added. Specifically, to consider the acceleration disturbance force z_acc based on the acceleration disturbance Di_acc to be added to the control target, the adder 5 is schematically shown. Generation of the acceleration disturbance force z_acc is schematically shown by the multiplier 9 for multiplying the acceleration disturbance Di_acc by the mass m of the control target.

The feedback unit 400 has a second problem preventing block 28; and the disturbance observer 6, amplifiers 16, 27, and 37, and subtracter 81 which are used in the control system 202 described by referring to FIG. 13 in the first embodiment.

In a manner similar to the control system 202, the amplifier 16 multiplies the output of the subtracter 1 by (−1) and outputs the zero follow position $x_0$. The amplifier 27 multiplies the disturbance force estimation value Di^ by the coefficient Ga(=α·R'/(Gd'·Kτ')) and outputs the resultant to the subtracter 81. The amplifier 37 multiplies the speed estimation value $x_0'^\wedge$ obtained from the disturbance observer 6 by the coefficient Gb(=β·R'/(Gd'·Kτ')) and outputs the resultant to the subtracter 81.

However, the characteristic of the embodiment is that the object from which the outputs of the amplifiers 27 and 37 are subtracted in the subtracter 81 is not the position control signal p_cont but an output of the first problem preventing block 23. Although one of inputs of the disturbance observer 6 is the actuator control signal cont, the other input is not the zero follow position $x_0$ but the output of the second problem preventing block 28. That is, in the control system 203 with the disturbance observer 6 having the configuration shown in FIG. 8, the subtracter 6J subtracts the position estimation value $x_0^\wedge$ from the output of the second problem preventing block 28.

Figure 22:
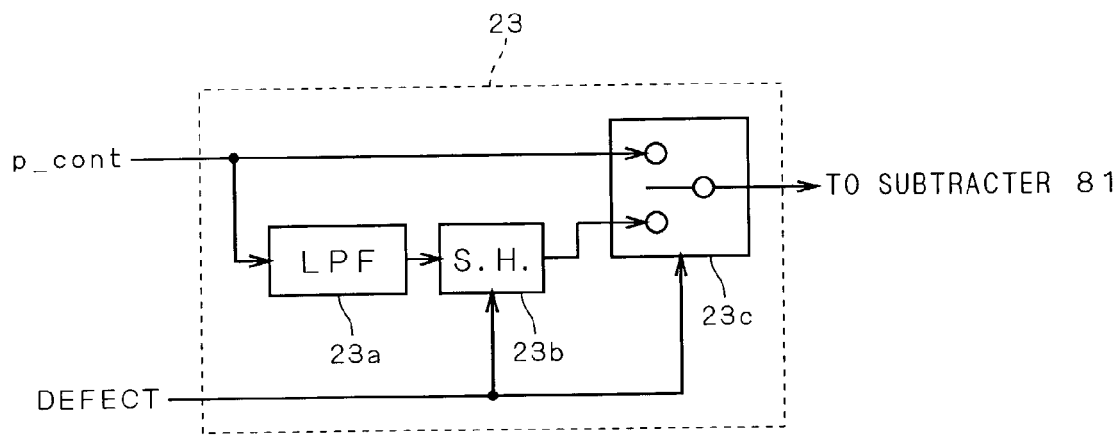
FIG. 22 is a block diagram illustrating the configuration of a first problem preventing block 23.
Figure 23:
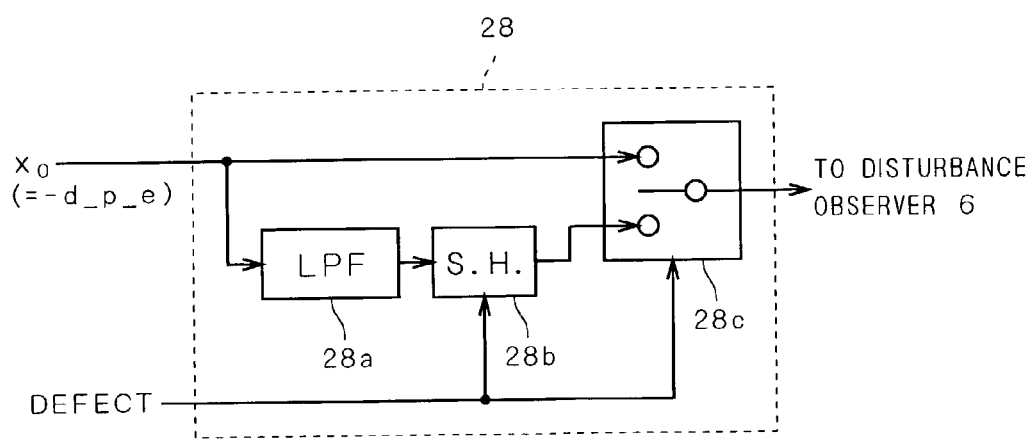
FIG. 23 is a block diagram illustrating the configuration of a second problem preventing block 28.

FIGS. 22 and 23 are block diagrams showing the configurations of the first problem preventing block 23 and the second problem preventing block 28, respectively. As shown in FIG. 22, the first problem preventing block 23 has a low-pass filter 23a, a sample and hold circuit 23b, and a selection circuit 23c. As shown in FIG. 23, the second problem preventing block 28 has a low-pass filter 28a, a sample and hold circuit 28b, and a selection circuit 28c. The configurations and operations of the first and second problem preventing blocks 23 and 28 are similar to those of the problem preventing block 103 in the conventional control system 302. It can be said that each of the first and second problem preventing blocks 23 and 28 has the function of outputting an input as it is in correspondence with a first event, in correspondence with the second event complementary to the first event, removing high-frequency-band components of an input just before a shift from the first event to the second event and outputting the resultant.

The position control signal p_cont is inputted to the first problem preventing block 23, and as already described, an output of the first problem preventing block 23 is supplied to the subtracter 81. To the second problem preventing block 28, a value obtained by changing the sign of the position error d_p_e, that is, the zero follow position $x_0$ is inputted. As described above, an output of the second problem preventing block 28 is inputted to the disturbance observer 6. A cutoff frequency of the low-pass filters 23a and 28a desired from such a viewpoint will be described hereinafter.

The first problem preventing block 23 outputs the position control signal p_cont as it is in the defect-free region. In the defect region, just before the entrance of a defect, low-frequency components of the position control signal p_cont are outputted. The second problem preventing block 28 outputs the zero follow position $x_0$ as it is in the defect free region. In the defect region, the low frequency components in the zero follow position $x_0$ just before the entrance of the defect are outputted.

Since an input signal is delayed by the low-pass filters 23a and 28a, even when the selection circuits 23c and 28c operate at the rising edge of the defect detection signal DEFECT, the low-frequency components of the position control signal p_cont and the low-frequency components of the zero follow position $x_0$ during the defect period are not sampled.

From the above, the control system 203 operates in a manner similar to the control system 202 in the defect-free region and can produce the effect shown in the first embodiment.

The estimation band fovs of the disturbance observer 6 is set in a manner similar to the first embodiment. The estimation value Di^ as an estimation value of the disturbance force Di including information of the follow target position d_p is fed back to the input of the electricity-to-force conversion block 3 via the amplifier 27 and subtracter 8. Consequently, the follow target position d_p can be suppressed at the disk rotation frequency or lower, and the residual error can be reduced. It means that the gain characteristic of the estimation band fovs improves. Therefore, to reduce the residual error by feeding back the zero follow position $x_0$ to the input of the phase compensation block 2 via the subtracter 1, it is desired to widen the estimation band fovs.

However, as stated in the first embodiment, if the estimation band fovs is set to be higher than the crossover frequency of the open-loop characteristic of the control system 203 employing the disturbance observer 6, the crossover frequency is increased.

It is therefore desirable that the equation (24) is satisfied by employing the disk rotation frequency as a frequency fa at which the disturbance suppression effect is desired to be displayed and employing the crossover frequency fb of the open-loop characteristic of the control system 203 as the crossover frequency fb. More concretely, it is desirable that the minimum pole λ1 of the disturbance observer 6 is set between the disk rotation frequency fa and the crossover frequency fb. The open-loop characteristic denotes the open-loop characteristic in the defect free period.

Figure 24:
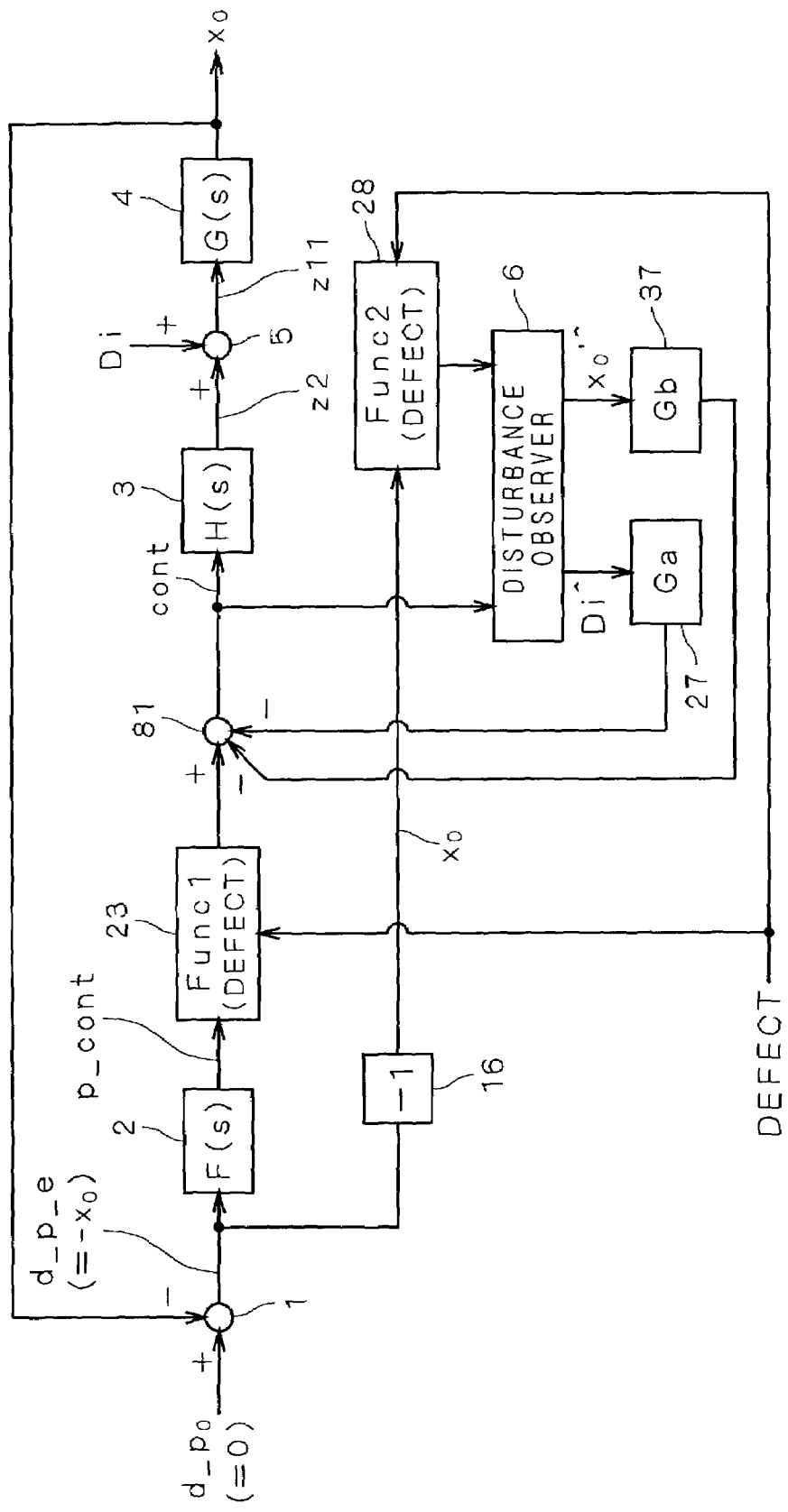
FIG. 24 is a block diagram showing the configuration of a control system obtained by performing equivalent exchange on the control system 203.
Figure 25:
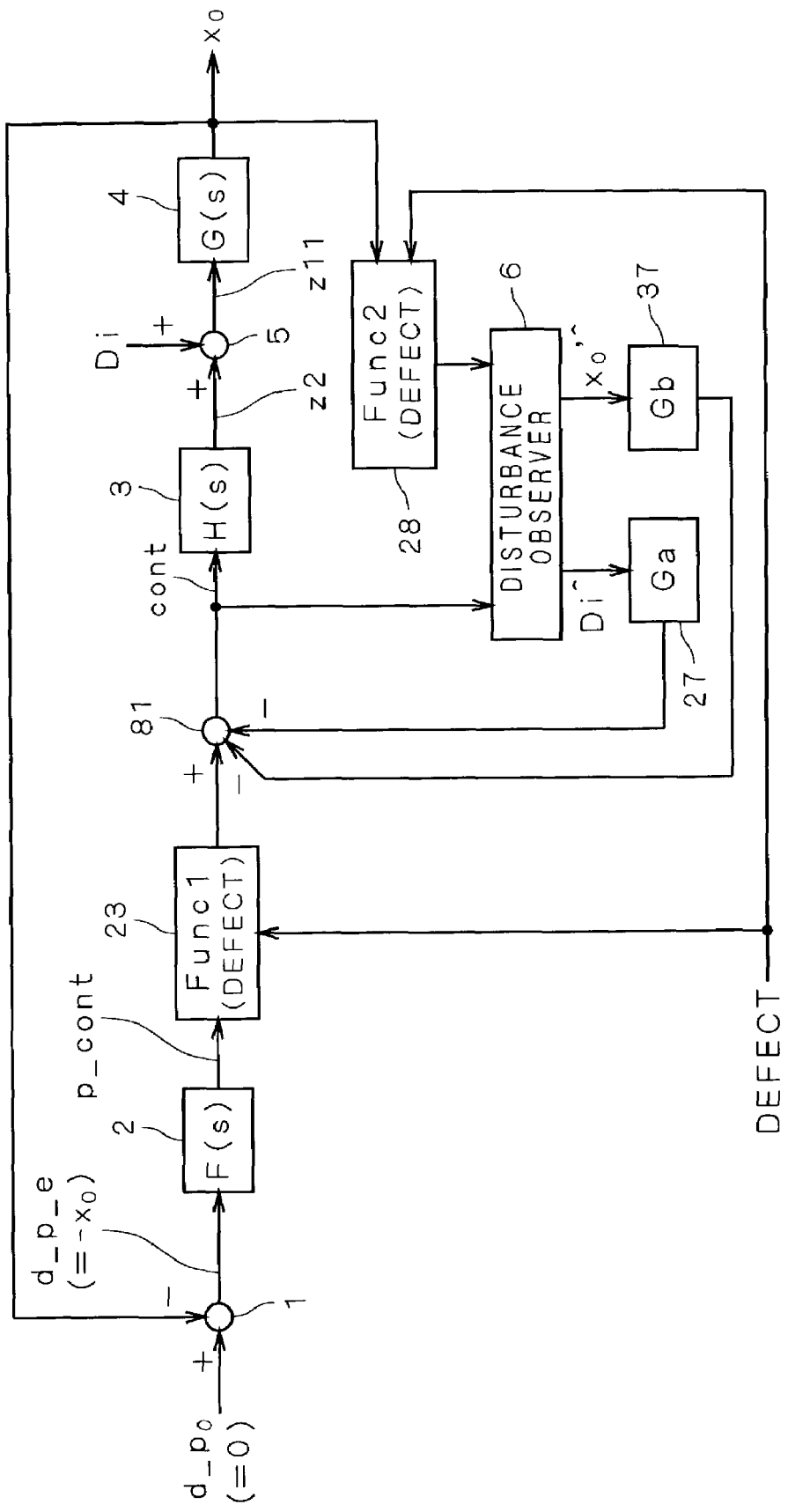
FIG. 25 is a block diagram showing the configuration of a control system 204.

To explain the operation of the control system 203, the block diagram is modified by performing equivalent conversion. First, the disturbance force Di is introduced to change the control target to the zero follow position $x_0$, thereby setting the follow target to the zero follow target position $d\_p_0$ (FIG. 24). Further, in consideration of the function of the amplifier 16 and the equation (2), the amplifier 16 is omitted, and the zero follow position $x_0$ is directly inputted to the second problem preventing block 28. The configuration of the control system 204 obtained as described above is equivalent to the configuration of the control system 203 (FIG. 25). As described in the first embodiment, by introducing the disturbance force and regarding the follow target position d_p as a disturbance, the control target of the control system 204 becomes the zero follow position $x_0$ which can be observed.

In the defect region, the position error d_p_e becomes a false signal. Accordingly, the position control signal p_cont and the zero follow position $x_0$ also become false signals. In defect compensation, therefore, after the control target reaches the defect region, a control based on the position error d_p_e is not performed. In contrast, operations of maintaining continuity of the control and leading to the normal control are requested immediately after the control target reaches the defect-free region. To achieve the operation of leading to the control stably and continuously at the exit of a defect, it is necessary to perform a control which is not based on the position error d_p_e so as to follow the disk physical distortion even in the defect period.

In the embodiment, during the defect period, the disturbance force estimation value Di^ is fed back on the basis of the zero follow position $x_0$ just before the entrance of the defect. As clearly understood from the equation (1), in the environment in which the acceleration disturbance Di_acc does not act, for example, in a tabletop optical disk drive, the disturbance force Di means the disk physical distortion at dynamic dimension. In other words, the disturbance force Di means a force applied to an actuator for tracking the disk physical distortion so that the position error becomes zero. Therefore, by obtaining the disturbance force estimation value Di^, the control to the disk physical distortion can be performed even in the defect period.

Further, the disturbance observer 6 is usually constructed by a plurality of integrators to estimate the disturbance force estimation value Di^ and the speed estimation value $x_0'^{\wedge}$ on the basis of the actuator control signal cont and the position error d_p_e (FIG. 8). The function of the integrator accumulates history, concretely, state quantity in the past. Without using the position error d_p_e in the defect region, the low-frequency components of the position control signal p_cont just before the entrance of the defect are obtained by the first problem preventing block 23, and the low-frequency components of the zero follow position $x_0$ just before the entrance of the defect are obtained by the second problem preventing block 28.

Therefore, the disturbance observer 6 performs interpolation on the basis of the history, the zero follow position $x_0$ just before the entrance of the defect, and the actuator control signal cont, and the disturbance force estimation value Di^ and the speed estimation value $x_0'^{\wedge}$ during the defect period can be estimated almost accurately.

In such a manner, in the control system 203 according to the embodiment, the disturbance force Di can be estimated by the disturbance observer 6 almost accurately even in the defect period. Consequently, by feeding back the disturbance force estimation value Di^ as an estimation value of the disturbance force Di, the influence of the disk physical distortion can be reduced in the defect period more than the second conventional art. Thus, even in the defect period, the position x to be controlled can be made follow the follow target position d_p. As a result, the residual error at the exit of the defect can be reduced, and the continuity of the position control can be maintained.

As described also in the first embodiment, the speed estimation value $x_0'^\wedge$ as an estimation value of the speed of the control target is fed back in addition to the disturbance force estimation value $Di^\wedge$, stability of the control systems 203 and 204 can be assured.

A desired range of the cutoff frequency of the low-pass filter 23a of the first problem preventing block 23 and the low-pass filter 28a of the second problem preventing block 28 will now be examined. As described above, since the disk physical distortion is expressed by the periodic function using the disk rotation frequency as a fundamental frequency, the follow target position d_p includes the disk rotation frequency component. Therefore, the disk rotation frequency component is included also in the position error d_p_e and the position control signal p_cont. Since those are frequency components necessary for the control, it is desirable to set the cutoff frequency to be higher than the disk rotation frequency. Particularly, it is desired to set the cutoff frequency of the low-pass filter 28a to a degree that high-frequency noise which accompanies when the position error d_p_e is obtained by the subtracter 1 can be suppressed.

In the first and second problem preventing blocks 23 and 28 including the low-pass filters 23a and 28a having such a cutoff frequency, respectively, high-frequency noise added to the position control signal p_cont or the position error d_p_e can be removed, and the following control can be realized without being influenced by the high frequency noise.

Since the position control signal p_cont whose phase is compensated in the band of hundreds to thousands Hz by the phase compensation block 2 is inputted to the low-pass filter 23, it is desirable to suppress noise amplified in the band. Therefore, it is desirable to set the cutoff frequency to be equal to or lower than the crossover frequency of the open-loop characteristic of the control system 203. As a result, it is desirable to set the cutoff frequency of the low-pass filter 23a to be higher than the disk rotation frequency, and to be equal to or lower than the crossover frequency in the open-loop characteristic of the control system 203.

Figure 26A:
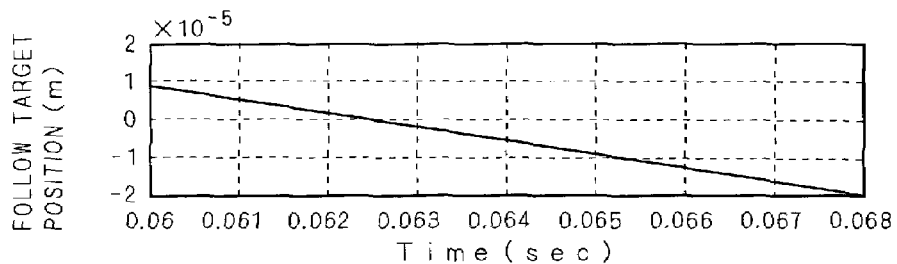
FIGS. 26A to 26E are graphs showing an effect of the control system 203.
Figure 26B:
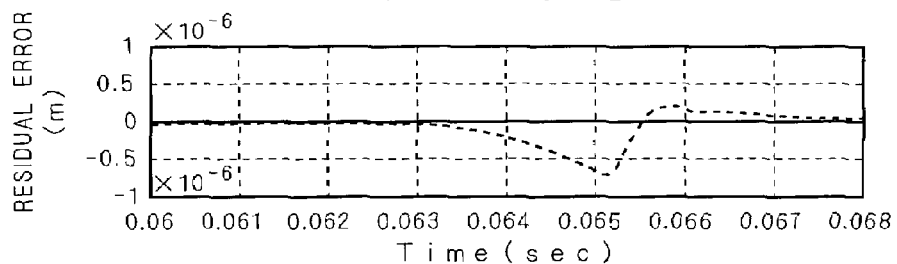
Figure 26C:
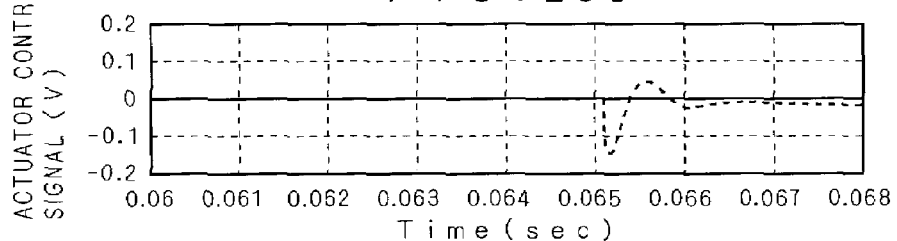
Figure 26D:
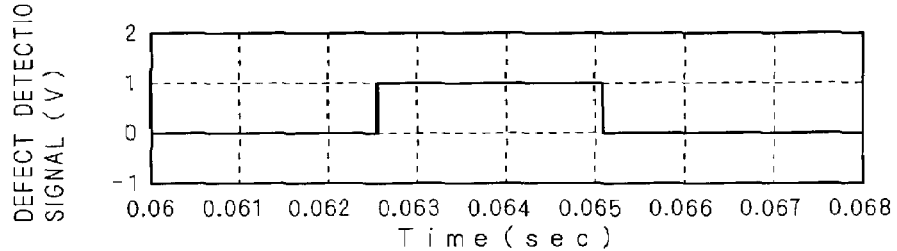
Figure 26E:
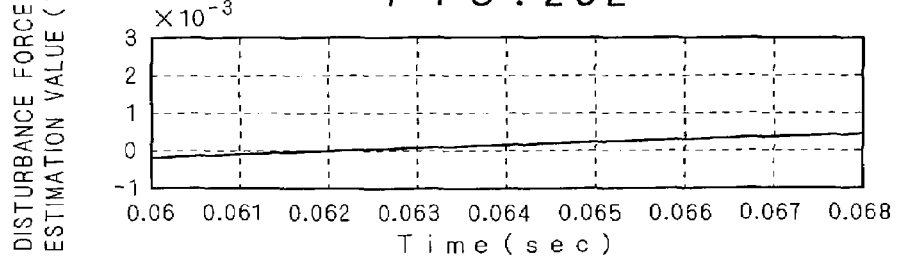

FIGS. 26A to 26E are graphs showing an effect of the control system 203 by a simulation. FIG. 26A show a state of a change in the follow target position d_p, and assumes a case where the disturbance acceleration Di_acc is zero, which corresponds to the eccentricity amount of the disk. FIG. 26B shows the residual error d_p_e, FIG. 26C shows the actuator control signal cont, FIG. 26D shows the defect detection signal DEFECT, and FIG. 26E illustrates the disturbance force estimation value $Di^\wedge$.

Figure 51A:
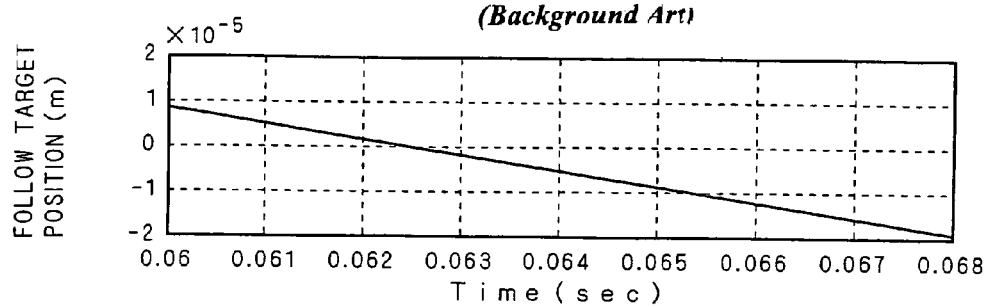
FIGS. 51A to 51D are graphs showing the operation of a tracking control performed by a control system 302.
Figure 51B:
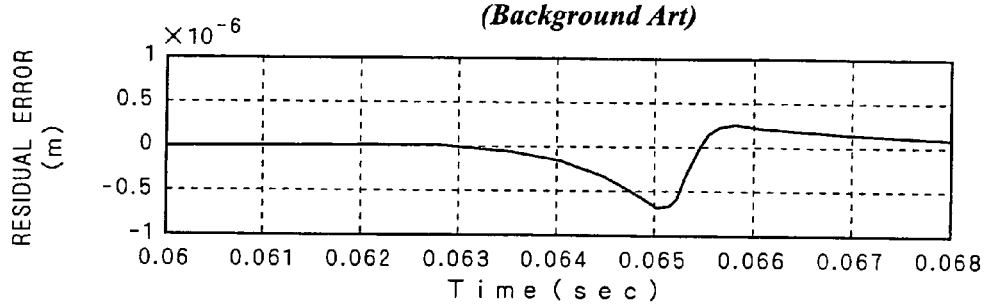
Figure 51C:
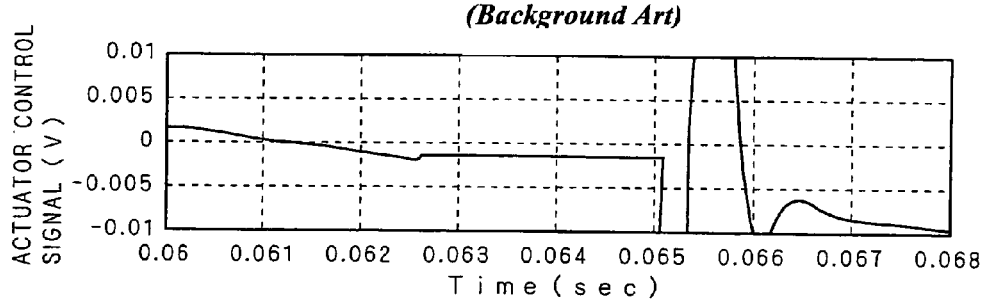
Figure 51D:
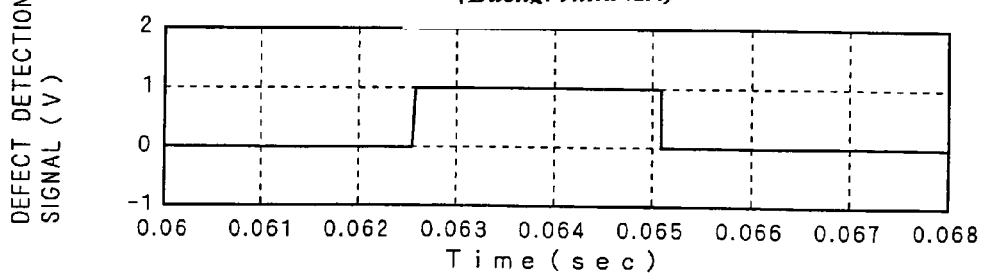

In the simulation, the crossover frequency in the open-loop characteristic of the control system 203 is set to 1 kHz, the estimation band of the disturbance observer 6 is set to 300 Hz, and the cutoff frequency of the low-pass filters 23a and 28a is set to 80 Hz. The other conditions are the same as analysis conditions of a simulation which obtains the graphs of FIGS. 51A to 51D described in the second conventional art. Therefore, the graphs of FIGS. 26A and 26D are the same as those of FIGS. 51A and 51D. In the graphs of FIGS. 26B and 26C, the graphs of FIGS. 51B and 51C are also shown by broken lines. The range of the vertical line of the graph of FIG. 26C is reduced as compared with that of the graph of FIG. 51C.

As shown in FIGS. 26A to 26E, the residual error does not fluctuate in the control system 203 during the defect period. The residual error at the exit of the defect is much smaller than that in the control system 302 in the second conventional art and is suppressed to almost zero. Therefore, also at the transition from the defect region to the defect-free region, continuity of the control is maintained.

Obviously, such an effect is obtained not only in the tracking control but also the focusing control. FIG. 21 employs the amplifiers 27 and 37 and the subtracter 81 as a configuration for feeding back the disturbance force estimation value $Di^\wedge$ and speed estimation value $x_0'^\wedge$ in the feedback unit 400. It is also possible to employ the amplifier 7 (refer to FIG. 7) and the subtracter 8 used in the control system 201 illustrated in FIG. 1. Further, the feedback unit 400 from which the subtracter 81 is excluded may be realized by digital computation by using a digital computation device such as a microcomputer or a DSP.

C3. Third Embodiment

In a third embodiment and a fourth embodiment which will be described hereinafter, a control system for solving, as a second problem of the second conventional art, a problem such that the residual error increases at the exit of a defect due to noise contained in the actuator control signal cont is proposed.

As described above, the cause of the problem is that the noise component becomes a pulse-shaped disturbance at the entrance of a defect and the actuator has an unstable speed. Therefore, by controlling the speed also in the defect region, the problem can be solved.

Since the disturbance observer 6 outputs the speed estimation value $x_0'^\wedge$, closed-loop for performing a control so that the speed estimation value $x_0'^\wedge$ is held at a low frequency component of a value of itself just before the entrance of the defect during the defect period can be constructed. It enables the speed $x_0'$ of the actuator in the defect region to be controlled, and the speed $x_0'$ which unnecessarily fluctuates due to the influence of noise at the entrance of the defect can be reset to a value which is not influenced by the noise. As a result, the position error d_p_e at the exit of the defect is suppressed, and stable defect compensation can be realized.

Figure 27:
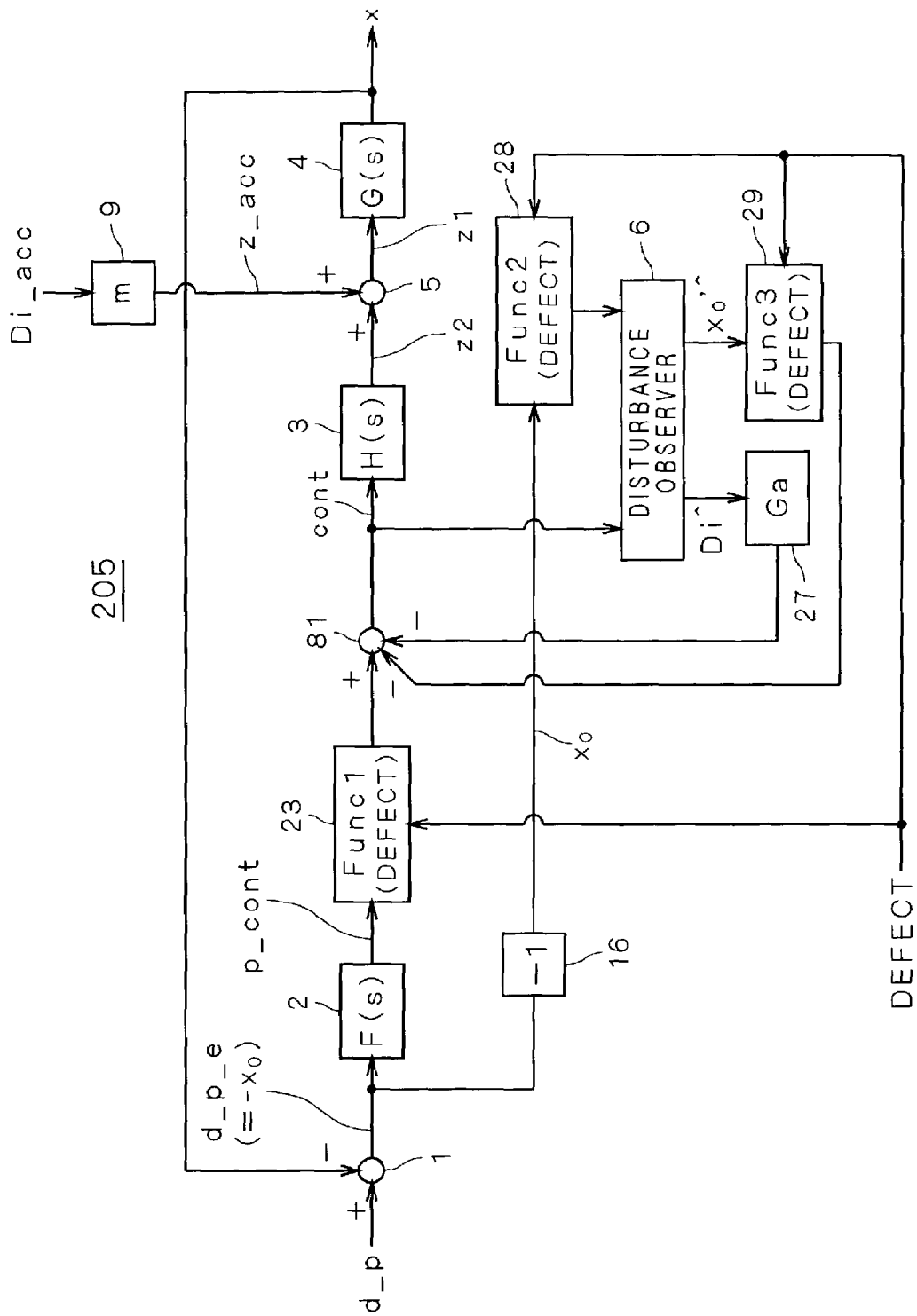
FIG. 27 is a block diagram showing the configuration of a control system 205 according to a third embodiment of the present invention.

FIG. 27 is a block diagram showing the configuration of a control system 205 according to a third embodiment. The control system 205 can be employed as, for example, a position control system for performing a light spot focusing control or tracking control in a tabletop, vehicle-mounted or portable optical disk drive. The control system 205 has, basically, a configuration similar to that of the control system 203 described in the second embodiment except that a third problem preventing block 29 is provided in place of the amplifier 37.

Figure 28:
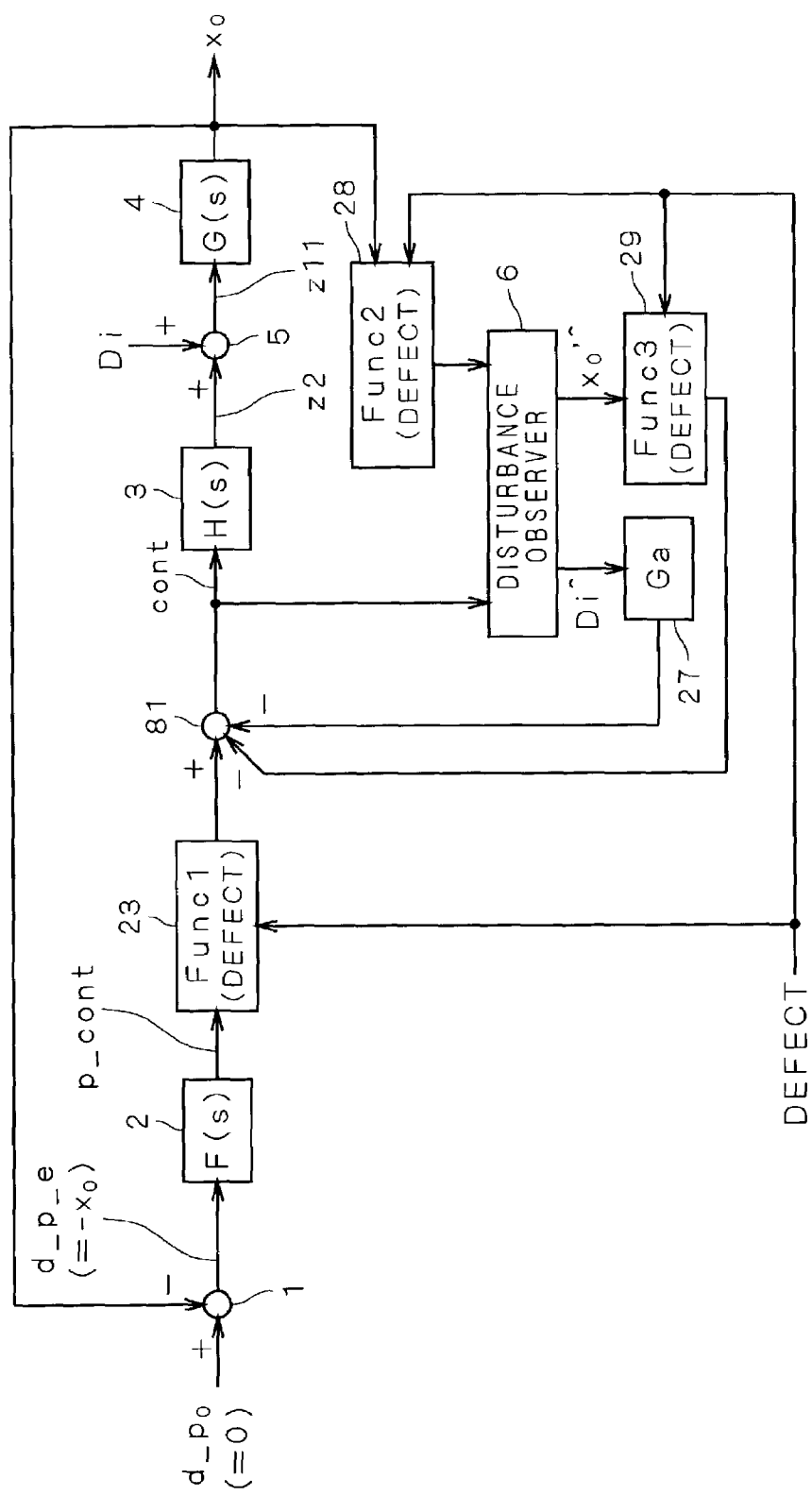
FIG. 28 is a block diagram showing the configuration of a control system 206.

To explain the operation of the control system 205, the block diagram is modified by performing equivalent conversion. In a manner similar to the second embodiment in which the control system 204 is derived from the control system 203, the disturbance force Di is introduced, the control target is changed to the zero follow position $x_0$, and the follow target becomes the zero follow target position $d_{p_0}$. In consideration of the function of the amplifier 16 and the equation (2), the amplifier 16 is omitted and the zero follow position $x_0$ is directly inputted to the second problem preventing block 28. The configuration of the control system 206 obtained in such a manner is equivalent to that of the control system 205 (FIG. 28). As described in the first embodiment, by introducing the disturbance force and regarding the follow target position d_p as a disturbance, the control target of the control system 206 is the zero follow position $x_0$ which can be observed.

Figure 29:
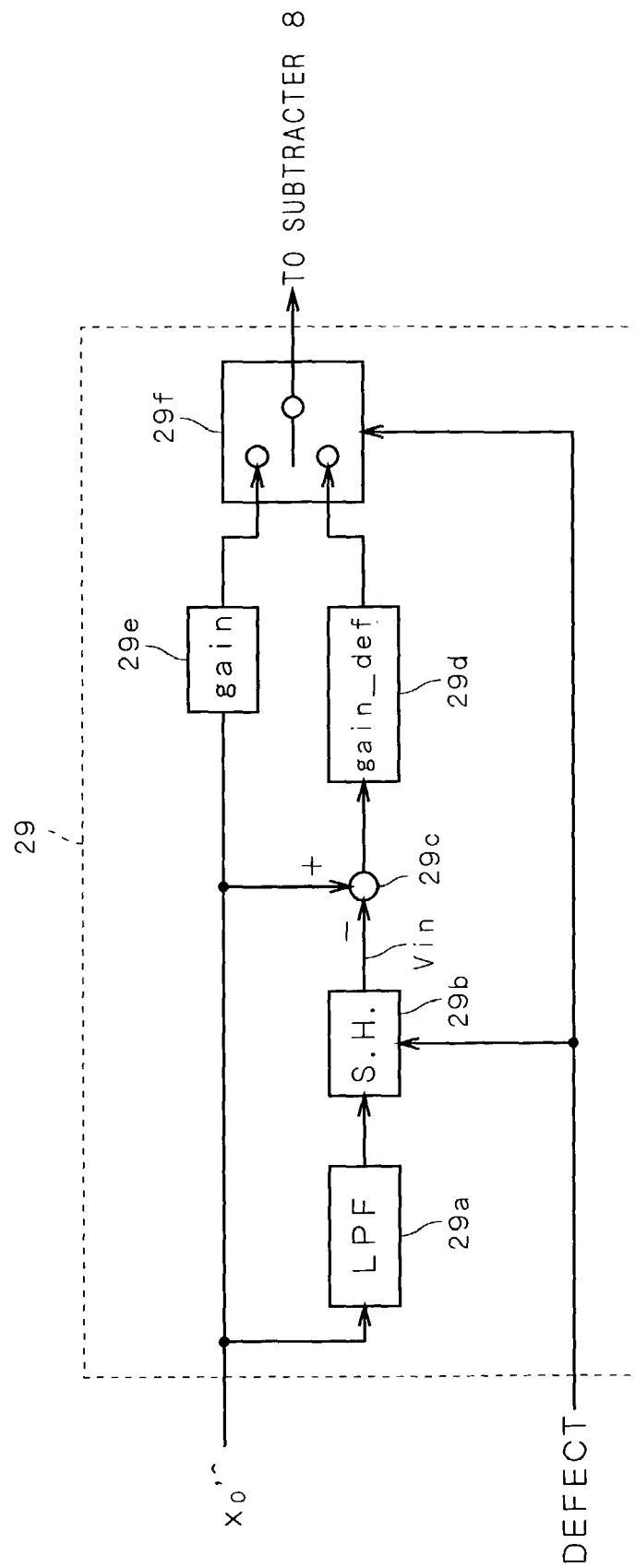
FIG. 29 is a block diagram showing the configuration of a third problem preventing block 29.

FIG. 29 is a block diagram showing the configuration of the third problem preventing block 29. As shown in FIG. 29, the third problem preventing block 29 has a low-pass filter 29a, a sample and hold circuit 29b, a subtracter 29c, amplifiers 29d and 29e, and a selection circuit 29f.

The selection circuit 29f supplies an output of the amplifier 29d to the subtracter 8 when the defect detection signal DEFECT is at the "H" level and supplies an output of the amplifier 29e when the defect detection signal DEFECT is at the "L" level to the subtracter 8.

The speed estimation value $x_0'^{\wedge}$ is inputted from the disturbance observer 6 to the low-pass filter 29a. The sample and hold circuit 29b holds an output of the low-pass filter 29a at the rising edge of the defect detection signal DEFECT and supplies it to the subtracter 29c. The speed estimation value $x_0'^{\wedge}$ is delayed by being passed through the low-pass filter 29a. Consequently, by holding the output of the low-pass filter 29a at the rising edge of the defect detection signal DEFECT, a low frequency component $v_{in}$ of the speed estimation value $x_0'^{\wedge}$ just before the entrance of the defect can be held.

The speed estimation value $x_0'^{\wedge}$ is also inputted to the subtracter 29c. The subtracter 29c subtracts the output $v_{in}$ of the sample and hold circuit 29b from the speed estimation value $x_0'^{\wedge}$ and outputs the resultant to the amplifier 29d. The amplifier 29d multiplies an output of the subtracter 29c by a coefficient gain_def and outputs the resultant to the selection circuit 29f.

The speed estimation value $x_0'^{\wedge}$ is also inputted to the amplifier 29e. The amplifier 29e multiplies the speed estimation value $x_0'^{\wedge}$ by a coefficient "gain" and outputs the resultant to the selection circuit 29f. Since the output of the amplifier 29e is supplied to the subtracter 81 during the defect-free period, the amplifier 29e corresponds to the amplifier 37 (FIG. 13), and the coefficient "gain" is selected, for example, as the same value as the coefficient Gb multiplied by the amplifier 37. In other words, adjustment of the magnitude of the coefficient "gain" corresponds to adjustment of the feedback gain β.

As described above, in the third problem preventing block 29, the product of the speed estimation value $x_0'^{\wedge}$ and the coefficient "gain" is outputted in correspondence with the defect-free region (first event). In correspondence with the defect region (second event), from the speed estimation value $x_0'^{\wedge}$ just before the entrance of the defect, a high frequency component thereof is removed to obtain a value $v_{in}$, and the result of the subtraction of the value $v_{in}$ from the speed estimation value $x_0'^{\wedge}$ is multiplied by the coefficient gain_def and outputted. By adjusting the value of the coefficient gain_def, the speed feedback amount supplied to the subtracter 81 can be adjusted.

Figure 30:
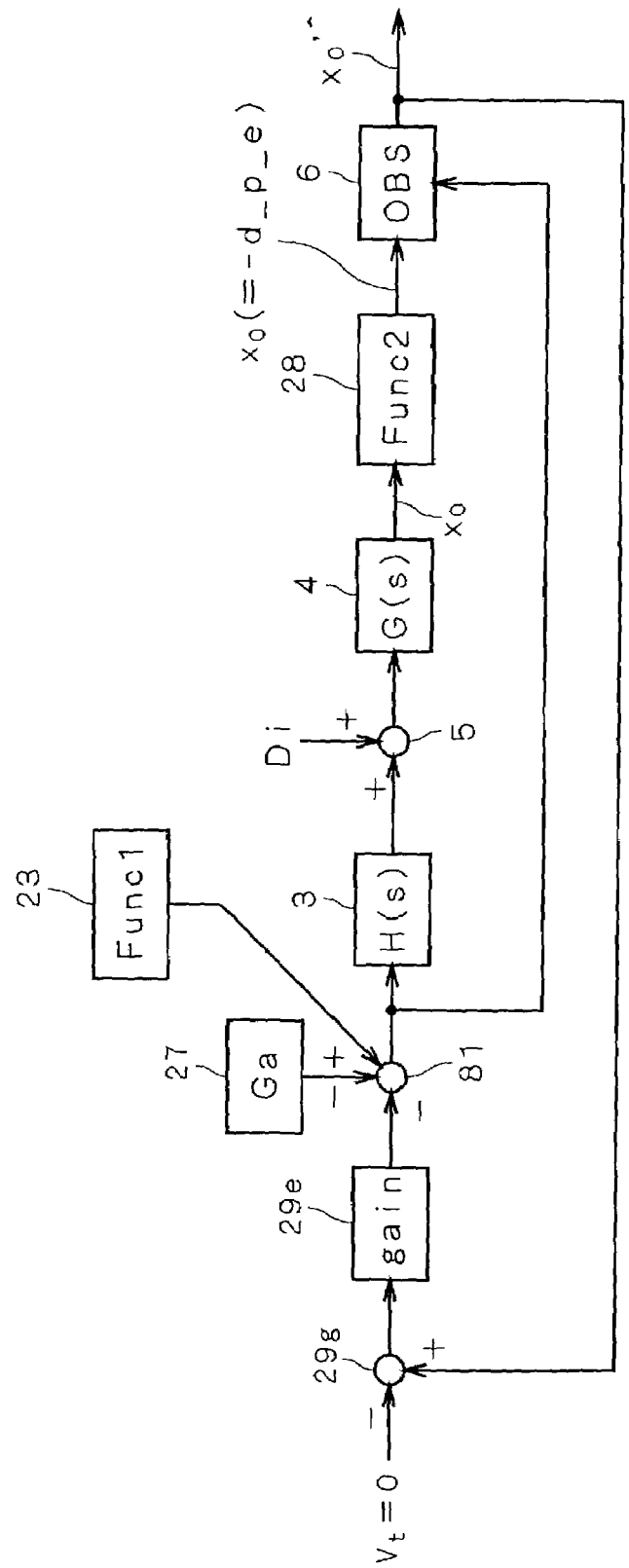
FIG. 30 is a block diagram showing the configuration of closed-loop for controlling a speed estimation value $x_0'^{\wedge}$.
Figure 31:
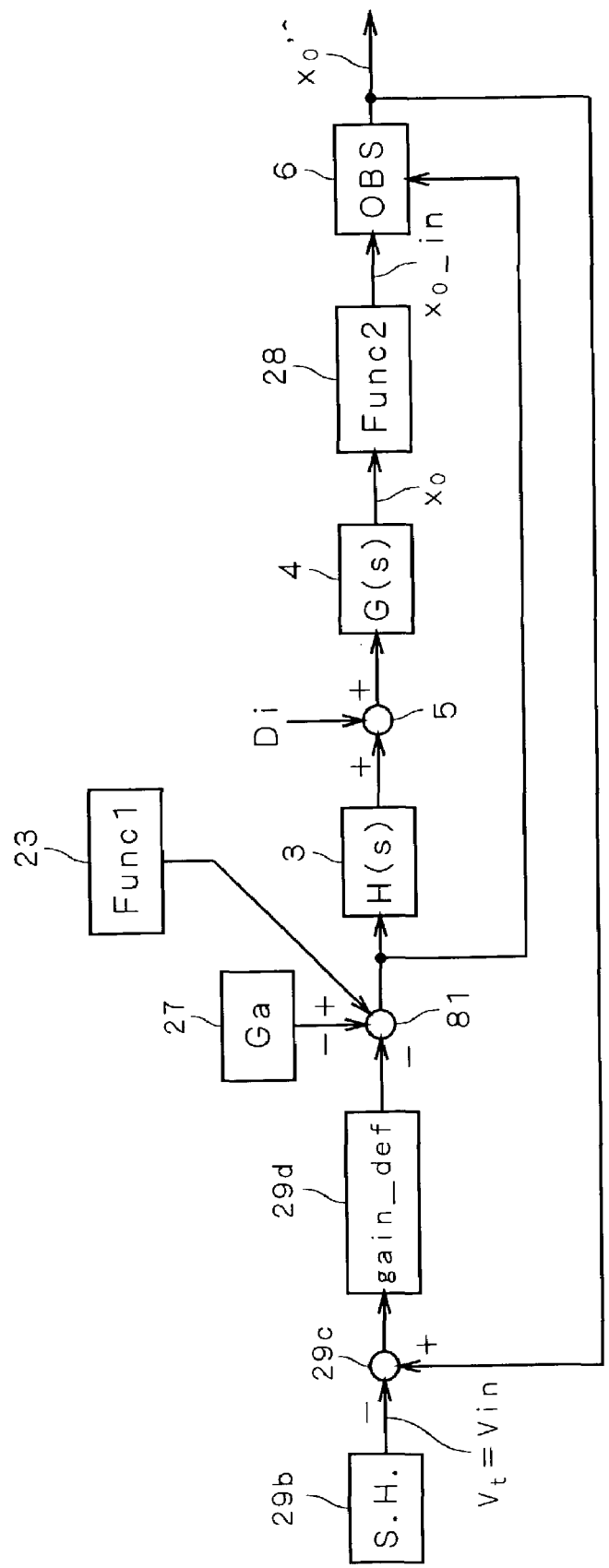
FIG. 31 is a block diagram showing the configuration of the closed-loop for controlling the speed estimation value $x_0'^{\wedge}$.

By the selecting function of the selection circuit 29f, the control system 206 can grasp that closed-loop in which a target value of the speed estimation value $x_0'^{\wedge}$, which differs according to the defect free period or the defect period is set is constructed. FIGS. 30 and 31 are block diagrams showing the configuration of closed-loop for controlling the speed estimation value $x_0'^{\wedge}$ during the defect-free period and the defect period, respectively.

In FIG. 30, during the defect-free period, the actuator control signal cont and the zero follow position $x_0$ are inputted to the disturbance observer 6. An output of the amplifier 29e is inputted to the subtracter 81. The speed estimation value $x_0'^{\wedge}$ is inputted from the disturbance observer 6 to the amplifier 29e. A subtracter 29g is virtually interposed between the input of the amplifier 29e and the output of the disturbance observer 6. To the subtracter 29g, the speed estimation value $x_0'^{\wedge}$ outputted from the disturbance observer 6 and the speed target value $v_t$ which is zero are inputted. The subtracter 29g subtracts the speed target value $v_t$ which is zero from the speed estimation value $x_0'^{\wedge}$ and outputs the resultant to the amplifier 29e. By introducing such a virtual subtracter 29g, the closed-loop of the unity feedback system for controlling the speed estimation value $x_0'^{\wedge}$ whose target value is zero can be constructed in correspondence with the defect-free period.

The operation shown in FIG. 30 is appropriate for the control systems 203 and 204 disclosed in the second embodiment in consideration of the operation of the selection circuit 29f. It is also appropriate for the control system 202 disclosed in the first embodiment in consideration of the operation of he selection circuits 23c and 28c. That is, in a control of obtaining a speed feedback amount by multiplying the speed estimation value $x_0'^{\wedge}$ by the coefficient Gb by the amplifier 37, it can be grasped that the closed-loop in which the target value of the speed estimation value $x_0'^{\wedge}$ is set to zero is constructed.

In FIG. 31, in the defect period, although the actuator control signal cont is inputted to the disturbance observer 6, the zero follow position $x_0$ is not inputted. By the function of the second problem preventing block 28, the low-frequency component $x_{0\_in}$ of the zero follow position $x_0$ just before the entrance of a defect is inputted in place of the zero follow position $x_0$ to the disturbance observer 6. With the configuration, the closed-loop for controlling the speed estimation value $x_0'^{\wedge}$ shown in FIG. 31 is not influenced by the position error d_p_e which becomes a false signal in the defect region.

An output of the amplifier 29d is inputted to the subtracter 81 during the defect period, and the speed estimation value $x_0'^{\wedge}$ is inputted from the disturbance observer 6 to the subtracter 29c. The subtracter 29c subtracts the value $v_{in}$ obtained by removing a high-frequency component of the speed estimation value $x_0'^{\wedge}$ just before the entrance of a defect from the speed estimation value $x_0'^{\wedge}$, and outputs the resultant to the amplifier 29d. By such a function of the subtracter 29c, in correspondence with the defect period, closed-loop of the unity feedback system for controlling the speed estimation value $x_0'^{\wedge}$ just before the entrance of a defect, more specifically, the speed estimation value $x_0'^{\wedge}$ whose target value is the low-frequency component $v_{in}$ can be constructed.

Figure 52A:
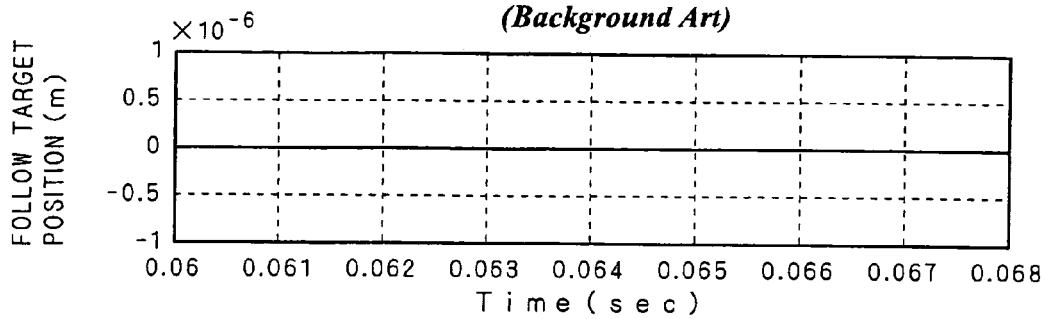
FIGS. 52A to 52D are graphs showing a result of analysis of the control system 302.
Figure 52B:
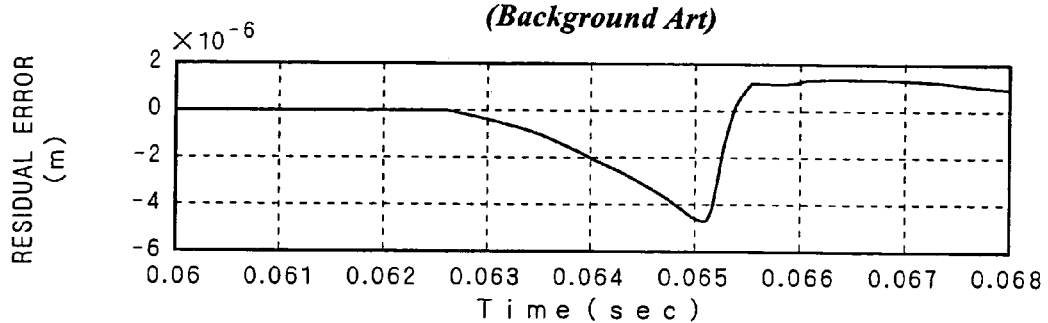
Figure 52C:
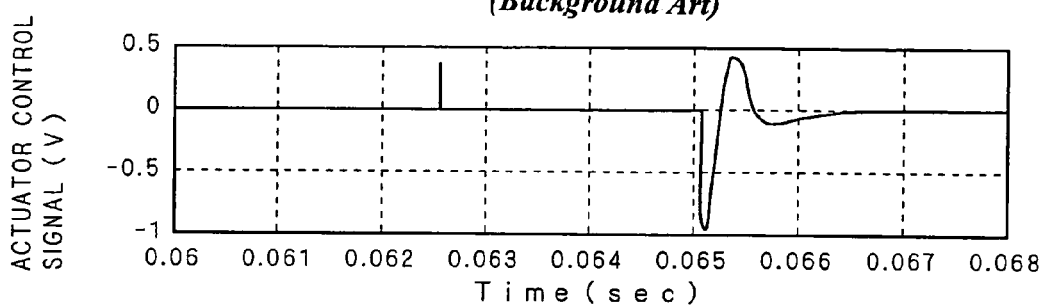

By adjusting the cutoff frequency of the low-pass filter 29a, the influence of the noise (refer to FIG. 52C) contained in the actuator control signal cont can be removed from the low-frequency component $v_{in}$ of the speed estimation value $x_0'^{\wedge}$ just before the entrance of a defect. As a result, fluctuations in the speed of the control target during the defect period caused by noise can be suppressed, and the residual error at the exit of the defect can be reduced.

The desirable range of the cutoff frequency of the low-pass filter 29a will now be examined. The low-pass filter 29a has to have the function of extracting the disk rotation frequency component of the speed estimation value $x_0'^{\wedge}$ without including noise. Consequently, the cutoff frequency of the low-pass filter 29a has to be set to a frequency higher than the disk rotation frequency.

Since the speed estimation value $x_0'^{\wedge}$ is outputted from the disturbance observer 6, the band of the speed estimation value $x_0'^{\wedge}$ is the estimation band fovs of the disturbance observer 6. Therefore, even if the cutoff frequency of the low-pass filter 29a is set to a frequency higher than the estimation band of the disturbance observer 6, information of the speed of the control target is not included at frequencies higher than the estimation band fovs of the disturbance observer 6, and noise increases. These are undesirable. It is desirable to set the cutoff frequency of the low-pass filter 29a to the estimation band fovs of the disturbance observer 6 or lower.

The estimation band fovs of the disturbance observer 6 is defined as expression of the pole (minimum pole) closest to the origin in a complex plane by using frequency. Therefore, it is desirable to set the cutoff frequency of the low-pass filter 29a to be higher than the disk rotation frequency and is equal to or lower than the minimum pole of the disturbance observer 6.

By setting the cutoff frequency of the low-pass filter 29a as described above, fluctuations in speed of the control target during the defect period are suppressed, and the residual error at the exit of the defect can be reduced.

Figure 32A:
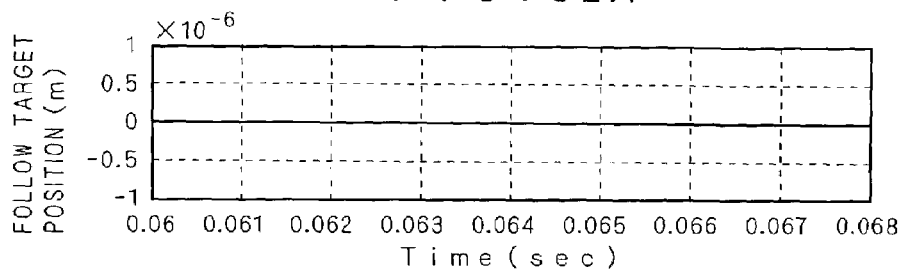
FIGS. 32A to 32E are graphs showing an effect of a control system 205.
Figure 32B:
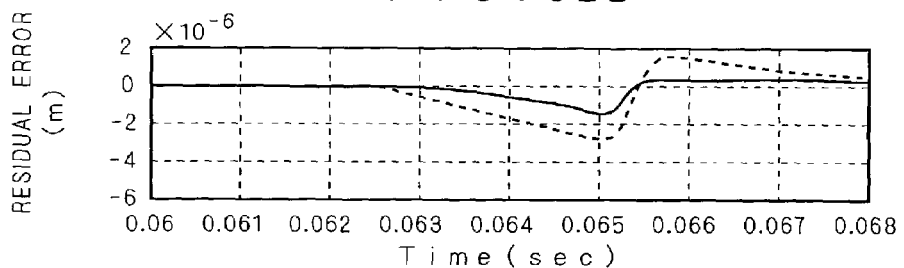
Figure 32C:
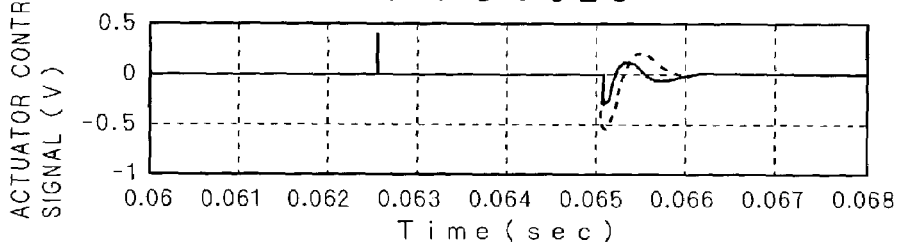
Figure 32D:
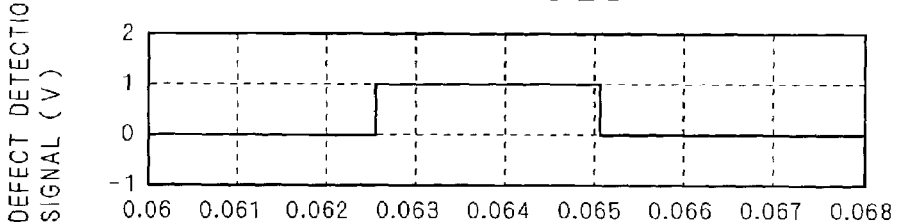
Figure 32E:
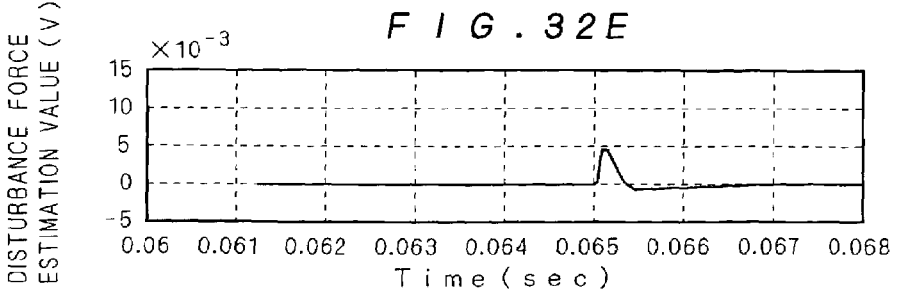

FIGS. 32A to 32E are graphs showing an effect of the control system 205 of the embodiment by a simulation. FIG. 32A shows the follow target position d_p, FIG. 32B shows the residual error d_p_e, FIG. 32C shows the actuator control signal cont, FIG. 32D shows the defect detection signal DEFECT, and FIG. 32E show the disturbance force estimation value $Di\hat{}$.

Figure 52D:
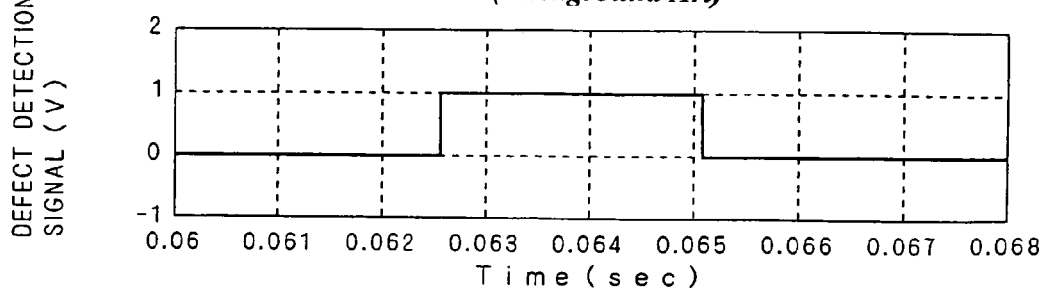

In the simulation, the crossover frequency in the open-loop characteristic of the control system 205 is set to 1 kHz, the estimation band of the disturbance observer 6 is set to 300 Hz, and the cutoff frequency of the low-pass filters 23a, 28a, and 29a is set to 80 Hz. The other conditions are the same as the analysis conditions of the simulation by which the graphs FIGS. 52A to 52D described in the second conventional art are obtained. Therefore, the graphs of FIGS. 32A and 32D are the same as those of FIGS. 52A and 52D. In each of the graphs of FIGS. 32B and 32C, the result of the control system 205 is shown by the solid line and the result of the control system 302 is shown by the broken line.

Figure 33A:
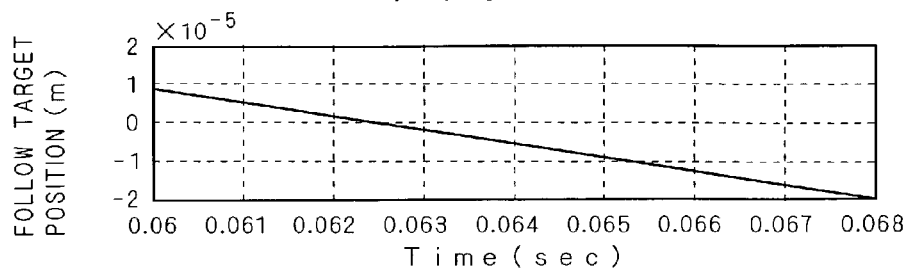
FIGS. 33A to 33E are graphs showing an effect of the control system 205.
Figure 33B:
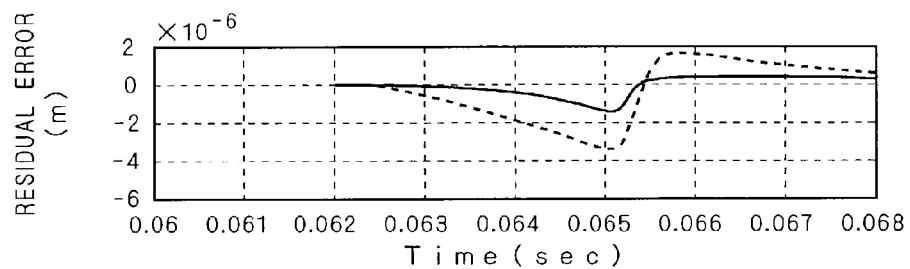
Figure 33C:
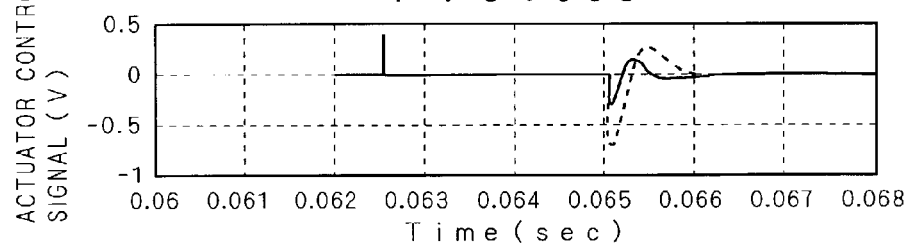
Figure 33D:
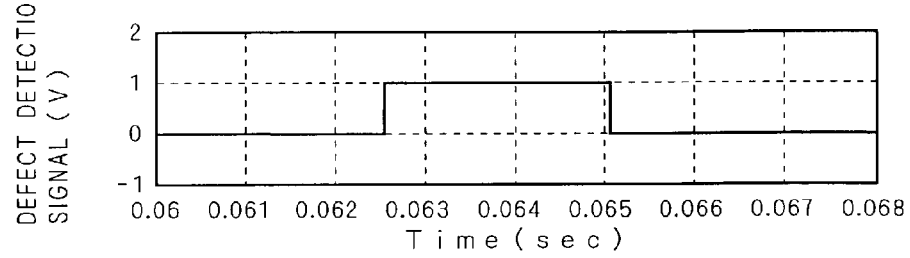
Figure 33E:
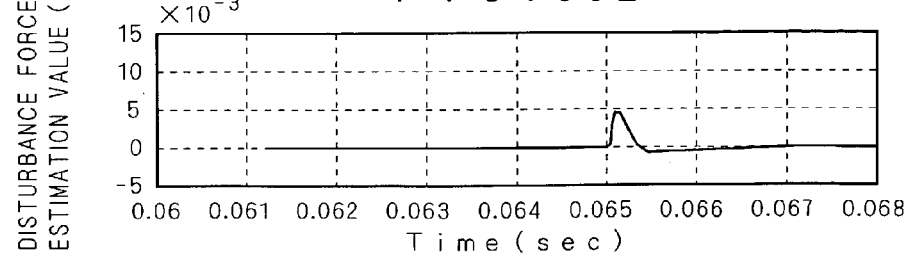

FIGS. 33A to 33E show a simulation result in the case of further adding the eccentricity amount of a disk shown in FIG. 26A to the noise condition in the simulation of which result is shown in FIGS. 32A to 32E. FIG. 33A shows the follow target position d_p, FIG. 33B shows the residual error d_p_e, FIG. 33C shows the actuator control signal cont, FIG. 33D shows the defect detection signal DEFECT, and FIG. 33E shows the disturbance force estimation value $Di\hat{}$. In each of the graphs of FIGS. 33B and 33C, the result of the control system 205 is shown by the solid line, and the result of the control system 302 is shown by the broken line.

As understood from FIGS. 32A to 32E and FIGS. 33A to 33E, in the control system 205 according to the third embodiment, the residual error at the exit of the defect is suppressed more as compared with the control system 302 according to the second conventional art. This is because that the disturbance observer 6 can control fluctuations in speed caused by noise contained in the actuator control signal cont to a predetermined value during the defect period by the function of the third problem preventing block 29.

In such a manner, by feeding back the external force estimation value $Di\hat{}$ also in the defect region, the disk physical distortion is interpolated. By feeding back the speed estimation value $x_0'\hat{}$, noise added to the actuator control signal cont can be suppressed. Therefore, also in the defect region, stable control can be realized, and the continuity of the control at the exit of the defect can be obtained.

Obviously, such an effect can be obtained not in the tracking control but similarly in the focusing control. In the defect-free region, the control system 205 according to the embodiment functions in a manner similar to the control system 203 according to the second embodiment. Therefore, the effects of the control system 203 can be obtained in the defect-free region. Further, in a manner similar to the second embodiment, the disturbance observer 6, second problem preventing block 28, amplifier 16, third problem preventing block 29, and amplifier 27 may be realized by digital computation by using a digital computing device such as a microcomputer or a DSP.

C4. Fourth Embodiment

Figure 34:
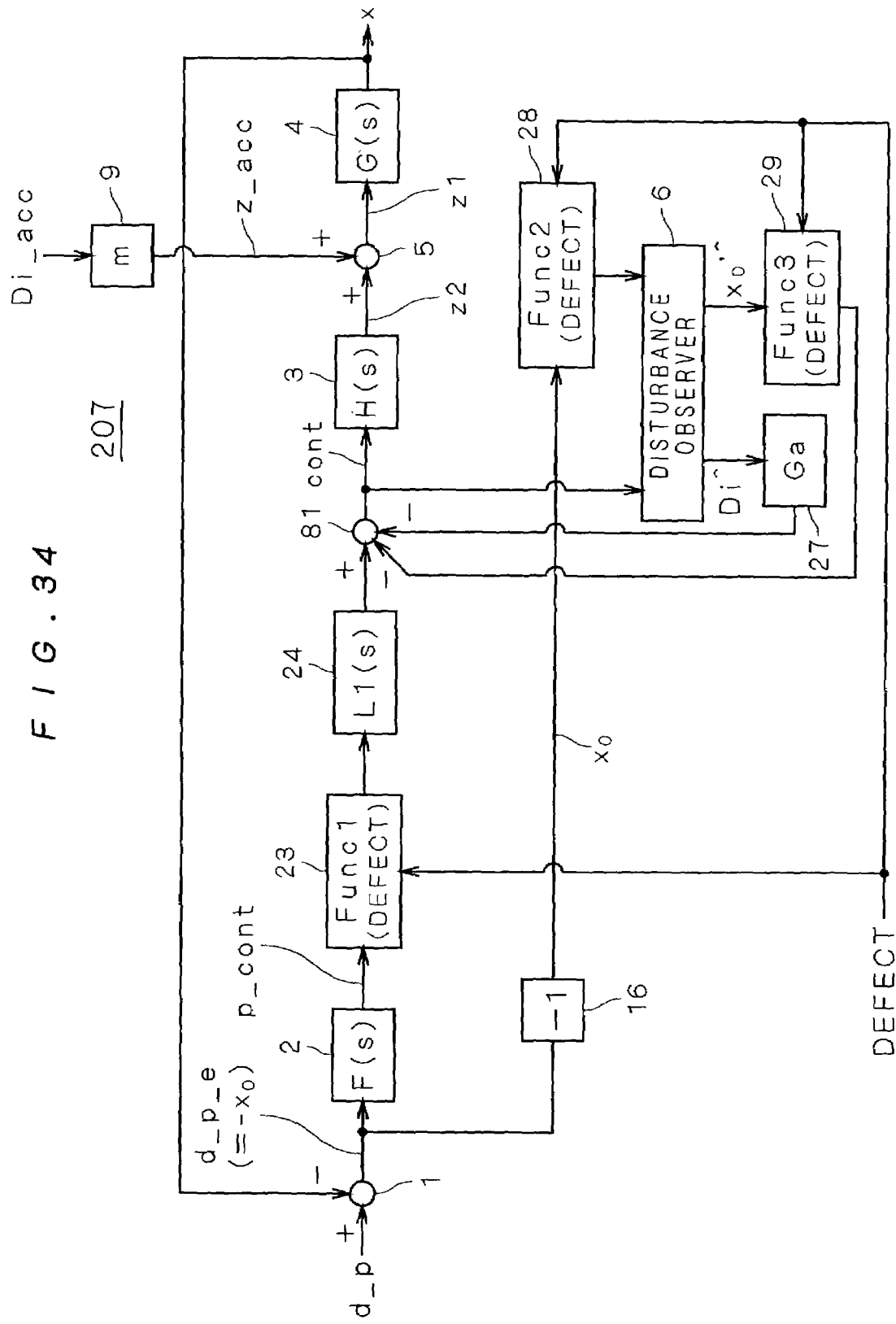
FIG. 34 is a block diagram showing the configuration of a control system 207 according to a fourth embodiment of the present invention.

FIG. 34 is a block diagram showing the configuration of a control system 207 according to a fourth embodiment. The control system 207 can be also employed as, for example, a position control system for performing a light spot focusing control or tracking control in a tabletop, vehicle-mounted or portable optical disk drive. The control system 207 has, basically, a configuration similar to that of the control system 205 described in the third embodiment except that a low-pass filter 24 is inserted between the first problem preventing block 23 and the subtracter 8.

Figure 35:
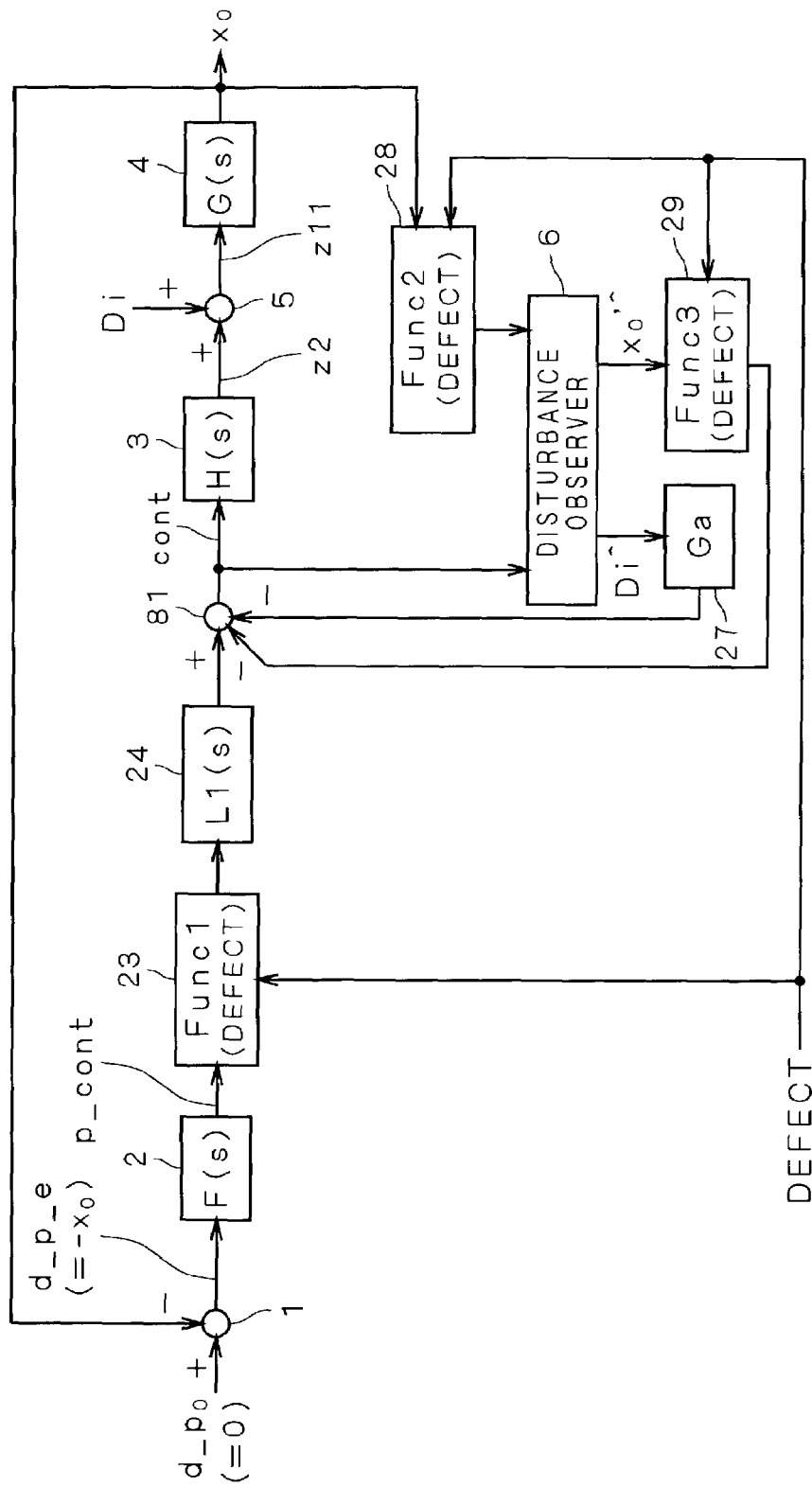
FIG. 35 is a block diagram showing the configuration of a control system 208.

To explain the operation of the control system 207, the block diagram is modified by performing equivalent conversion. In a manner similar to the second embodiment in which the control system 204 is derived from the control system 203, the disturbance force Di is introduced, the control target is changed to the zero follow position $x_0$, and the follow target becomes the zero follow target position $d\_p_0$. In consideration of the function of the amplifier 16 and the equation (2), the amplifier 16 is omitted and the zero follow position $x_0$ is directly inputted to the second problem preventing block 28. The configuration of the control system 208 obtained in such a manner is equivalent to that of the control system 207 (FIG. 35). As described in the first embodiment, by introducing the disturbance force and regarding the follow target position d_p as a disturbance, the control target of the control system 206 is the zero follow position $x_0$ which can be observed.

In each of the control systems 207 and 208 according to the embodiment, the low-pass filter 24 for extracting low-frequency components from an output of the first problem preventing block 23 is further provided. By adjusting the cutoff frequency of the low-pass filter 24, high-frequency noise added to the position control signal p_cont can be removed, and a pulse-state noise added to the actuator control signal cont can be removed. As a result, fluctuations in the speed of the control target during the defect period caused by noise added to the actuator control signal cont can be suppressed more than the control systems 205 and 206 according to the third embodiment, and the residual error at the exit of a defect can be further reduced.

A method of setting the cutoff frequency of the low-pass filter 24 will be described. The function of the low-pass filter 24 is to reduce the noise included in the position control signal p_cont, more specifically, the position control signal p_cont in the defect-free period. For example, when the phase compensation block 2 included in each of the control systems 207 and 208 for performing the following control is constructed by a digital circuit operating at a predetermined sampling frequency, it is desirable to suppress at least the sampling noise. Therefore, in the case where the phase compensation block 2 is constructed by a digital circuit operating at a predetermined sampling frequency, the cutoff frequency of the low-pass filter 24 is desirably set to lower than at least the sampling frequency.

To improve the noise reducing effect of the low-pass filter 24, it is desirable to set the cutoff frequency as low as possible. However, if the cutoff frequency is set to a few kHz, the low-pass filter 24 shifts the phase, so that the phase margin in the open-loop characteristic in the control system 207 decreases. As a result, there is the possibility that stability of the control systems 207 and 208 deteriorates.

FIGS. 36A and 36B are graphs showing the open-loop characteristic of the control system 207. FIG. 36A shows the gain characteristic, and FIG. 36B shows the phase characteristic. The solid line in each of the graphs shows the characteristic before the low-pass filter 24 is inserted. The broken line indicates the characteristic after the insertion. The characteristic is that in the defect-free period in the case where the cutoff frequency of the low-pass filter 24 is set to, for example, 8 KHz and the disturbance force estimation value $Di\hat{}$ is not fed back ($Ga=\alpha=0$ in the amplifier 27). As shown in FIG. 36B, by inserting the low-pass filter 24, it can be recognized that the phase margin decreases.

The decrease in the phase margin by the insertion of the low-pass filter 24 can be recovered by increasing the gain for obtaining a speed feedback amount. Concretely, it can be realized by increasing the coefficient "gain" of the amplifier 29e (refer to FIG. 29) for multiplying the speed estimation value $x_0'\hat{}$.

Figure 37A:
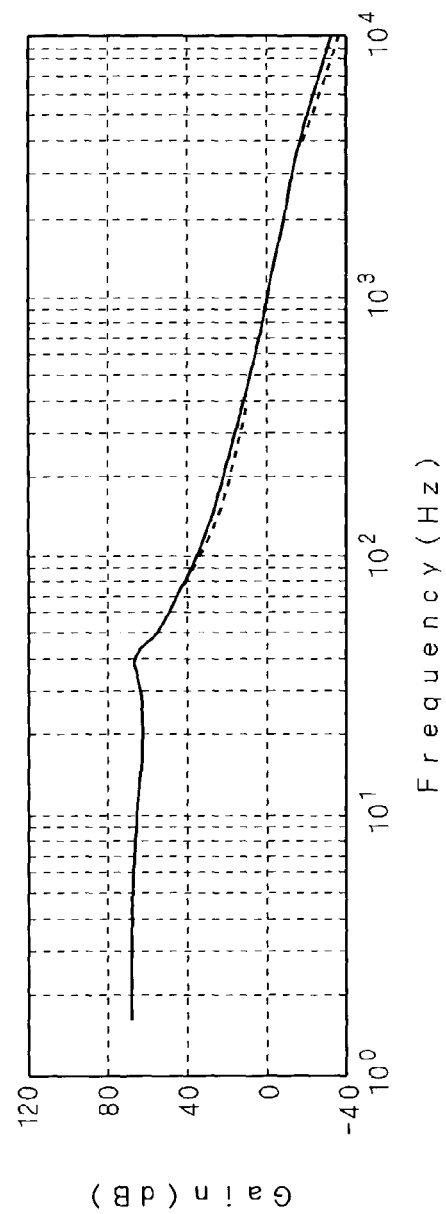
FIGS. 37A and 37B are graphs showing the open-loop characteristic of the control system 207.
Figure 37B:
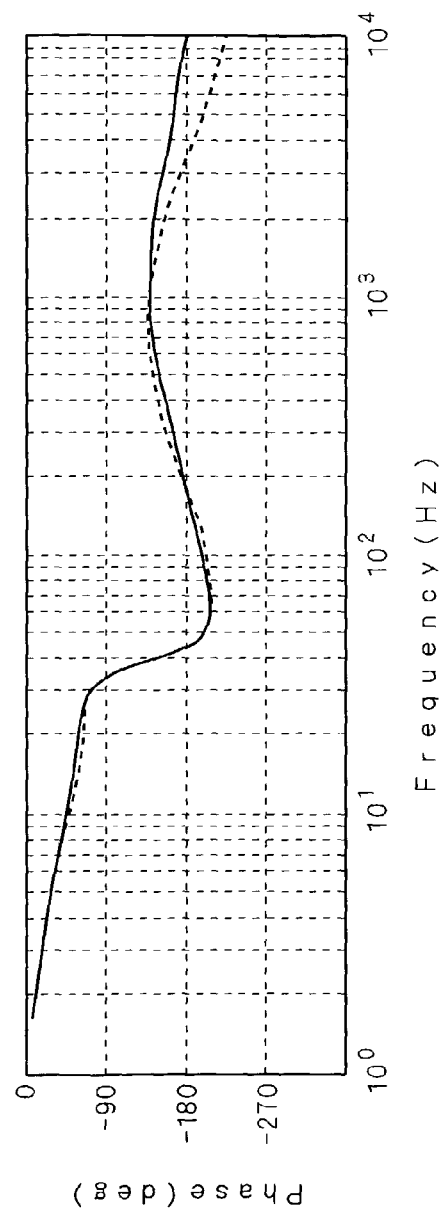

FIGS. 37A and 37B are graphs each showing the open-loop characteristic of the control system 207. FIG. 37A shows the gain characteristic, and FIG. 37B shows the phase characteristic. The solid line in each of the graphs shows the case before the low-pass filter 24 is inserted. The broken line indicates the case after the low-pass filter 24 (having the cutoff frequency of 8 kHz) is inserted. The case where the gain for obtaining the speed feedback amount is increased more than the case of FIG. 36 is shown. As shown in FIG. 37B, by increasing the gain for obtaining the speed feedback amount, decrease in the phase margin caused by insertion of the low-pass filter 24 can be almost prevented.

Further, in the defect-free period, by feeding back the disturbance force estimation value $Di\hat{}$, as described in the first embodiment, the low-frequency-band characteristic in the gain characteristic of the open-loop characteristic of the control system 207 can be improved. FIGS. 38A and 38B are graphs showing the open-loop characteristic of the control system 207 when the disturbance force estimation value $Di\hat{}$ and the speed estimation value $x_0'\hat{}$ are fed back. FIG. 38A shows the gain characteristic and FIG. 38B shows the phase characteristic. The solid line in each of the graphs indicates the characteristic before the low-pass filter 24 is inserted, and the broken line indicates the characteristic of the case where the low-pass filter 24 (having the cutoff frequency of 8 kHz) is inserted. The speed feedback amount is set to be larger than the characteristic indicated by the broken line of each of FIGS. 37A and 37B so that the phase margin does not decrease due to the feedback of the disturbance force estimation value $Di\hat{}$.

As shown in FIG. 38A, by feeding back the disturbance force estimation value $Di\hat{}$, the low-frequency-band characteristic in the gain characteristic of the open-loop characteristic is improved. Further, by increasing the gain for obtaining the speed feedback amount, decrease in the phase margin which is caused by insertion of the low-pass filter 24 and decrease in the phase margin due to feedback of the disturbance force estimation value $Di\hat{}$ are almost prevented.

FIG. 39 is a graph showing a result of recognizing the effect of the control system 207 of the embodiment by a simulation. The simulation is performed under the same analysis conditions as those of the simulation of which result is shown in FIG. 32. FIG. 39A shows the follow target position d_p, FIG. 39B shows the residual error, FIG. 39C shows the actuator control signal cont, FIG. 39D shows the waveform of the defect detection signal DEFECT, and FIG. 39E shows the disturbance force estimation value $Di\hat{}$. The broken line in the graphs shows the result of a simulation performed in the case of using the control system 207 according to the embodiment, and the solid line shows the result of a simulation performed in the case of using the control system 205 according to the third embodiment. Therefore, FIGS. 39A and 39D are the same as FIGS. 32A and 32D. The solid-line graphs in FIGS. 39B, 39C, and 39D coincide with those in FIGS. 32B, 32C, and 32D, respectively. The range of the vertical line of each of the graphs of FIGS. 39B, 39C, and 39D is larger than that of the graphs of FIGS. 32B, 32C, and 32D.

FIGS. 40A to 40E show a result of a simulation performed under conditions obtained by further adding the eccentricity amount of a disk employed in the simulation shown in FIG. 26 to the noise conditions in the simulation of which result is shown in FIGS. 39A to 39E. FIG. 40A shows the follow target position d_p, FIG. 40B shows the residual error, FIG. 40C shows the actuator control signal cont, FIG. 40D shows the waveform of the defect detection signal DEFECT, and FIG. 40E shows the disturbance force estimation value $Di\hat{}$. The broken line in the graphs shows the result of a simulation performed in the case of using the control system 207 according to the embodiment, and the solid line shows the result of a simulation performed in the case of using the control system 205 according to the third embodiment. Therefore, FIGS. 40A and 40D are the same as FIGS. 33A and 33D. The solid-line graphs in FIGS. 40B, 40C, and 40D coincide with those in FIGS. 33B, 33C, and 33D, respectively. The range of the vertical line of each of the graphs of FIGS. 40B, 40C, and 40D is larger than that of the graphs of FIGS. 33B, 33C, and 33D.

Figure 39A:
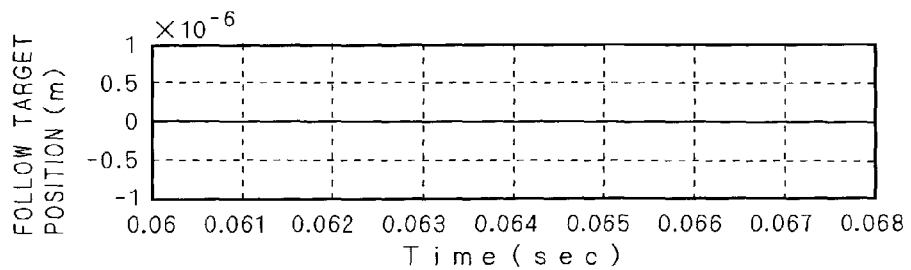
FIGS. 39A to 39E are graphs showing an effect of the control system 207.
Figure 39B:
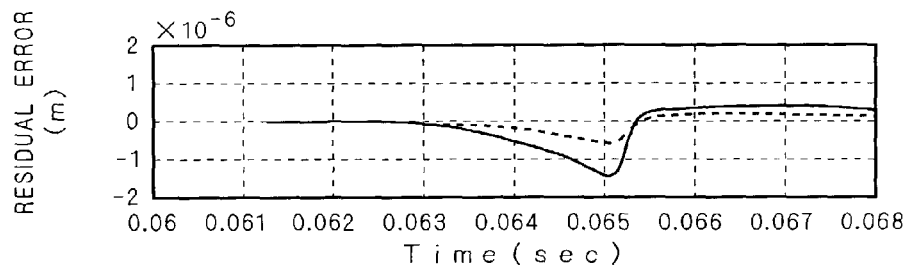
Figure 39C:
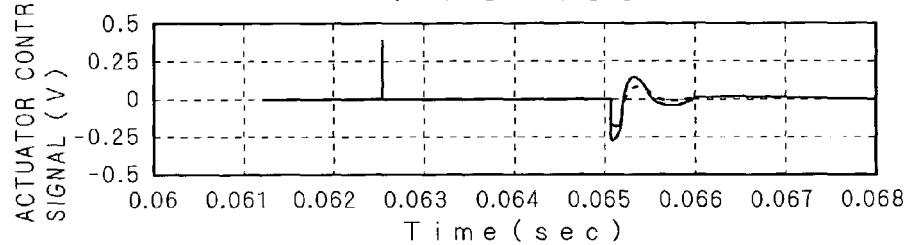
Figure 39D:
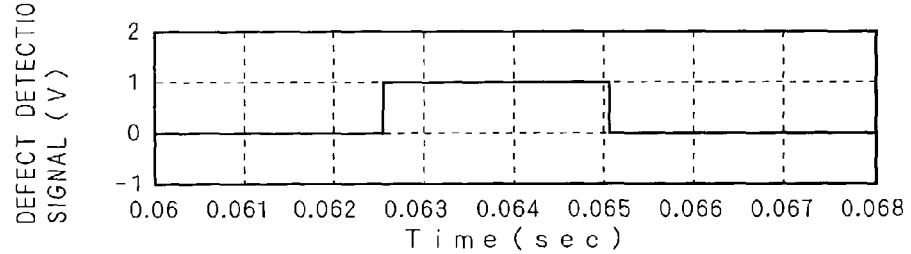
Figure 39E:
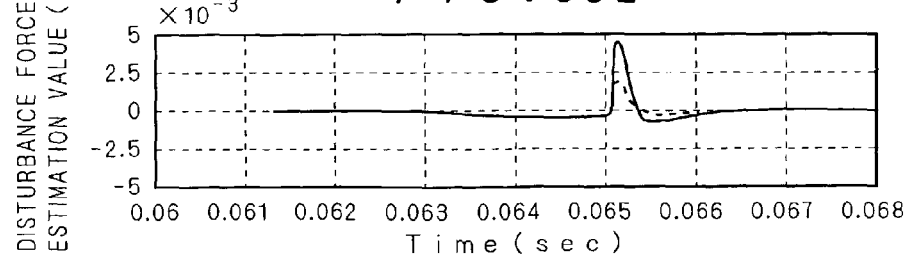

As shown in FIGS. 39B and 40B, in the control system 207 according to the embodiment, the residual error at the exit of the defect is suppressed more than the control system 205 according to the third embodiment.

Obviously, such an effect can be similarly obtained not only in the tracking control but also in the focusing control.

Figure 41:
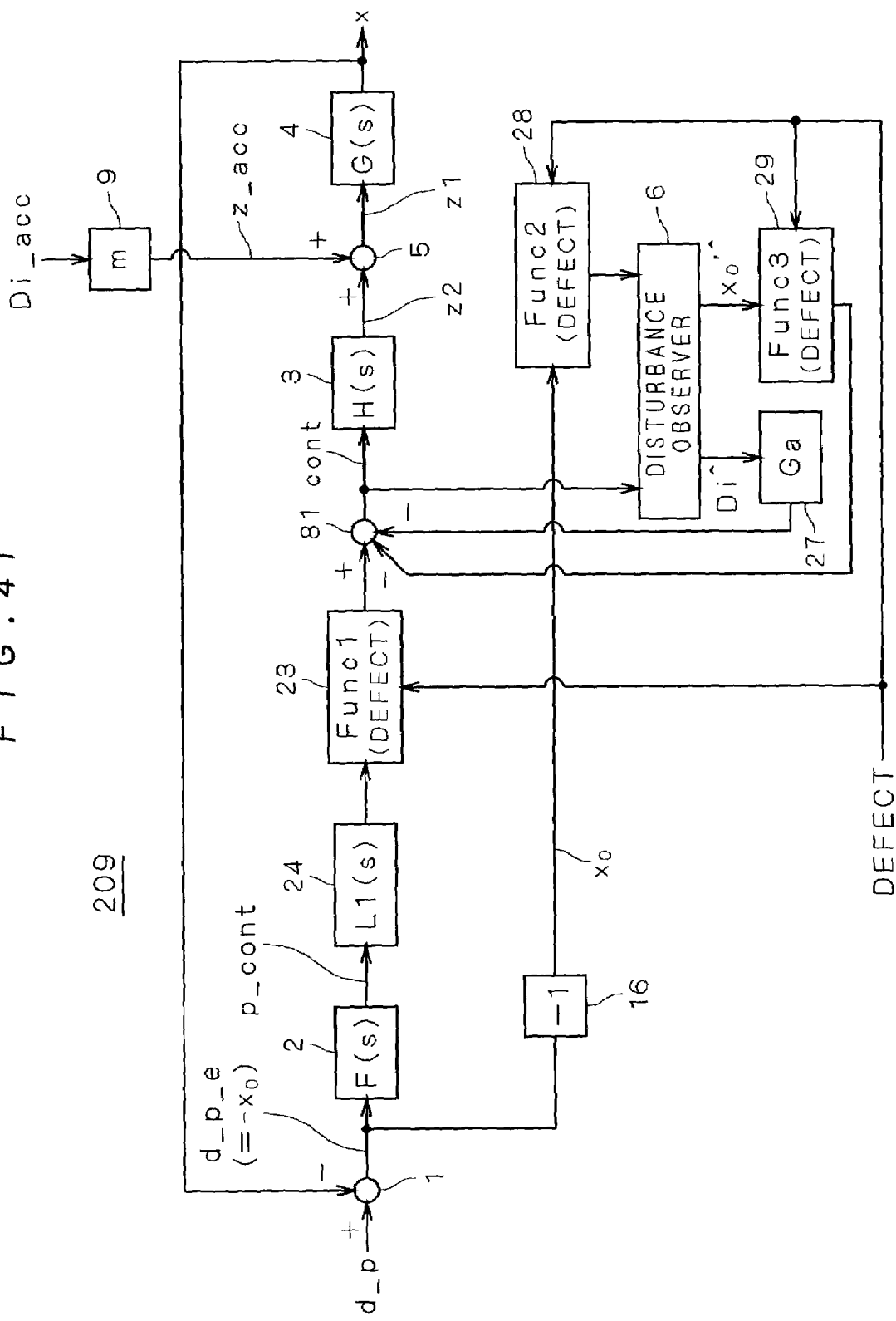
FIG. 41 is a block diagram showing the configuration of another control system 209 according to the fourth embodiment of the present invention.
Figure 42:
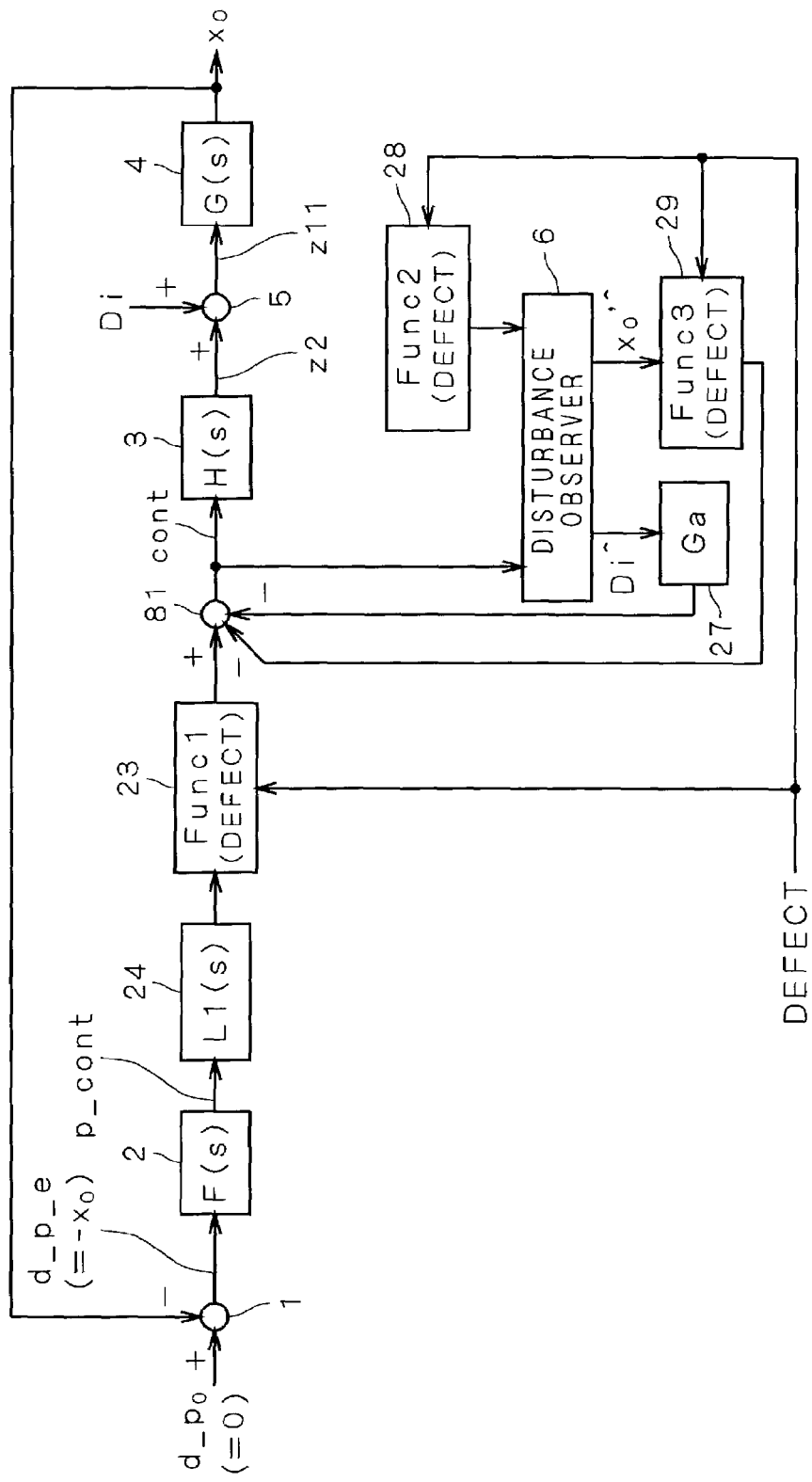
FIG. 42 is a block diagram showing the configuration of a control system 210.
Figures 44A, 44B:
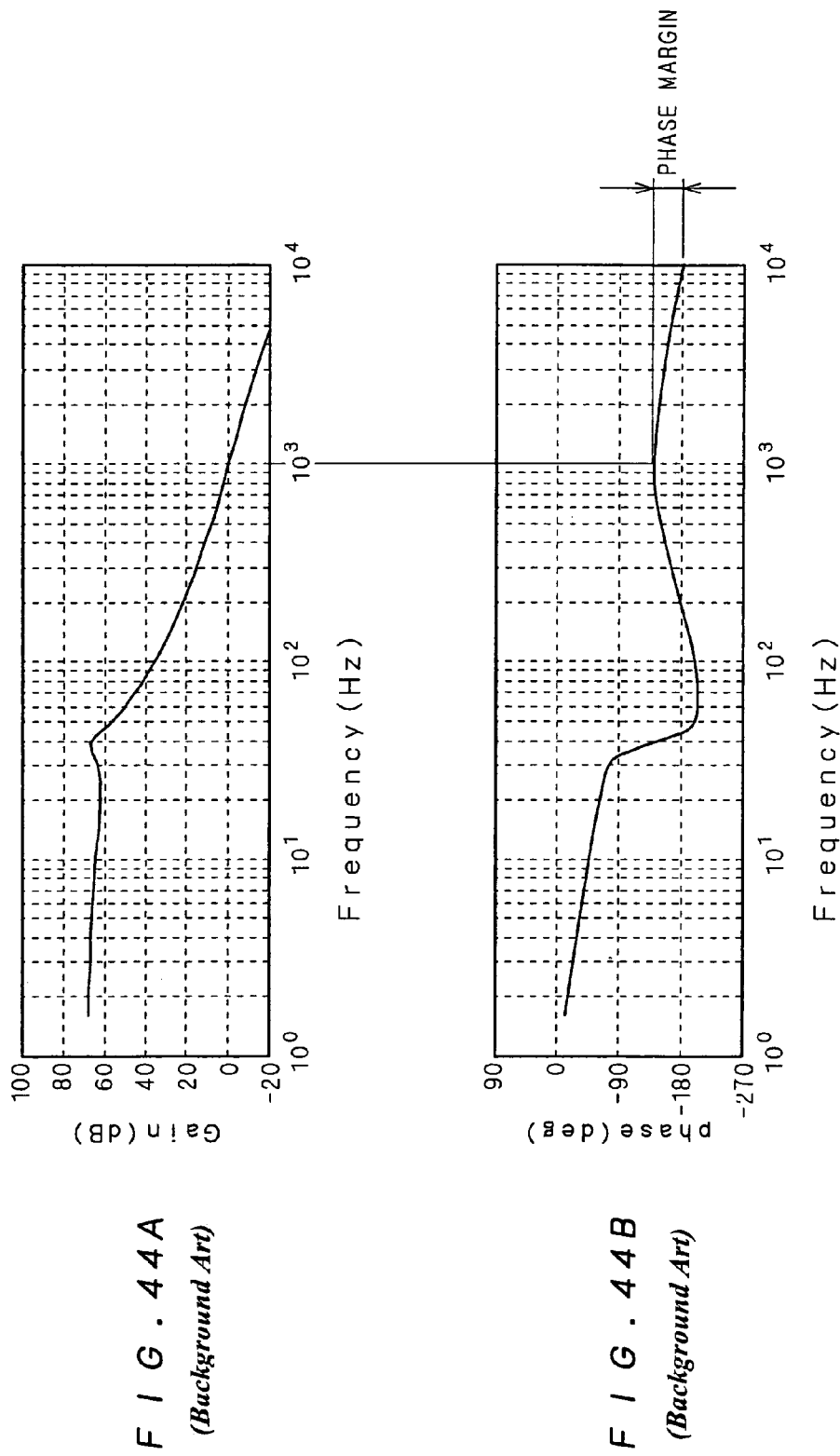
FIGS. 44A and 44B are graphs showing open-loop characteristic in the control system 301.
Figure 47A:
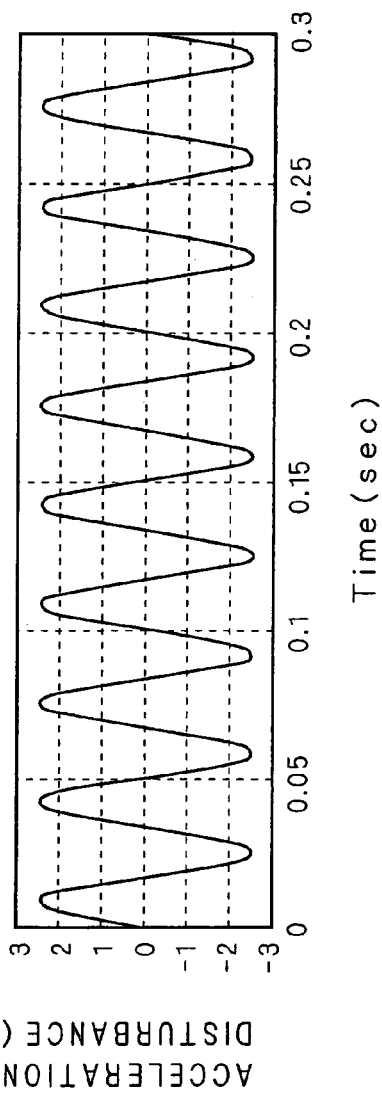
FIGS. 47A and 47B are graphs showing the operation of the control system 301.
Figure 47B:
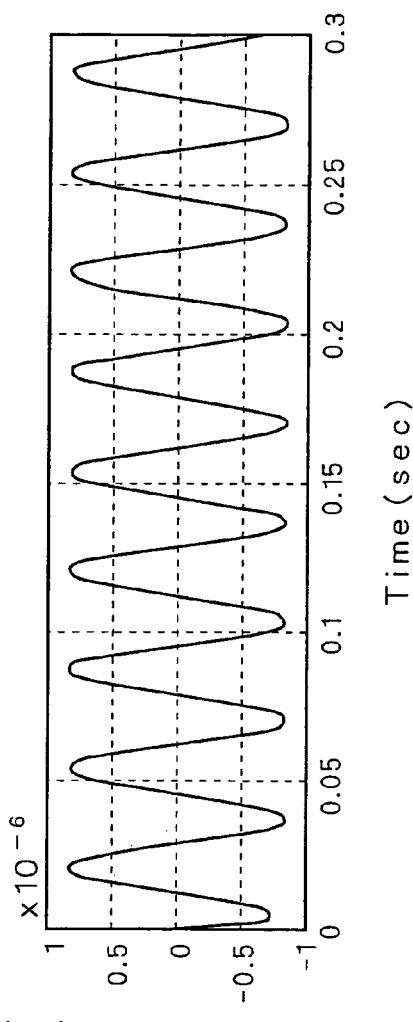

The low-pass filter 24 may be inserted between the phase compensation block 2 and the first problem preventing block 23. FIG. 41 is a block diagram showing the configuration of another control system 209 according to the embodiment. FIG. 42 is a block diagram showing the configuration of a control system 210 obtained by performing equivalent conversion on the control system 209. By introducing the disturbance force Di to the control system 209 and regarding the follow target position d_p as a disturbance, the control target of the control system 210 is the zero follow position $x_0$ which can be observed.

In each of the control systems 209 and 210, not the position control signal p_cont but the output of the low-pass filter 24 is inputted to the first problem preventing block 23. The low-pass filter 24 has the function of suppressing noise entering itself, and the first problem preventing block 23 has the function of holding a value inputted to itself just before the entrance of a defect. Therefore, dynamic characteristics of the control systems 207 and 209 (or control systems 208 and 210), including the low-pass filter 24 arranged in opposite positions relative to the first problem preventing block 23, are almost the same. Also by the control systems 209 and 210, an effect similar to that produced by the control systems 207 and 208 can be obtained.

In the case where the phase compensation block 2 is constructed by a digital circuit operating at a predetermined sampling frequency in the control system 209, desirably, the cutoff frequency of the low-pass filter 24 is set to be lower than at least the sampling frequency.

Like the control system 207, decrease in the phase margin of the open-loop characteristic of the control system 209 due to the low-pass filter 24 can be improved by increasing the gain for obtaining the speed feedback amount.

It can be grasped that the first problem preventing block 23 performs a first problem preventing process together with the low-pass filter 24. Specifically, it can be grasped that, in the control systems 207 and 208, high-frequency components are removed at the final stage in the first problem preventing process. In the control systems 209 and 210, high-frequency components are removed at the first stage in the first problem preventing process.

While the invention has been shown and described in detail, the foregoing description is in all aspects illustrative and not restrictive. It is therefore understood that numerous modifications and variations can be devised without departing from the scope of the invention.

What is claimed is:

1. A method for controlling a position of a movable part of an actuator which drives an optical pickup to a target position, said method comprising:
   obtaining an estimation value of a disturbance force by a disturbance observer for obtaining said disturbance force based on a position error of said movable part with respect to said target position and an actuator control signal, said disturbance force being defined by subtracting a product of said target position and an inverse of a mechanism characteristic of said actuator from a product of an acceleration disturbance acting on said movable part and a mass of said movable part; and
   feeding back said estimation value to an electricity-to-force converting section of said actuator.

2. The method according to claim 1, further comprising:
   obtaining a speed estimation value of said movable part by said disturbance observer; and
   feeding back said speed estimation value to said electricity-to-force converting section of said actuator along with said estimation value of said disturbance force.

3. The method according to claim 2, wherein
   in a defective region of an optical disk, said disturbance observer obtains said estimation value of said disturbance force and said speed estimation value of said movable part based on a position error of said movable part at an entrance of said defective region and a low-frequency component of said actuator control signal at said entrance of said defective region.

4. The method according to claim 3, further comprising:
   in said defective region of said optical disk, feeding back a value based on a difference between a low-frequency component of said speed estimation value of said movable part at said entrance of said defective region and said speed estimation value, to said electricity-to-force converting section of said actuator.

5. The method according to claim 4, further comprising:
   removing a noise component included in said actuator control signal, wherein a resultant signal from which said noise component has been removed is used as said actuator control signal.

6. A disk drive comprising:
   an optical pickup for focusing a light spot onto an optical disk;
   an actuator for driving said optical pickup in response to a control signal for controlling a position of said optical pickup to a target position; and
   a disturbance observer for obtaining a disturbance force defined by subtracting a product of said target position and an inverse of a mechanism characteristic of said actuator from a product of an acceleration disturbance acting on a movable part of said actuator and a mass of said movable part, said disturbance observer obtaining an estimation value of said disturbance force based on a position error of said movable part with respect to said target position and said control signal, wherein
   said estimation value of said disturbance force obtained by said disturbance observer is fed back to said actuator.

7. The disk drive according to claim 6, wherein:
   said disturbance observer further obtains a speed estimation value of said movable part, and feeds back said speed estimation value to said actuator along with said estimation value of said disturbance force.

8. The disk drive according to claim 7, further comprising:
   a first processing block for obtaining a low-frequency component of said control signal at an entrance of a defective region of said optical disk; and
   a second processing block for obtaining said position error of said movable part at said entrance of said defective region, wherein
   in said defective region of said optical disk, said disturbance observer obtains said estimation value of said disturbance force and said speed estimation value of said actuator based on said low-frequency component of said control signal at said entrance of said defective region obtained by said first processing block and said position error of said movable part obtained by said second processing block.

9. The disk drive according to claim 8, further comprising:
   a third processing block for obtaining a difference between said low-frequency component of said speed estimation value of said movable part at said entrance of said defective region of said optical disk and said speed estimation value, wherein
   in said defective region of said optical disk, a value based on said difference obtained by said third processing block to said actuator.

10. The disk drive according to claim 9, further comprising:
    a low-pass filter for removing a noise component included in an actuator control signal.

* * * * *